(12) United States Patent (10) Patent No.: US 12,682,215 B2

Thomson et al. (45) Date of Patent: Jul. 14, 2026

(54) FLEXIBLE MACHINE LEARNING

(71) Applicant: California Institute of Technology, Pasadena, CA (US)

(72) Inventors: Matthew W. Thomson, Pasadena, CA (US); Guruprasad Raghavan, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 994 days.

(21) Appl. No.: 17/826,876

(22) Filed: May 27, 2022

(65) Prior Publication Data

US 2022/0391673 A1 Dec. 8, 2022

Related U.S. Application Data

(60) Provisional application No. 63/194,070, filed on May 27, 2021.

(51) Int. Cl.
G06N 3/045 (2023.01)

(52) U.S. Cl.
CPC .................................. G06N 3/045 (2023.01)

(58) Field of Classification Search
CPC ........ G06N 3/045; G06N 3/08; G06N 3/0464; G06N 3/0495; G06N 3/082; G06N 3/09
See application file for complete search history.

(56) References Cited

U.S. PATENT DOCUMENTS

2008/0063264 A1    3/2008    Porikli
2019/0354832 A1    11/2019   Bronstein

2020/0364570 A1 *  11/2020   Kitamura .............. G06F 18/217
2021/0019753 A1    1/2021    Zhao
2021/0124881 A1 *  4/2021    Li .......................... G06F 40/30

OTHER PUBLICATIONS

Kawaguchi, K. et al., "Gradient Descent Finds Global Minima for Generalizable Deep Neural Networks of Practical Sizes", https://arxiv.org/abs/1908.02419 (Year: 2020).*
International Search Report and Written Opinion dated Sep. 7, 2022 in PCT Patent Application No. PCT/US2022/031323.
Alford et al., "Training behavior of sparse neural network topologies," IEEE High Performance Extreme Computing Conference (HPEC). IEEE 2019, in 6 pages.
Amari, "Differential geometry of curved exponential families-curvatures and information loss," The Annals of Statistics 1982, 10(2), 357-385.
Amari, "Natural gradient works efficiently in learning," Neural Computation 1998, 10(2), 251-276.
Anderson et al., "The high-dimensional geometry of binary neural networks," arXiv 2017, in 13 pages.
Auer et al., "Exponentially many local minima for single neurons," Advances in Neural Information Processing Systems 1995, 8, 316-322.
Babaeizadeh et al., "Noiseout: A simple way to prune neural networks," arXiv 2016, in 5 pages.

(Continued)

*Primary Examiner* — Alexey Shmatov

*Assistant Examiner* — Devika S Maharaj

(74) *Attorney, Agent, or Firm* — Dickinson Wright PLLC

(57) ABSTRACT

Disclosed herein include systems, devices, and methods for flexible machine learning by traversing functionally invariant paths in weight space.

24 Claims, 48 Drawing Sheets

(56) References Cited

OTHER PUBLICATIONS

Benjamin et al., "Measuring and regularizing networks in function space," arXiv 2018, in 18 pages.

Bernstein et al., "On the distance between two neural networks and the stability of learning," Advances in Neural Information Processing Systems 2020, 33, 21370-21381.

Blalock et al., "What is the state of neural network pruning?," Proceedings of Machine Learning and Systems 2020, 2, 129-146.

Brea et al. "Weight-space symmetry in deep networks gives rise to permutation saddles, connected by equal-loss valleys across the loss landscape," arXiv 2019, in 16 pages.

Choromanska et al., "The loss surfaces of multilayer networks," Artificial Intelligence and Statistics. PMLR 2015, 192-204.

Cohen et al., "Separability and geometry of object manifolds in deep neural networks," Nature Communications 2020, 11(1), 746.

Dauphin et al., "Identifying and attacking the saddle point problem in high-dimensional non-convex optimization," Advances in Neural Information Processing Systems 2014, 27, in 9 pages.

Frankle & Carbin, "The lottery ticket hypothesis: Finding sparse, trainable neural networks," arXiv 2018, in 42 pages.

Garipov et al. "Loss surfaces, mode connectivity, and fast ensembling of dnns," Advances in Neural Information Processing Systems 2018, 31, in 10 pages.

Goodfellow et al., "An empirical investigation of catastrophic forgetting in gradient-based neural networks," arXiv 2013, in 9 pages.

Goodfellow et al., "Qualitatively characterizing neural network optimization problems," arXiv 2014, in 20 pages.

Hauser & Ray, "Principles of riemannian geometry in neural networks," Advances in Neural Information Processing Systems 2017, 30, in 10 pages.

Jia et al., "On geometric structure of activation spaces in neural networks," arXiv 2019, in 8 pages.

Keskar et al., "On large-batch training for deep learning: Generalization gap and sharp minima," arXiv 2016, in 16 pages.

Kirkpatrick et al., "Overcoming catastrophic forgetting in neural networks," Proceedings of the National Academy of Sciences 2017, 114(13), 3521-3526.

Le et al., "A simple way to initialize recurrent networks of rectified linear units," arXiv 2015, in 9 pages.

Lopez-Paz et al. "Gradient episodic memory for continual learning," Advances in Neural Information Processing Systems 2017, 30, in 10 pages.

Manessi et al., "Automated pruning for deep neural network compression," 24th International conference on pattern recognition (ICPR). IEEE 2018, 657-664.

Mccloskey & Cohen, "Catastrophic interference in connectionist networks: The sequential learning problem," Psychology of Learning and Motivation 1989, 24, 109-165.

Neyshabur et al., "Path-sgd: Path-normalized optimization in deep neural networks," Advances in Neural Information Processing Systems 2015, 28, in 9 pages.

Ratcliff, "Connectionist models of recognition memory: constraints imposed by learning and forgetting functions," Psychological Review 1990, 97(2), 285-308.

Simard et al., "Transformation invariance in pattern recognition—tangent distance and tangent propagation," Neural networks: tricks of the trade 2002, 239-274.

Srivastava et al., "Compete to compute," Advances in Neural Information Processing Systems 2013, 26, in 9 pages.

* cited by examiner

VGG16 on CIFAR-10

ResNet164 on CIFAR-10

| | | |
|---|---|---|
| L = | New Task Loss Function | Catastrophic Forgetting |
| L = | L₂ distance from sparse submanifold | Sparse Networks |
| L = | 0 | Adversarial Robustness |

*(iii)*

CIFAR-100
20-task paradigm

Task 1     1,2,3,4,5

Task 2     6,7,8,9,10

Task 3     11,12,13,14,15

Task 20     96,97,98,99,100

FLEXIBLE MACHINE LEARNING

RELATED APPLICATIONS

This application claims the benefit under 35 U.S.C. § 119(e) of U.S. Provisional Patent Application Ser. No. 63/194,070, filed May 27, 2021, the content of this related application is incorporated herein by reference in its entirety for all purposes.

BACKGROUND

Field

The present disclosure relates generally to the field of machine learning, for example, flexible machine learning systems.

Description of the Related Art

Artificial neural networks can now out-perform humans on tasks ranging from image recognition and game playing, to predicting three-dimensional structures of proteins. However, in many respects, artificial neural networks fail to replicate the flexibility and robustness that are defining features of human intelligence. There is a need for more flexible and robust artificial neural networks.

SUMMARY

Disclosed herein include methods of generating a neural network (or a machine learning model in general). In some embodiments, a method of generating a neural network is under control of a processor (e.g., a hardware processor or a virtual processor) and comprises: (a) receiving a first neural network (or a first machine learning model generally). The first neural network can comprise a plurality of first weights in a weight space. The first neural networks can map an input (e.g., of an input space) to an output in an output space. The method can comprise: (b) determining a second neural network of a plurality of second neural networks (or a second machine learning model of a plurality of second machine learning models) from the first neural network along a functionally invariant path (FIP) in the weight space. The FIP can be with respect to the first neural network. The second neural network can comprise a plurality of second weights in the weight space. The method can comprise: (c) determining another second neural network of the plurality of second neural networks (or another machine learning model of the plurality of second machine learning models) from the immediate prior second neural network (e.g., the second neural network from (b) during the first iteration of (c), or the second neural network from the immediate prior iteration of (c) for any subsequent iteration of (c)) along the FIP in the weight space. The other second neural network can comprise a plurality of second weights in the weight space. The method can comprise: (d) repeating (c) for a number of iterations. In some embodiments, the final second neural network (the second neural network from the last iteration) can have advantageous properties. For example, the first neural network can be for (e.g., trained for) a first task, and the final second neural network can retain performance on the first task while gaining performance on a second task. For example, the final second neural network can have performance similar (e.g., less than 1% or 0.1% difference) to that of the first neural network, but is sparsified. For example, the plurality of second neural networks (or the plurality of second neural networks with the first neural network) can be used as an ensemble which is not as susceptible to adversarial attach (e.g., relative to the first neural network).

In some embodiments, the number of the plurality of second neural networks is at least 10. In some embodiments, the number of iterations is predetermined. For example, the number of iterations is at least 9. In some embodiments, (d) repeating (c) comprises: repeating (c) until an accuracy of the second neural network from the current iteration of (c) is above a threshold. For example, the threshold is 80%. The accuracy can be with respect to a holdout set or a test set. In some embodiments, (d) repeating (c) comprises: repeating (c) until a difference in an accuracy of the second neural network from the current iteration of (c) and an accuracy of the second neural network from the immediate prior iteration of (c) is less a threshold. For example, the threshold is 0.1%.

Disclosed herein include methods of generating a neural network (or a machine learning model generally). In some embodiments, a method of generating a neural network is under control of a processor (e.g., a hardware processor or a virtual process) and comprises: (a) receiving a first neural network. The first neural network can comprise a plurality of first weights in a weight space. The first neural networks can map an input (e.g., in an input space) to an output in an output space. The method can comprise: (b) determining a second neural network of a plurality of second neural networks (or a second machine learning model of a plurality of second machine learning models) from the first neural network along a functionally invariant path (FIP) in the weight space. The FIP can be with respect to the first neural network. The second neural network can comprise a plurality of second weights in the weight space. The method can comprise: (c) iteratively, determining another second neural network of the plurality of second neural networks (or another second machine learning model of the plurality of machine learning models) from the immediate prior second neural network (e.g., the second neural network determined in (b) for the first iteration of (c), or the second neural network determined in the immediate prior iteration of (c) for any subsequent iteration of (c)) along the FIP in the weight space. The other second neural network can comprise a plurality of second weights in the weight space.

In some embodiments, the number of the plurality of second neural networks is at least 10. In some embodiments, the number of iterations is predetermined. For example, the number of iterations is at least 9. In some embodiments, (c) is repeated until an accuracy of the second neural network from the current iteration of (c) is above a threshold. For example, the threshold is 80%. The accuracy can be with respect to a holdout set or a test set. In some embodiments, (c) is repeated until a difference in an accuracy of the second neural network from the current iteration of (c) and an accuracy of the second neural network from the immediate prior iteration of (c) is less a threshold. For example, the threshold is 0.1%.

Disclosed herein include methods of generating a neural network (or a machine learning model generally). In some embodiments, a method of generating a neural network is under control of a processor (e.g., a hardware processor or a virtual processor) and comprises: receiving a first neural network (or a first machine learning model generally). The first neural network can comprise a plurality of first weights in a weight space. The first neural network can map an input (in an input space) to an output in an output space. The method can comprise: determining a plurality of second neural networks from the first neural network (or a plurality of second machine learning models) along a functionally invariant path (FIP) in the weight space. The FIP can be with respect to the first neural network. Each of the plurality of second neural networks can comprise a plurality of second weights in the weight space. In some embodiments, the number of the plurality of second neural networks is at least 10.

In some embodiments, receiving the first neural network comprises: training the neural network using a first objective function.

In some embodiments, determining the second neural network comprises: determining the second neural network using a first objective function. In some embodiments, determining the other second neural network using a first objective function. In some embodiments, determining the plurality of second neural networks comprises: determining the plurality of second neural networks using a first objective function.

In some embodiments, the first objective function is used to prevent or minimize adversarial fragility. The plurality of second neural network can have intra-ensembel diversity. The plurality of second neural networks as an ensemble (or the first neural network and the plurality of second neural networks as an ensemble) has an accuracy of at least 50% against adversarial attack.

In some embodiments, determining the second neural network comprises determining the second neural network using a first objective function and a second objective function. In some embodiments, determining the other second neural network comprises determining the other second neural network using a first objective function and a second objective function. In some embodiments, determining the plurality of second neural networks comprises: determining the plurality of second neural networks using a first objective function and a second objective function. The second objective function is weighted (e.g., 0.1) relative to the first objective function.

In some embodiments, the first objective function and the second objective function are together used to prevent or minimize catastrophic forgetting (e.g., for 2 or more tasks). In some embodiments, the first objective function corresponds to a first task (or an initial task), and the second objective function corresponds to a second task (or a secondary task). In some embodiments, the first task and the second task are different. In some embodiments, the first task is an image classification task (e.g., with 10 classes), and the second task is a different image classification task (e.g., with 10 classes). In some embodiments, the first neural network is for (e.g., trained for) a first task. A second neural network (e.g., a final second neural network) of the plurality of second neural network can be used for the first task and a second task.

In some embodiments, the first task and/or the second task comprises a computation processing task, an information processing task, a sensory input processing task, a storage task, a retrieval task, a decision task, an image classification (or processing or recognition) task, and/or a speech recognition task. In some embodiments, an input to a first neural network and/or a second neural network of the plurality of second neural network comprises an image. An output of the first neural network and/or a second neural network of the plurality of second neural network can be a classification. The first task and/or a second task can comprise an image classification task In some embodiments, determining the plurality of second neural networks comprises: determining the plurality of second neural networks with respect to the first neural network. The method can further comprise: determining a plurality of third neural networks from a final second neural network of the plurality of second neural networks along FIP in the weight space with respect to the final second neural network of the plurality of second neural networks. Each of the plurality of third neural networks can comprise a plurality of third weights in the weight space. The first neural network can be for (e.g., trained) for the first task. The final second neural network can be for a first task and a second task. The final second neural network can retain performance on the first task while gaining performance on a second task. A final third neural network of the plurality of third neural networks can retain performance on the first task and the second task while gaining performance on a third task. The process can be repeated such that a final ith network of a plurality of ith network retains performance on the first task to (i−1)th task while gaining performance on a ith task. i can be, for example, 10.

In some embodiments, the first objective function and the second objective function are together used for sparsification. In some embodiments, the first neural network is for (e.g., trained for) a first task, and a second neural network (e.g., a final second neural network) of the plurality of second neural network is for the first task (not the second task). In some embodiments, a percentage of weights of a second neural network being zero is 10% to 99%. In some embodiments, weights between two consecutive layers closer to an input layer is less sparse than weights between two consecutive layers closer to an output layer. Weights between two consecutive layers closer to an input layer can be more sparse than weights between two consecutive layers closer to an output layer. Weights between two consecutive layers closer to an input layer can be approximately (e.g., within at most 1%) the same as weights between two consecutive layers closer to an output layer. In some embodiments, weights between two consecutive layers close to an input layer is less sparse than weights between another two consecutive layers. Weights between two consecutive layers close to an input layer can be more sparse than weights between another two consecutive layers. Weights between two consecutive layers close to an input layer can be approximately the same as (e.g., within at most 1%) weights between another two consecutive layers. In some embodiments, weights between two consecutive layers close to an output layer is less sparse than weights between another two consecutive layers. Weights between two consecutive layers close to an output layer can be more sparse than weights between another two consecutive layers. Weights between two consecutive layers close to an output layer can be approximately the same as (e.g., within at most 1%) weights between another two consecutive layers. In some embodiments, weights between two consecutive layers is less sparse than weights between another two consecutive layers. Weights between two consecutive layers can be more sparse than weights between another two consecutive layers. Weights between two consecutive layers can be approximately the same as (e.g., within at most 1%) weights between another two consecutive layers closer to an output layer.

In some embodiments, the first neural network has an accuracy of at least 80% with respect to a first task. A second neural network (e.g., a final second neural network) of the plurality of second neural networks can have an accuracy of at least 80% with respect to a first task. In some embodiments, the first neural network has an accuracy of at most 50% with respect to a second task. A second neural network (e.g., a final second neural network) of the plurality of second neural networks has an accuracy of at least 80% with respect to a second task.

In some embodiments, determining the plurality of second neural networks comprises: minimizing distances moved in the weight space amongst successive second neural networks of the plurality of second neural networks. In some embodiments, determining the plurality of second neural networks comprises: identifying functionally invariant directions in the weight space using a first objective function while biasing the functionally invariant directions along a gradient of the second objective function. In some embodiments, determining the plurality of second neural networks comprises: determining the plurality of second neural networks using output velocity and/or output acceleration in the output space. In some embodiments, determining the plurality of second neural networks comprises: minimizing output velocity, for a given change in weight, in the output space. In some embodiments, determining the plurality of second neural networks comprises: minimizing output acceleration, for a given change in weight, in the output space.

In some embodiments, determining the second neural network and/or determining the plurality of second neural networks comprises: (i) sampling a plurality of first points around the plurality of first weights of the first neural network in the weight space. Determining the second neural network and/or determining the plurality of second neural networks can comprise: (ii) performing gradient descent from each of the plurality of first points to determine the second neural network, or a second neural network of the plurality of second neural networks. In some embodiments, determining the other second neural network or determining the plurality of second neural networks comprises: (iii) sampling a plurality of second points around the plurality of second weights of the second neural network in the weight space. Determining the other second neural network or determining the plurality of second neural networks can comprise: (iv) performing gradient descent from each of the plurality of second points to determine the other second neural network or another second neural network of the plurality of second neural networks.

In some embodiments, determining the plurality of second neural networks comprises: (i) sampling a plurality first points around the plurality of first weights of the first neural network in the weight space. Determining the plurality of second neural networks comprises: (ii) performing gradient descent from each of the plurality of first points to determine a second neural network of the plurality of second neural networks. Determining the plurality of second neural networks can comprise: (iii) sampling a plurality second points around the plurality of second weights of the immediate prior second neural network (the second neural network from (ii) for the first iteration of (iii), or the immediate prior iteration of (iii) for any subsequent iteration of (iii)) in the weight space. Determining the plurality of second neural networks can comprise: (iv) performing gradient descent from each of the plurality of second points to determine another second neural network of the plurality of second neural networks. Determining the plurality of second neural networks can comprise: (v) repeating (iii) and (iv) for a number of iterations.

In some embodiments, the method comprises: receiving an input. The method can comprise: determining an output from the input using a final second neural network (e.g., the final second neural network) of the plurality of second neural networks. The method can comprise: determining an output from the input using the plurality of second neural networks as an ensemble (or the first neural network and the plurality of second neural networks).

In some embodiments, the first neural network and/or a second neural network comprises at least 100 weights. In some embodiments, the first neural network and/or a second neural network comprises at least 3 layers. A layer can comprise at least 5 nodes. In some embodiments, the first neural network and/or a second neural network comprises at least two convolutional layers. In some embodiments, the first neural network and/or a second neural network comprises at least two fully connected layers. In some embodiments, the first neural network and/or a second neural network comprises at least 25 nodes. In some embodiments, the first neural network and/or a second neural network comprises a convolutional neural network (CNN), a deep neural network (DNN), a multilayer perceptron (MLP), or a combination thereof.

Disclosed herein include methods of performing a task. In some embodiments, a method of performing a task is under control of a processor (e.g., a hardware processor or a virtual processor) and comprises: receiving a second neural network (e.g., a final second neural network) determined using any method disclosed herein. The method can comprise: receiving an input. The method can comprise: determining an output from the input using the second neural network. In some embodiments, a method of performing a task is under control of a processor (e.g., a hardware processor or a virtual processor) and comprises: receiving a plurality of second neural networks (or the first neural network or the plurality of second neural networks) determined using any method disclosed herein. The method can comprise: receiving an input. The method can comprise: determining an output from the input using the plurality of second neural networks as an ensemble (or the first neural network or the plurality of second neural networks) as an ensemble. In some embodiments, the system comprises or is comprised in an edge device, an internet of things (IoT) device, a real-time image analysis system, a real-time sensor analysis system, an autonomous driving system, an autonomous vehicle, a robotic control system, a robot, or a combination thereof Disclosed herein include embodiments of a computer readable medium. In some embodiments, a computer readable medium comprising executable instructions, when executed by a hardware processor of a computing system or a device, cause the hardware processor, to perform any method disclosed herein.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A shows three networks ($w_1$, $w_2$, $w_3$) in weights space W and their relative distance in functional space and loss space. High-performance path can be determined by asking how movement in weight space changes functional performance and loss through introduction of a pullback metric g. FIG. 1B shows the metric tensor (g) can be evaluated by analyzing the effect of infinitesimal perturbation in the tangent space of a network. FIG. 1C shows that paths between pairs of networks can be modeled as long range movement of network weights along a path, $\gamma(t)$, in weight space.

FIG. 2A shows a dense network ($w_t$) and 4 networks ($w_2, w_3, w_4, w_5$) on the p-sparse hyperplane in the Weight space (left) and their relative distances on the functional manifold (right). FIG. 2B depicts $w_t$, $w_2$ to $w_5$ represented on the loss surface.

FIG. 4A shows a graph of the test performance of sparse LeNet architectures on MNIST discovered by traversing the geodesic from the dense-MLP to the p-sparse hyperplane. The geodesic locates sparse networks that perform≥97.5% for sparsities ranging from from 50 to 98.1% and finds a sparse network performing at ~97% for 99% sparsity and ~96.8% for 99.1% sparse network. FIG. 4B shows the paths traversed from the trained dense-MLP to p-sparse hyperplane (pE[50,75,90,95]) are high-performing as they perform at an accuracy≥97.4%. FIG. 4C shows a graph of the test accuracy and FIG. 4D the number of network update epochs for geodesic recovery vs fine-tuning of VGG11 trained on CIFAR-10, while 50 (out of 64) cony-filters are deleted from layer 1 in VGG11. FIG. 4D depicts a graph showing that geodesic recovery requires ≤30 total update epochs, while fine-tuning requires up to 120 epochs.

FIG. 5A shows graphs of task performance. Two LeNet's were trained on permute-MNIST task-1,2 ($w_1$, $w_2$). The geodesic between $w_2$ and $w_1$ using metric tensor on task-2 ($g^2$) discovered a network that performs at 98% test-accuracy on both tasks. The best network along the linear path performed at 80% on both tasks. FIG. 5B depicts PCA projections of the network weights showing geodesic obtained from Geo($w_2, g^2, w_1, N_s$) and linear path. Both paths begin from $w_t=w_2$ net trained on task-2 (circle) and move to the target $w_a=w_1$ net trained on task-1 (triangle). FIG. 5C depicts task performance where a third network pre-trained on Task-3 ($w_3$) moves to target network $w_a$ trained on task-1,2 obtained from FIG. 5A. The geodesic finds networks that perform at [97%, 97%, 98%] while the best network along linear path performs at [70%, 60%, 60%] on Tasks-1,2,3 respectively. FIG. 5D depicts task performance where a fifth network pretrained on Task-5, moves to the target network $w_a$ trained on task-1,2,3,4. The geodesic path finds networks that perform at [94,95,96,96, 98%] on Tasks 1 to 5 respectively while the best network along the linear path performs at ~60% on all 5 tasks. The "circle" and "triangle" in FIG. 5E correspond to CNN's trained on MNIST and Fashion-MNIST datasets respectively. The x,y axes are tSNE projections of the network weights and z axes corresponds to the mean performance of the network on both, MNIST and F-MNIST. The linear path between the networks hosts networks that perform on average 40% on both tasks, while the geodesic approach discovers a curved path that performs at 94% on MNIST and 82% on F-MNIST. FIG. 5F shows a comparison of the linear path and geodesic approach revealing that the curved path converges at a network that simultaneously performs at 94% on MNIST and 82% on F-MNIST, while the linear path finds a network that performs at 40% on MNIST and F-MNIST.

FIG. 6A depicts a pretrained network on task-1 ($w_1$). FIG. 6B depicts a geodesic evaluated using metric on task-2 ($g^2$) connecting $w_2$ (pretrained on task-2) and $w_1$ converges at $w_{12}$.

FIG. 7A shows that the two modes of VGG16 trained on CIFAR-10 perform at 94.2% and 95.2% respectively. The linear segment (darker gray line) connecting the modes incurs very high loss (~10%) while the geodesic procedure (lighter gray line) finds a curved path with test accuracy≥88%. FIG. 7B shows that the two modes of ResNet164 trained on CIFAR-10 perform at 92.44% and 92.12% respectively. The linear segment (darker gray line) connecting the modes incurs very high loss (~20%) while the geodesic procedure (lighter gray line) finds a curved path with test accuracy≥85%. FIG. 7C shows that the two modes of VGG16 trained on CIFAR-100 perform at accuracy 74.4% and 75.21% respectively. The linear segment (darker gray line) connecting the modes incurs very high loss (~1%) while the geodesic procedure (lighter gray line) finds a curved path with test accuracy≥55%.

FIG. 8A (Top) shows a trained convolutional neural network with weight configuration ($w_t$), represented by lines connecting different layers of the network, accepts an input image, x, and produces a 10-element output vector, f(x, $w_t$). Perturbation of network weights (Bottom) by dw results in a new network with weight configuration $w_t$+dw with an altered output vector, f(x, $w_t$+dw), for the same input, x. FIG. 8B shows that, mathematically, perturbation of the networks' weight configuration can shift the network from $w_t$ to $w_t$+dw in weight space (W). The network's output, f(x, $w_t$), shifts to f(x, $w_t$+dw) in output space (Y). The metric tensor ($g_{w_t}$) transforms perturbation in weight space (dw) to distance moved in the output space ($\|f(x, w_t)-f(x, w_t+dw)\|_2$). FIG. 8C shows the FIP algorithm identifies weight perturbations, $\theta^*(L)$ that minimize distance moved in output space while maximizing alignment with gradient of a secondary objective function ($\nabla_w L$). The bottom, light gray arrow indicates ε-norm weight perturbation that minimizes distance moved in output space, top arrow is ε-norm weight perturbation that maximizes alignment with gradient of objective function, L(x, w). The secondary objective function L(x, w) is varied to solve distinct machine learning challenges. FIG. 8D shows that the path algorithm defines functionally invariant paths, $\gamma(t)$, through iterative identification of ε-norm perturbations ($\theta^*(t, L)$) in the weight space.

FIG. 9A-FIG. 9G depict non-limiting exemplary results showing that networks learn sequential tasks without catastrophic forgetting by traversing FIPs. FIG. 9A, panel (i) shows training neural networks on a 2 task paradigm, with Task-1 being 10-digit recognition from MNIST and Task-2 being 10-item recognition from Fashion-MNIST. Shown in FIG. 9A, panel (ii) is an exemplary schematic to construct FIPs in weight space to train networks on two tasks sequentially. FIG. 9B depicts a 3D lineplot where dots are weight configurations of 5-layered convolutional neural networks (CNNs) in PCA space. Training on two tasks sequentially via conventional approach takes the black followed by the light gray path (slopping to bottom left) to reach N-FMNIST (traditional), while the path-finding algorithm takes the black followed by the dark gray (slopping to top left) to reach N-FMNIST(FIP). Images of digits-3,6 are from MNIST and sneaker, coat images are from Fashion-MNIST. Text labels above the image are networks' predictions and numbers below are the networks' test accuracy on MNIST and Fashion-MNIST. FIG. 9C shows graphs of test accuracy of networks learning two tasks sequentially by traversing FIP (panel (i)) and by traditional retraining (panel (ii)). Also shown are heatmaps that capture classification scores on 10 k test images (5 k images from each task) for networks obtained through FIP (panel (iii)) and traditional retraining strategy (panel (iv)). FIG. 9D, panel (i) depicts an exemplary neural network with 100 output classes trained on 20 task paradigm, with every task containing 5 non-overlapping classes of natural images sampled from CIFAR100 dataset. FIG. 9D, panel (ii) also shows a non-limiting exemplary schematic to construct FIPs in weight space to train neural networks on 20 sequential tasks. FIG. 9E, panel (i) depicts a graph of average test accuracy of networks along FIP while learning 20 sequential tasks. The networks to the right of a dashed line encounter a new task (T-i), referring to the i'th task. FIG. 9E, panel (ii) shows a heatmap displaying classification scores for networks along FIP on 1 k test images, with 50 images sampled from every task. FIG. 9F shows exemplary data that FIP surpasses state-of-art methods in mitigating catastrophic forgetting in 2-task paradigm (panel (i)) and 20-task CIFAR100 paradigm (panel (ii)). Error bars indicate standard deviation over 5 trials.

FIG. 10A shows an exemplary schematic to construct FIP from $N_1$ to p % sparse submanifold. FIG. 10B shows an exemplary scatterplot where the dots are weight configurations of LeNet-300-100 networks in PCA space. The FIP line beginning from $N_1$ (large gray dot) discovers high-performance LeNet's in the 99.1% sparse submanifold (darker dots). Lighter dots are random sparse networks in the 99.1% sparse submanifold. Digits-4, 0,5,7 are from MNIST, text-labels below the image are network predictions and the number below is the networks' test accuracy on MNIST. FIG. 10C shows sparse LeNet connectivity visualized by plotting vertical lines in rows to represent non-zero weights. Boxplot shows sparsity across LeNet's layers. FIG. 10D depicts a scatterplot where the dots are weight configurations of ResNet-20 networks in PCA space. The FIP beginning at $N_1$ (large gray dot) discovers high-performance ResNet-20 networks in the 93% sparse submanifold (darker dots). Lighter dots are random sparse networks in 93% sparse submanifold. Deer, frog, plane, ship images are from CIFAR-10, text-labels below the image are network predictions and the number adjacent is the networks' test accuracy on CIFAR-10. FIG. 10E depicts a boxplot showing the sparsity across ResNet-20's layers (over n=6 sparsified ResNet's). The cartoon below the x-axis depicts the ResNet-20 architecture. FIG. 10F-FIG. 10G show graphs of the performance of sparse networks discovered by FIPs and Lottery ticket hypothesis across a wide range of sparsities on MNIST (FIG. 10F) and CIFAR-10 (FIG. 10G).

FIG. 11A shows a non-limiting exemplary schematic to generate FIP ensemble ($P_1, \ldots, P_4$) by sampling networks along FIP (dotted line) beginning at network-$N_1$. FIP can be constructed by identifying a series of weight perturbations that minimize the distance moved in networks' output space. FIG. 11B shows original CIFAR-10 images (left) and adversarial CIFAR-10 images (right). The text-labels above the images are predictions made by a network trained on CIFAR-10. Trained networks' accuracy on the original and adversarial images are shown below. FIG. 11C (first panel) depicts a line-plot showing the individual network performance on adversarial inputs (solid line), and the joint ensemble accuracy on adversarial inputs (dashed). FIG. 11C, panels (i) and (ii), left shows that the FIP ensemble ($P_1, P_2$, . . . ,$P_{10}$) and DeepNet ensemble($N_1, N_2, \ldots, N_{10}$) visualized on weight space PCA. FIG. 11C, panels (i) and (ii), right showheatmaps depict classification score of networks in FIP ensemble and DeepNet ensemble on 6528 adversarial CIFAR-10 examples. FIG. 11D depicts a boxplot comparing adversarial accuracy (over 10 k adversarial examples) across different ensembling techniques (n=3 trials). FIG. 11E shows a histogram of coherence values for FIP and DeepNet ensemble. FIG. 11F shows a boxplot of the ensemble diversity score across VGG16 layers over n=1000 CIFAR-10 image inputs. The cartoon below the x-axis depicts the VGG16 network architecture.

FIG. 12A-FIG. 12C depict non-limiting exemplary results showing that FIP alleviates CF in 5-sequential task paradigm for splitMNIST. FIG. 12A, panel (i) shows a neural network with 10 output classes trained on 5 task paradigm, with every task containing a different subset of MNIST digits. Shown in FIG. 12A, panel (ii) is an exemplary schematic to construct FIPs in weights space in order to train neural networks on 5 sequential asks. FIG. 12B, panel (i) shows a graph of the test accuracy of networks while traversing FIPs to learn 5 sequential tasks. The dashed lines indicate that the networks encounter a new task. Shown in FIG. 12B, panel (ii) is a heatmap displaying classification score for networks along FIP on 5 k images, with 1 k images sampled from every task. FIG. 12C depicts a boxplot showing FIP surpasses state-of-art methods in mitigating catastrophic forgetting in 5-task paradigm.

FIG. 13A shows a distribution of distances moved in networks' output space over 10 k image-inputs perturbed within ε ball, for individual networks along the FIP. FIG. 13B shows a graph comparing distribution of distances moved in networks' output space over 10 k image-inputs perturbed within ε ball, for individual networks in the FIP ensemble and networks in the DN ensemble. FIG. 13C shows a graph of the distribution of distances moved in networks' output space over 10 k image-inputs perturbed within ε ball, for the entire FIP ensemble and the entire DN ensemble.

Figure 1A:
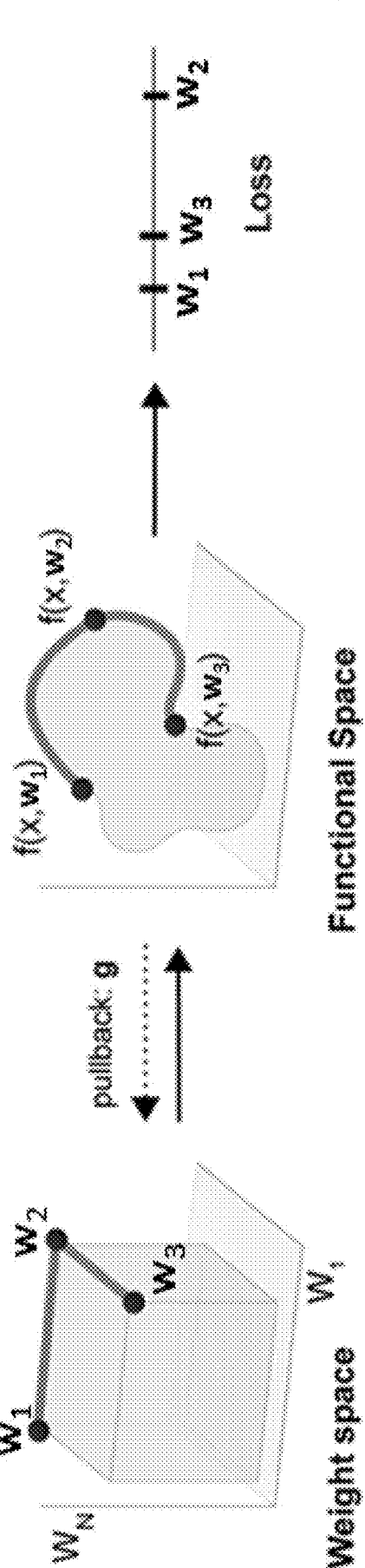
FIG. 1A-FIG. 1C depict non-limiting exemplary embodiments of a geometric framework for constructing paths in functional space.
Figure 1A:

Throughout the drawings, reference numbers may be re-used to indicate correspondence between referenced elements. The drawings are provided to illustrate example embodiments described herein and are not intended to limit the scope of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Disclosed herein include methods of generating a neural network (or a machine learning model in general). In some embodiments, a method of generating a neural network is under control of a processor (e.g., a hardware processor or a virtual processor) and comprises: (a) receiving a first neural network (or a first machine learning model generally). The first neural network can comprise a plurality of first weights in a weight space. The first neural networks can map an input (e.g., of an input space) to an output in an output space. The method can comprise: (b) determining a second neural network of a plurality of second neural networks (or a second machine learning model of a plurality of second machine learning models) from the first neural network along a functionally invariant path (FIP) in the weight space. The FIP can be with respect to the first neural network. The second neural network can comprise a plurality of second weights in the weight space. The method can comprise: (c) determining another second neural network of the plurality of second neural networks (or another machine learning model of the plurality of second machine learning models) from the immediate prior second neural network (e.g., the second neural network from (b) during the first iteration of (c), or the second neural network from the immediate prior iteration of (c) for any subsequent iteration of (c)) along the FIP in the weight space. The other second neural network can comprise a plurality of second weights in the weight space. The method can comprise: (d) repeating (c) for a number of iterations. In some embodiments, the final second neural network (the second neural network from the last iteration) can have advantageous properties. For example, the first neural network can be for (e.g., trained for) a first task, and the final second neural network can retain performance on the first task while gaining performance on a second task. For example, the final second neural network can have performance similar (e.g., less than 1% or 0.1% difference) to that of the first neural network, but is sparsified. For example, the plurality of second neural networks (or the plurality of second neural networks with the first neural network) can be used as an ensemble which is not as susceptible to adversarial attach (e.g., relative to the first neural network).

Disclosed herein include methods of generating a neural network (or a machine learning model generally). In some embodiments, a method of generating a neural network is under control of a processor (e.g., a hardware processor or a virtual process) and comprises: (a) receiving a first neural network. The first neural network can comprise a plurality of first weights in a weight space. The first neural networks can map an input (e.g., in an input space) to an output in an output space. The method can comprise: (b) determining a second neural network of a plurality of second neural networks (or a second machine learning model of a plurality of second machine learning models) from the first neural network along a functionally invariant path (FIP) in the weight space. The FIP can be with respect to the first neural network. The second neural network can comprise a plurality of second weights in the weight space. The method can comprise: (c) iteratively, determining another second neural network of the plurality of second neural networks (or another second machine learning model of the plurality of machine learning models) from the immediate prior second neural network (e.g., the second neural network determined in (b) for the first iteration of (c), or the second neural network determined in the immediate prior iteration of (c) for any subsequent iteration of (c)) along the FIP in the weight space. The other second neural network can comprise a plurality of second weights in the weight space.

Disclosed herein include methods of generating a neural network (or a machine learning model generally). In some embodiments, a method of generating a neural network is under control of a processor (e.g., a hardware processor or a virtual processor) and comprises: receiving a first neural network (or a first machine learning model generally). The first neural network can comprise a plurality of first weights in a weight space. The first neural network can map an input (in an input space) to an output in an output space. The method can comprise: determining a plurality of second neural networks from the first neural network (or a plurality of second machine learning models) along a functionally invariant path (FIP) in the weight space. The FIP can be with respect to the first neural network. Each of the plurality of second neural networks can comprise a plurality of second weights in the weight space. In some embodiments, the number of the plurality of second neural networks is at least 10.

Disclosed herein include methods of performing a task. In some embodiments, a method of performing a task is under control of a processor (e.g., a hardware processor or a virtual processor) and comprises: receiving a second neural network (e.g., a final second neural network) determined using any method disclosed herein. The method can comprise: receiving an input. The method can comprise: determining an output from the input using the second neural network. In some embodiments, a method of performing a task is under control of a processor (e.g., a hardware processor or a virtual processor) and comprises: receiving a plurality of second neural networks (or the first neural network or the plurality of second neural networks) determined using any method disclosed herein. The method can comprise: receiving an input. The method can comprise: determining an output from the input using the plurality of second neural networks as an ensemble (or the first neural network or the plurality of second neural networks) as an ensemble. In some embodiments, the system comprises or is comprised in an edge device, an internet of things (IoT) device, a real-time image analysis system, a real-time sensor analysis system, an autonomous driving system, an autonomous vehicle, a robotic control system, a robot, or a combination thereof Disclosed herein include embodiments of a computer readable medium. In some embodiments, a computer readable medium comprising executable instructions, when executed by a hardware processor of a computing system or a device, cause the hardware processor, to perform any method disclosed herein.

Solving Hybrid Machine Learning Tasks by Traversing Weight Space Geodesics

Machine learning problems have an intrinsic geometric structure as central objects, including a neural network's weight space and the loss function associated with a particular task can be viewed as encoding the intrinsic geometry of a given machine learning problem. Therefore, geometric concepts can be applied to analyze and understand theoretical properties of machine learning strategies as well as to develop new algorithms. Methods are disclosed herein to address three seemingly unrelated open questions in machine learning by viewing them through a unified framework grounded in differential geometry. Specifically, the weight space of a neural network can be viewed as a manifold endowed with a Riemannian metric that encodes performance on specific tasks. By defining a metric it is possible to construct, geodesic, minimum length, paths in weight space that represent sets of networks of equivalent or near equivalent functional performance on a specific task. Geodesic paths can then be traversed while identifying networks that satisfy a second objective. Inspired by the geometric insight, the geodesic framework described herein can be applied to 3 major applications: (i) Network sparsification, (ii) Mitigating catastrophic forgetting by constructing networks with high performance on a series of objectives, and (iii) Finding high-accuracy paths connecting distinct local optima of deep networks in the non-convex loss landscape. The results described herein can be obtained on a wide range of network architectures (MLP, VGG11/16) trained on MNIST and/or CIFAR-10/100. Broadly, a geometric framework is disclosed herein that unifies a range of machine learning objectives and that can be applied to multiple classes of neural network architectures.

The geometry of weight manifolds and functional spaces represented by artificial neural networks is an important window to 'understanding' machine learning. Many open questions in machine learning, when viewed through the lens of geometry, can be related to finding points or paths of equivalent function in the weight and functional spaces. Although geometric structure may play a key role in determining the properties of neural network training, application of methods from differential geometry to machine learning is complicated by the dependence on millions of network parameters, the non-convex structure of loss functions, and the lack of computationally efficient algorithms that harness the geometric structure to traverse weight or functional space.

Disclosed herein is a mathematical framework grounded in differential geometry for constructing path-connected sets of deep neural networks that have equivalent functional performance on a task. The networks' weights space can be advantageously viewed as a pseudo-Riemannian manifold equipped with a distance metric that represents task performance while simultaneously capturing task-independent network properties, like network sparseness. The "search" for a suitable network (based on the application of interest) can be formalized as a dynamic movement on the curved pseudo-Riemannian manifold. Further, it is demonstrated that geodesics, minimum length paths, on the network weights space can provide high performance paths that the network can traverse to maintain performance while 'searching-out' for other networks that satisfy additional objectives. Specifically, a procedure was developed based on the geodesic equation to find sets of path connected networks that achieve high performance while also satisfying a second objective like sparsification or mitigating catastrophic interference.

The novel framework as disclosed herein can be applied to solve at least three (seemingly unrelated) major problems in machine learning: (i) Discovering sparse counterparts of dense neural networks and high-accuracy paths that connect the two (dense and sparse networks), (ii) Enabling continual learning by mitigating catastrophic forgetting, and (iii) Finding high-accuracy paths connecting two trained deep networks (mode-connectivity) in a non-convex loss landscape.

These applications, when viewed through the lens of differential geometry can be solved by finding points or paths of equivalent function in the functional space of deep networks. Broadly, the methods disclosed herein demonstrate that differential geometry can provide a mathematical framework and novel algorithms to unify open problems in machine learning in a common geometric language.

The parameters of a neural network encode the function that maps a set of inputs to outputs. Although the function mapping input/output is crucial for a large number of machine learning applications, the intractability of the function-space has veered researchers away to instead focus on techniques and analyses that concern the parameters of the neural network. The introduction of information geometry by Amari pioneered the analysis of neural networks from the lens of their function and output spaces. Natural gradient descent (NGD) utilized the KL distance between functions to efficiently train neural networks, by evaluating the Fisher-information matrix for scaling gradient updates based on parameters informativeness. Since then, many distance metrics, like Deep relative trust, the $L^2$ distance between neural network functions in Hilbert space have been developed for computing the functional distance between neural networks. In addition, distance metrics and algorithms have been developed to navigate the object manifolds in order to learn the best transformations for pattern recognition applications.

Geodesics: Mathematical Framework

Disclosed herein is a mathematical framework grounded in differential geometry for navigating the space of neural networks to discover novel networks that have high task-performance while satisfying additional constraints on task-independent network properties, like sparseness.

Figure 1B:
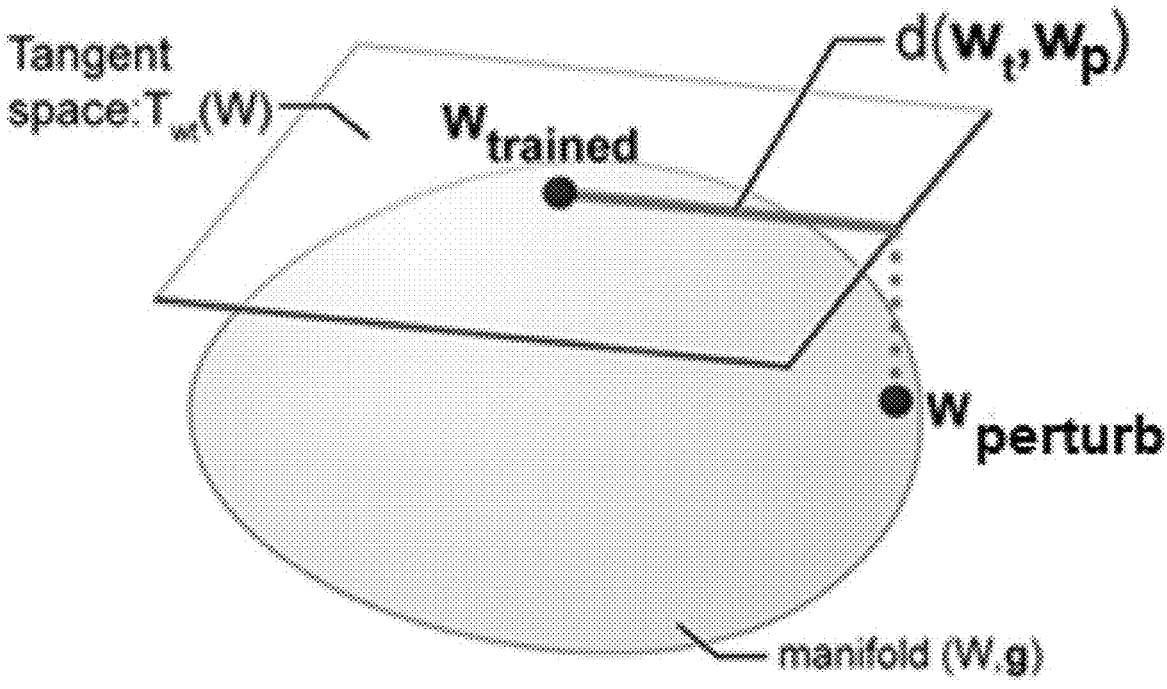
Figure 1C:
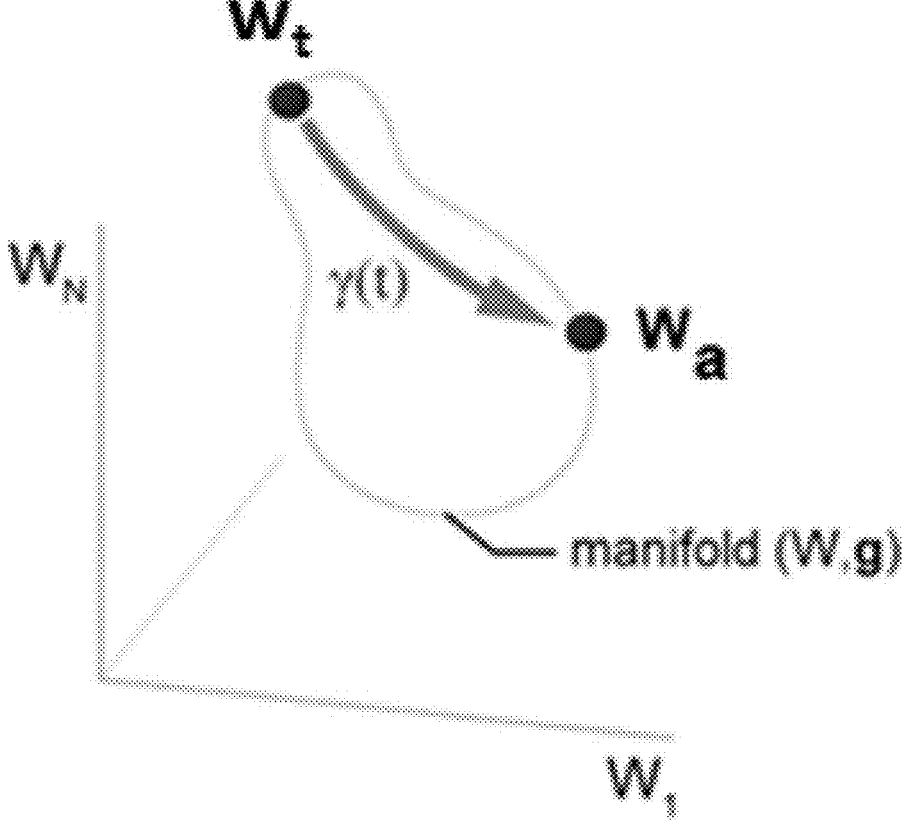

A feed-forward neural network (NN) can be represented as a smooth, $\mathbb{C}^\infty$ function f(x; w), that maps an input vector, $x \in \mathbb{R}^k$, to an output vector, f(x; w)=$y \in \mathbb{R}^m$. The function, f(x; w), can be parameterized by a vector of weights, $w \in \mathbb{R}^n$, that are typically set in training to solve a specific task. W= $\mathbb{R}^n$ can refer to the weight space (W) of the network, and $\mathcal{Y} = \mathbb{R}^m$ can refer to the functional space. A loss function can also be defined, L: $\mathbb{R}^m \times \mathbb{R} \to \mathbb{R}$, that provides a scalar measure of network performance for a given task (FIG. 1A-FIG. 1C). Note that the functional space $\mathcal{Y}$ and the loss space L are task-dependent spaces, while the weights space W is task-independent and encodes network properties, like fraction of non-zero weights.

A metric tensor (g) can be constructed to evaluate how infinitesimal movements in the weights space W impacts movement in the functional space ($\mathcal{Y}$), effectively measuring the functional-similarity of networks before and after weight perturbation. The metric tensor can be applied at any point in W to measure the functional impact of an arbitrary network weights perturbation.

To construct a metric mathematically, the input, x, can be fixed into a network and it can be asked how the output of the network, f(x, w), moves on the functional space, $\mathcal{Y}$, given an infinitesimal weight perturbation, du, in W where $w_p = w_t + du$. For an infinitesimal perturbation du, $$f(x, w_t + du) \approx f(x, w_t) + J_{w_t} du, \tag{1.1}$$

where $J_{w_t}$ is the Jacobian of $f(x, w_t)$ for a fixed x, $$J_{i,j} = \frac{\partial f_i}{\partial w^j},$$

evaluated at $w_t$. The change in functional performance can be measured given weight perturbation du as:

$$d(w_t, w_p) = \tag{1.2}$$

$$|f(x, w_t) - f(x, w_p)|^2 = du^T(J_{w_t}(x)^T J_{w_t}(x))du = du^T g_{w_t}(x)du$$

where $g_{w_t}(x) = J_{w_t}(x)^T J_{w_t}(x)$ is the metric tensor evaluated at the point $w_t \in W$ for a single datapoint (x). The metric tensor can be an n x n symmetric matrix that defines an inner product and local distance metric, $\langle du, du \rangle_w = du^T g_w(x)du$, on the tangent space of the manifold, $T_w(W)$ at each $w \in W$. Explicitly $$g_{ij}(x) = \sum_{k=1}^{m} \frac{\partial f_k(x, w)}{\partial w^i} \frac{\partial f_k(x, w)}{\partial w^j}, \tag{1.3}$$

where the partial derivatives $$\frac{\partial f_k(x, w)}{\partial w^i}$$

measure change in functional output of a network given a change in weight. In some embodiments, the metric formulation is extended to cases where one can consider a set of N training data points, X, and view g as the average of metrics derived from individual training examples.

$$g_w = g_w(X) = \sum_{i=1}^{N} g_w(x_i)/N$$

The metric, g, provides a local measure of functional distance on the pseudo-Riemmanian manifold (W, g). At each point in weight space, the metric defines the length, $\langle du, du \rangle_w$, of a local perturbation by its impact on the functional output of the network (FIG. 1B).

In some embodiments, the disclosed framework discovers a network that satisfies multiple objectives by constructing a geodesic between two locations in the networks weights space (W): one defined by a network that maximizes task performance, $w_t$, and another defined by a network that satisfies task-independent constraints, the secondary goal, $w_a$. $w_a$ can be a single network (if known) or a subspace of networks that satisfy the constraints (if the network is yet to be discovered).

In some embodiments, the global path is constructed in order to simultaneously minimize the movement of the network on the functional space while moving in weights space towards a second point to achieve a secondary goal.

The metric tensor can be used to determine the functional change across a path-connected set of networks in the networks weights space leading to the second point $w_a$. Mathematically, the metric changes as one moves in W due to the curvature of the ambient space that reflects changes in the vulnerability of a network to weight perturbation (FIG. 1C).

As a network moves along a path $\gamma(t) \in W$ from start network $w_t$ to the second point encoding the secondary goal $w_a$, the integrated impact on the network performance can be analyzed by using the metric (g) to calculate the length of the path $\gamma(t)$ as:

$$S(\gamma) = \int_0^1 \left\langle \frac{d\gamma(t)}{dt}, \frac{d\gamma(t)}{dt} \right\rangle_{\gamma(t)} dt, \text{ where} \left\langle \frac{d\gamma(t)}{dt}, \frac{d\gamma(t)}{dt} \right\rangle_{\gamma(t)} = \frac{d\gamma(t)^T}{dt} g_{\gamma(t)} \frac{d\gamma(t)}{dt} \tag{1.4}$$

is the infinitesimal functional change accrued while traversing path $\gamma(t) \in W$. As the shortest path in functional space—$\min(S(\gamma))$—can be desirable to ensure that the path connected networks are functionally similar, the geodesic from $w_t$ to $w_a$ can be evaluated.

In some embodiments, minimizing $S(\gamma)$ is equivalent to solving the geodesics on W equipped with metric tensor g.

$$\frac{d^2 w^\eta}{dt^2} + \Gamma^\eta_{\mu\nu} \frac{dw^\mu}{dt} \frac{dw^\nu}{dt} = 0 \tag{1.5}$$

where, $w^j$ defines the j'th basis vector of the weights space W, $$\Gamma^\eta_{\mu\nu}$$

specifies the Christoffel symbols $$\left( \Gamma^\eta_{\mu\nu} = E_r \frac{1}{2} g^{-1}_{\eta r} \left( \frac{\partial g_{r\mu}}{\partial x^\nu} + \frac{\partial g_{r\nu}}{\partial x^\mu} - \frac{\partial g_{\mu\nu}}{\partial x^r} \right) \right)$$

on the manifold. The Christoffel symbols record infinitesimal changes in the metric tensor (g) along a set of directions on the manifold. Since the computation and memory for evaluating Christoffel symbols scales as third order polynomial of network parameters ($\mathcal{O}(n^3)$), an optimization algorithm is proposed herein for evaluating 'approximate' geodesics in the manifold.

Optimization Procedure for Approximating Geodesics

Inspired by the local formulation of the geodesics equation, an optimization procedure is disclosed herein: Geo($w_t$, g, $w_a$, s) to construct a global path to find networks that have high performance as well as satisfy additional task-independent constraints. In some embodiments, the inputs to the procedure Geo($w_t$, g, $w_a$, s) are: (i) Start network that maximizes task performance ($w_t$), (ii) Metric to measure change in task-performance when network moves on weights space (g), (iii) Second network that encodes the secondary goal ($w_a$), and (iv) User-defined number of steps taken along the path (s). In some embodiments, the output of the optimization procedure is the path $\gamma(t)$ beginning from $\gamma(0)=w_t$ and ending at $\gamma(1)=w_c$. $w_c$ can be $w_a$ for a complete traversal, or can be a different network if the stopping criterion terminates the optimization before the complete traversal.

Starting at $w_t$, $\theta(w)$ can be iteratively solved for using Equation 1.6 and Equation 1.7 to traverse the path from $w_t$ to $w_a$ in the networks weights space (W). In some embodiments, $\theta(w)$ is a vector at point $w \in W$ whose length measures a linear estimate of the change in performance of the network incurred by moving an infinitesimal distance in a given direction in weight space. In some embodiments, the procedure finds a direction that (i) minimizes the functional change between networks on a task before and after an update {min: $\langle \theta(w), \theta(w) \rangle_w = \theta(w)^T g_w \theta(w)$} while (ii) moving towards the target network ($w_a$), achieved by maximizing the dot-product of the tangent vector and vector pointing towards $w_a$: {max: $\theta(w)^T(w_a - w)$}. Having evaluated a suitable $\theta(w)$, the networks weights can be updated via Equation 1.7, where $\eta$ is the step-size of the update.

In some embodiments, the metric tensor (g) is fixed as a representation of the performance on the task as it measures the functional difference before and after every update step, while the direction ($w_a - w$) towards $w_a$ encodes the secondary goal.

$$\mathrm{argmin}_{\theta(w)} \langle \theta(w), \theta(w) \rangle_w - \beta\theta(w)^T\big((w_a - w)\text{subject to:}\theta(w)^T\theta(w) \le 0.01 \quad\quad (1.6)$$

$$\Delta w = \eta \frac{\theta(w)}{\|\theta(w)\|} \quad\quad (1.7)$$

In some embodiments, the stopping criterion for Geo($w_t$, g, $w_a$, s) are as follows: (i) Network traverses the entire path from $w_t$ to $w_a$, (ii) Number of steps taken reaches user-defined s fed as an input to the procedure and (iii) Network makes small oscillations (moving to and away from $w_a$). Note that, in some embodiments, if stopping criterion (ii) or (iii) is reached, the output of the procedure is the path that terminates at a network different from $w_a$.

In some embodiments, the disclosed optimization procedure is a quadratic program that trades off, through the hyper-parameter motion towards the target network that encodes the secondary goal ($w_a$) and the maximization of the functional performance of the intermediate networks along the path. The strategy discovers multiple paths from the trained network $w_t$ to $w_a$ (encoding secondary goal) where networks maintain high functional performance during traversal. Of the many paths obtained, the path with the shortest total length (with respect to the metric g) can be selected as the best approximation to the geodesic in the manifold.

Geodesic Framework Applied to Three Distinct ML Problems

In the sections that follow, three distinct open questions in machine learning are recast through the lens of geometry and advantageous solutions are disclosed by constructing approximate geodesics. In some embodiments, the three applications are: (i) Sparsifying networks by traversing geodesics, (ii) Alleviating catastrophic forgetting via geodesics, and (iii) Connecting modes of deep neural networks by constructing geodesic paths.

Sparsifying Networks by Traversing Geodesics

Network sparsification has gained importance in recent years. Although deep networks are powerful systems, they require lots of computation and memory making their deployment in resource-constrained environments like mobile phones and smart-devices challenging.

Here, a network is disclosed that simultaneously has (i) high performance on a particular task (e.g., CIFAR-10 classification) and (ii) satisfies sparsity constraints, by setting a fraction of its weights to zero. The optimization procedure disclosed herein (Geo($w_t$, g, $w_a$, s)) addresses both the objectives by (i) setting the start point $w_t$ to a dense trained network on the task, followed by computing the metric tensor (g) for the task (e.g., CIFAR-10 classification) to evaluate change in task-performance while (ii) moving towards a target network $w_a := $p-sparse network, which has p % of its networks' weights set to zero (encodes the additional sparsity constraint).

In some embodiments, the target sparse network is yet to be discovered, so $w_a$ can be designated as a member of the subspace of networks that satisfies the sparsity constraint. So, a p-sparse subspace ($H_p$) in the networks' weights space can be defined as a collection of all networks with p % of their weights set to zero.

$$H_p = \left\{ w \in \mathcal{R}^n : \|w\|_0 = \frac{np}{100} \right\}.$$

$w_a$ can be chosen to be the projection of the dense network on $H_p$; $w_a = \mathrm{proj}(w_t, H_p)$. The target network can be constantly updated to $\mathrm{proj}(w, H_p)$ every $n_s$ steps taken by the network.

ALGORITHM 1.1
DISCOVERING SPARSE NETWORKS VIA GEODESICS

| | | Note |
|---|---|---|
| 1: | while $w_t \notin H_p$ do | If start network isn't on p-sparse hyperplane |
| 2: | $w_a \leftarrow \mathrm{proj}(w_t, H_p)$ | Project network on p-sparse hyperplane |
| 3: | $\gamma(t) \leftarrow \mathrm{Geo}(w_t, g, w_a, n_s)$ | |
| 4: | $w_c \leftarrow \gamma(1)$ | End point of geodesic after taking $n_s$ steps |
| 5: | $w_t \leftarrow w_c$ | New start network to evaluate geodesic |

Figure 2A:
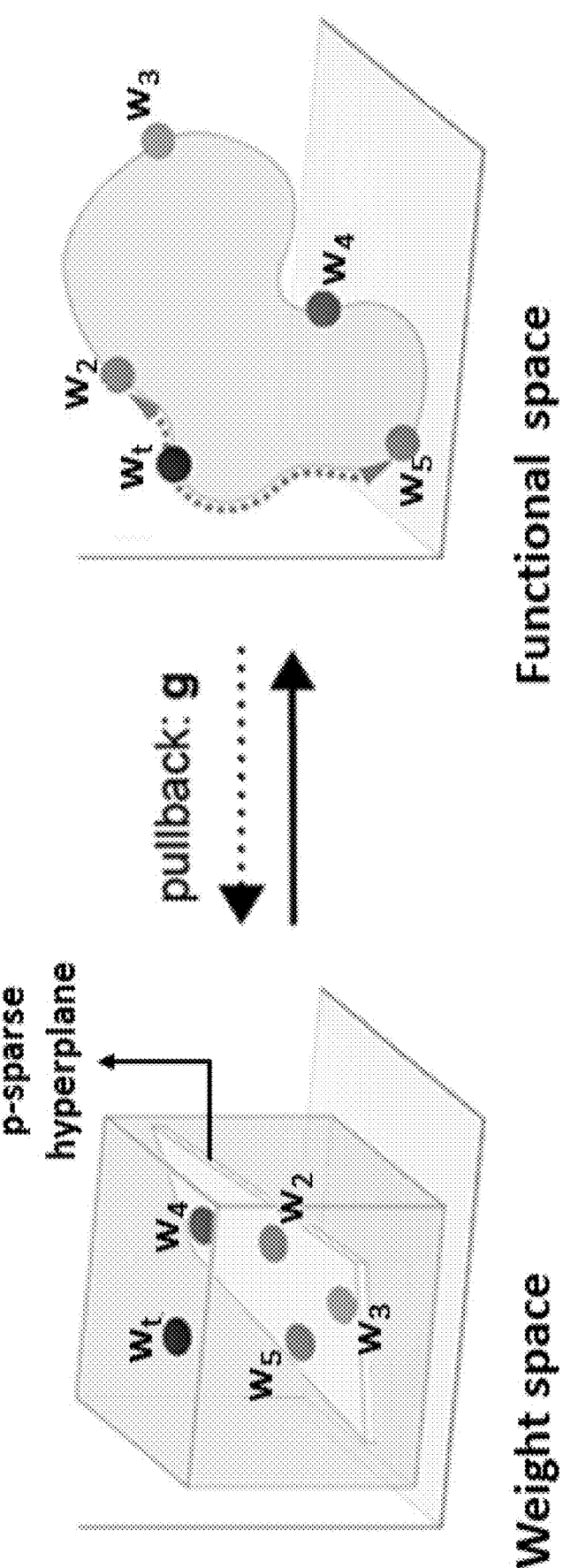
FIG. 2A-FIG. 2B depict non-limiting exemplary embodiments of a geodesic framework for discovering sparse networks.
Figure 2B:
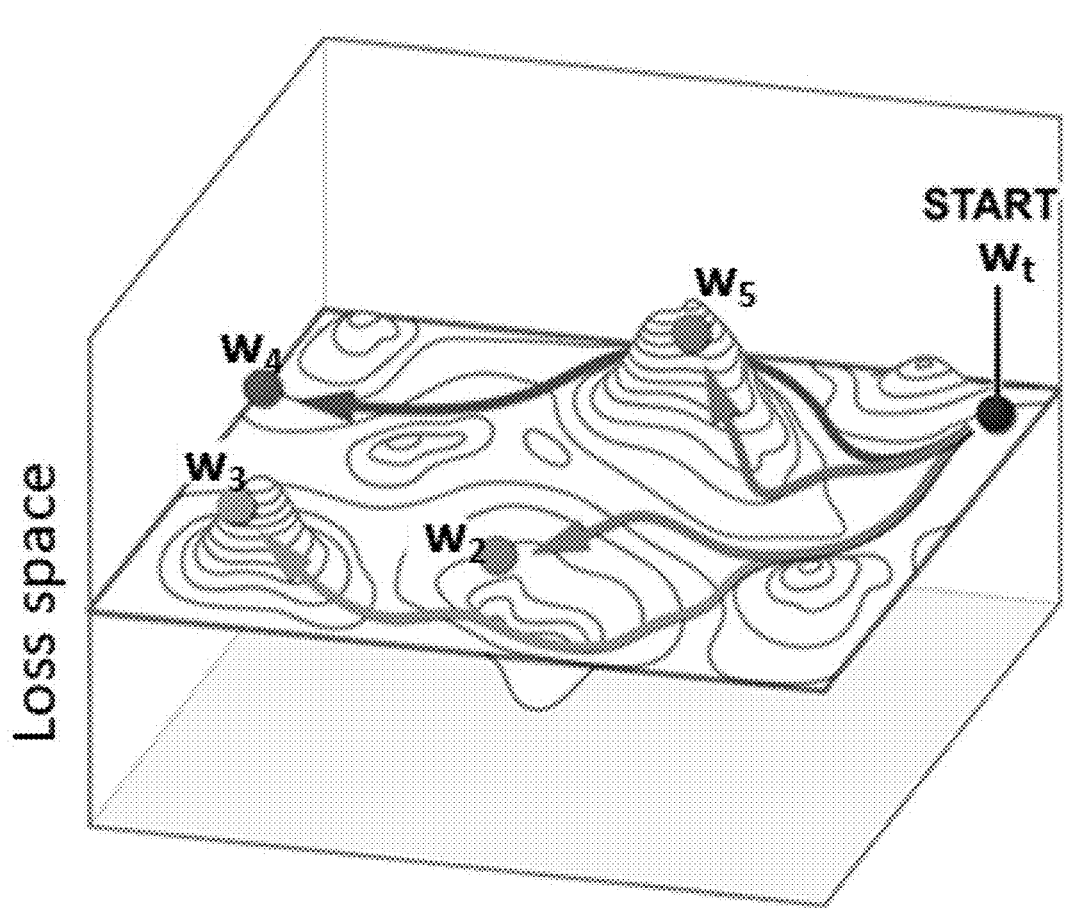

FIG. 2A illustrates the adaptation of the geodesic framework for finding functionally similar p-sparse networks by constructing a geodesic to the p-sparse subspace ($H_p$). In some embodiments, as shown in FIG. 2A, $w_t$ is the trained dense network, and $w_2$, $w_3$, $w_4$ and $w_5$ are p-sparse networks on $H_p$. Their corresponding positions in the functional space highlight the functional closeness of some p-sparse networks to the trained network over others. In FIG. 2B, p-sparse network—$w_2$ is functionally closest to $w_t$.

Figure 3:
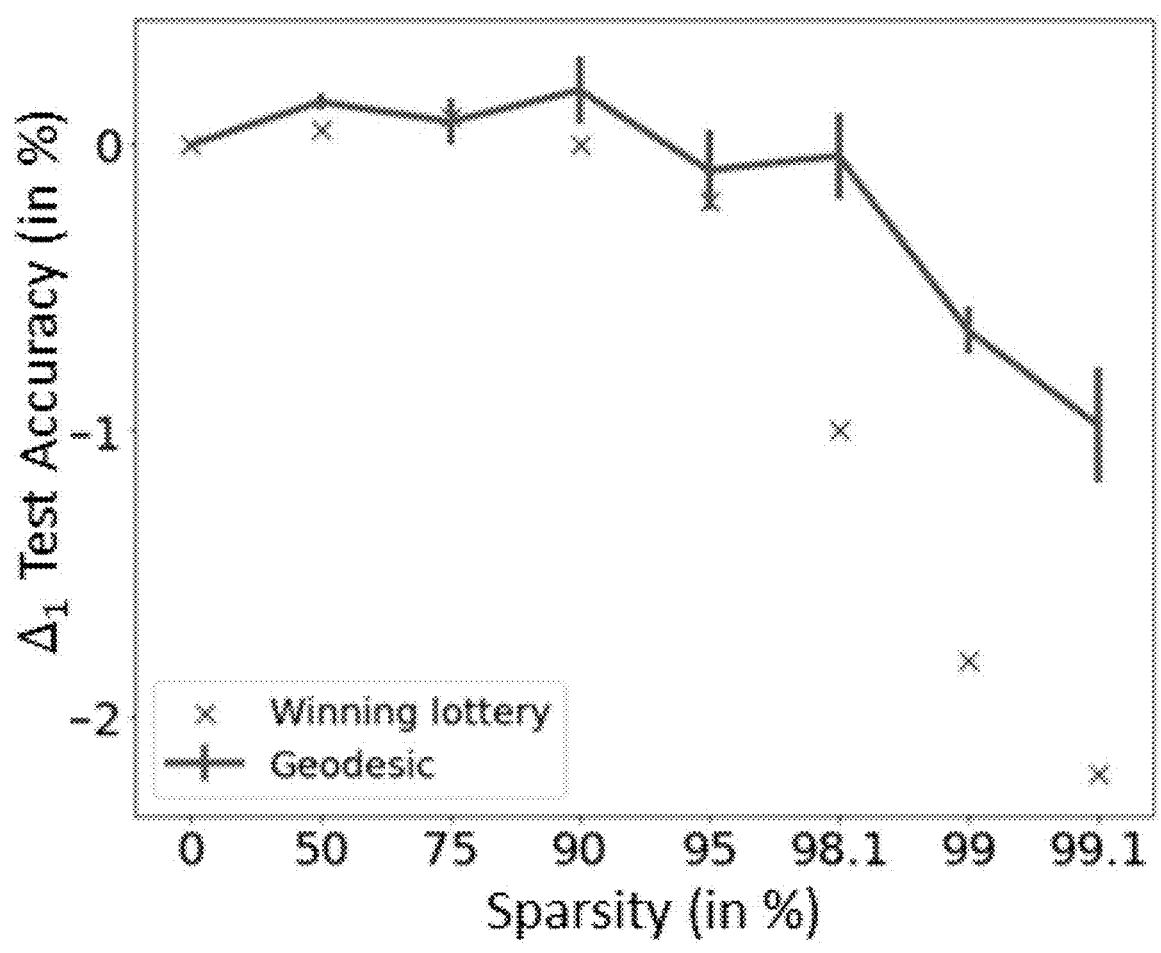
FIG. 3 shows a graph of the difference in Top-1 ($\Delta_1$) test accuracy between the discovered sparse networks and their reference dense network. A comparison with the lottery ticket hypothesis is presented.
Figure 4A:
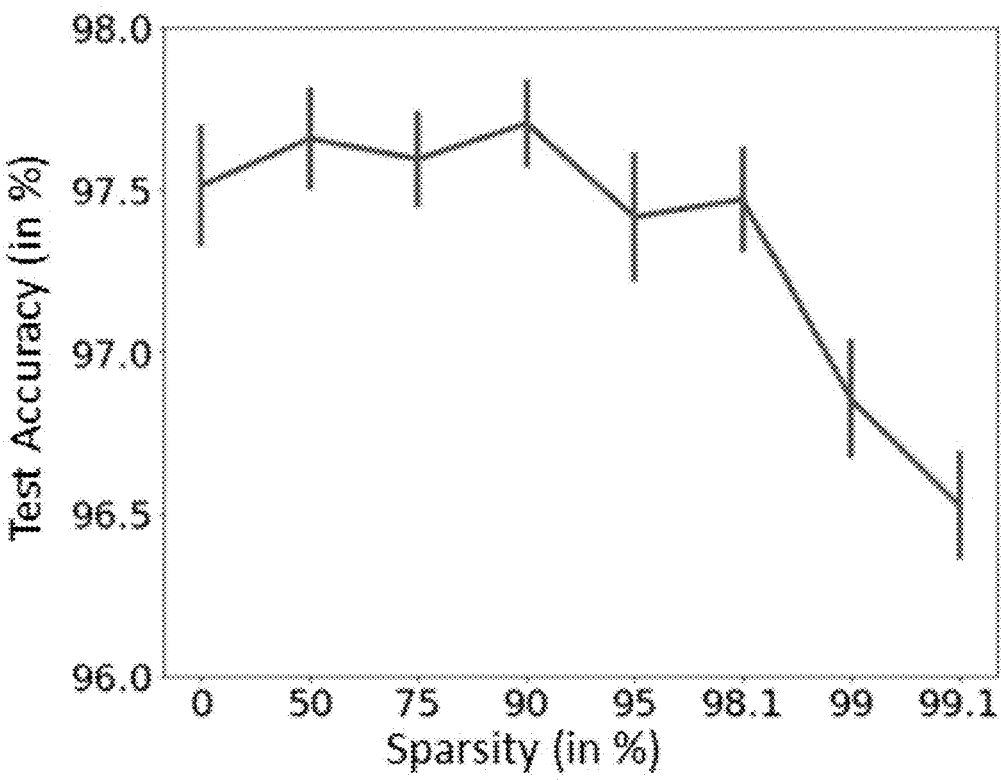
FIG. 4A-FIG. 4D depict exemplary results related to traversing geodesics to sparsify networks.

The disclosed geodesic strategy for sparsification was demonstrated on: (i) Multilayer perceptron (LeNet) trained on MNIST and (ii) VGG-11 trained on CIFAR-10. FIG. 3 shows that the geodesic strategy discovered sparse networks that performed at test accuracies comparable to the reference dense trained network $w_t$. The results (FIG. 4A) supersede the existing benchmarks for LeNet-300-100 compression reported in literature for extreme levels of sparsity. A comparison with the lottery ticket hypothesis is presented in FIG. 3.

Figure 4B:
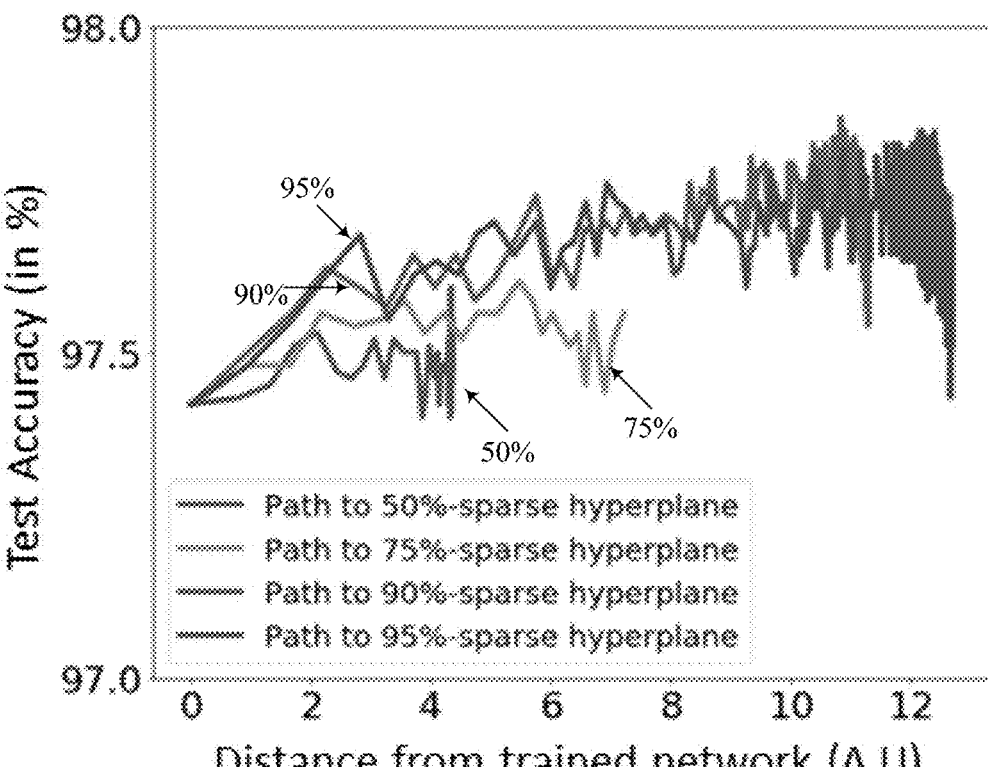

In addition to finding the p-sparse network (on $H_p$), a high-performance path connecting the dense-MLP trained on MNIST to the discovered sparse network on $H_p$ was obtained. FIG. 4B shows that path-connected networks from the dense network to $H_{50}$, $H_{75}$, $H_{90}$ and $H_{95}$ performed at an accuracy≥97%.

Figure 4C:
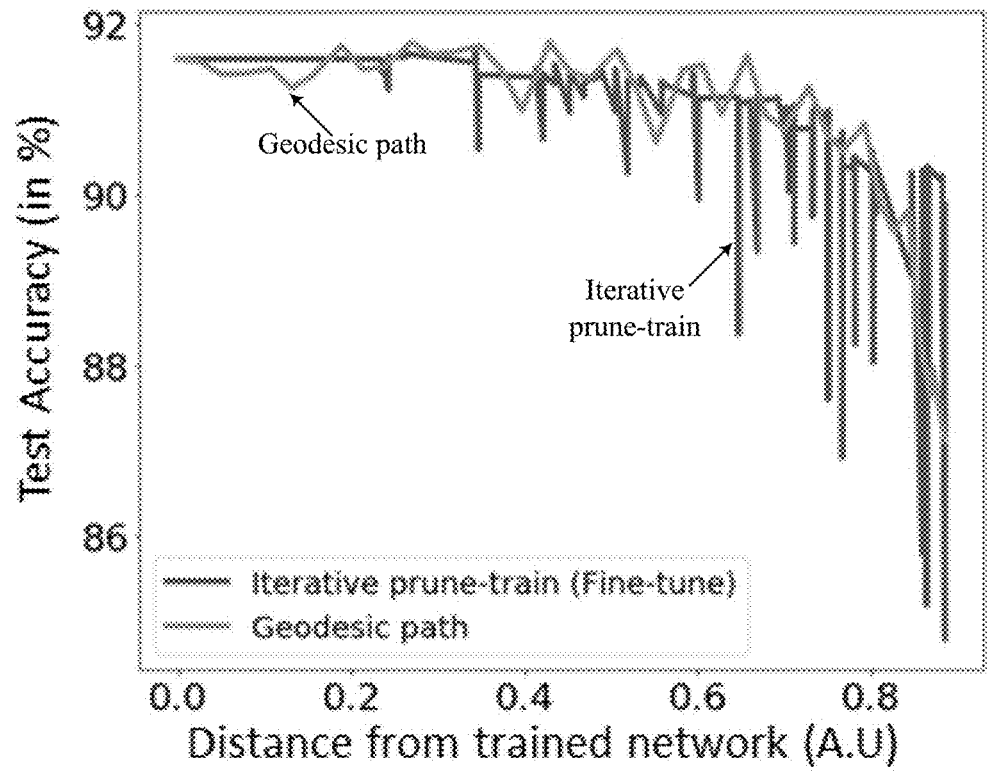
Figure 4D:
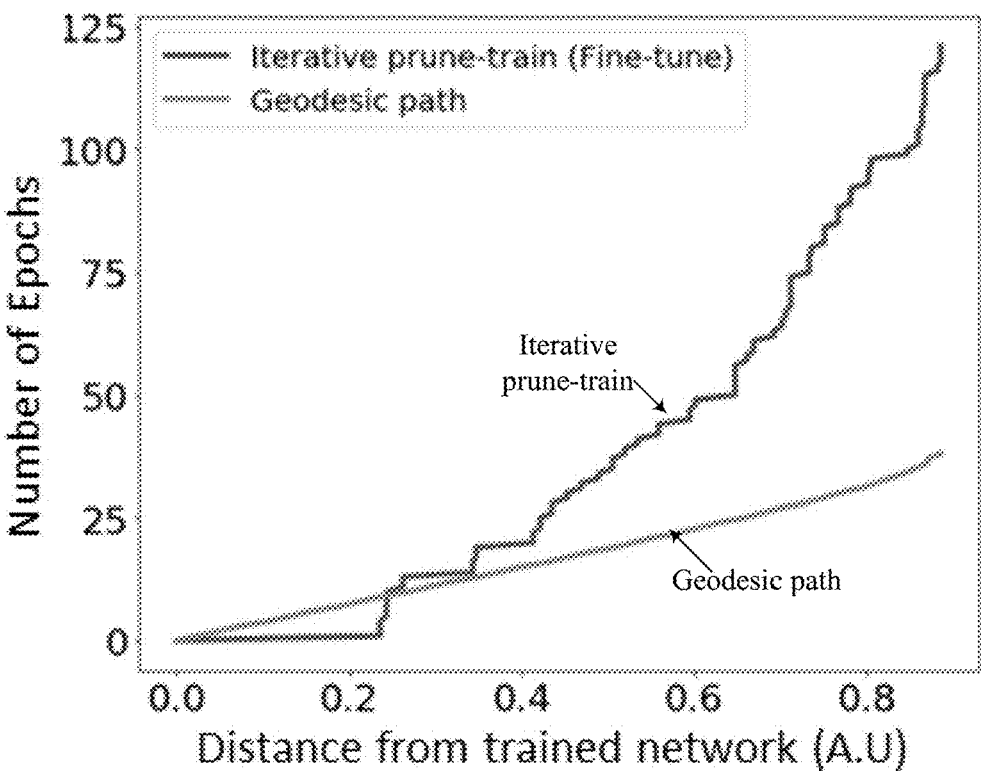

The geodesic strategy disclosed herein discovered structured sparse counterparts of VGG-11 trained on CIFAR-10. In FIG. 4C, the geodesic approach yielded high-performance paths that connect the dense-VGG11 network to its sparser counterpart wherein 50 (out of 64) cony filters from the first layer are zeroed out. The disclosed strategy was compared to traditional heuristic fine-tuning to demonstrate that the geodesic approach is both rational and computationally efficient. Specifically, an iterative prune-train cycle achieved through structured pruning of a single node at a time, coupled with SGD re-training required up to 120 training epochs to identify a sparsification path. However, the geodesic strategy found paths that quantitatively out-performed the iterative prune-train procedure and obtained these paths with only 30 training epochs (FIG. 4D).

Alleviating Catastrophic Forgetting by Traversing Geodesics

Neural networks succumb to catastrophic forgetting (CF) during sequential training of tasks because training on sequential tasks alters the weights between nodes in the neural network which are locations of "stored knowledge", resulting in the abrupt loss of "memory" of all information from previous tasks. Previous attempts to solve the problem of CF faced by deep networks was accomplished by meticulous tuning of network hyperparameters accompanied by standard regularization methods. Addressing earlier limitations, proposed elastic weight consolidation has been proposed, wherein a Fisher information matrix is evaluated to guide retraining of network on a new task.

The disclosed geodesic framework was applied in a novel fashion to mitigate CF while training networks on sequential tasks. To alleviate CF while learning k sequential tasks, the goal, in some embodiments, is to discover a network that achieves a high performance on all k tasks, given access to only one task at a time. Here, in some embodiments, task is synonymous to dataset. For instance, training a network sequentially on MNIST, followed by Fashion-MNIST constitutes two sequential tasks.

k metric tensors ($g^1$, $g^2$, . . . , $g^k$) corresponding to k sequential tasks (or datasets $-(X_1, X_2, . . . , X_k)$) can be evaluated. The metric, $g^1$ provides a local measure of the functional distance on the pseudo-Riemannian manifold ($W, g^i$), e.g., it measures the change in performance on task-i as the network moves on the weights space. In some embodiments, the disclosed geodesic approach discovers networks that perform well on sequential tasks by constructing geodesics between two locations in the weights space, one defined by network trained on the most recent task (task-i), while the other location is defined by the network trained on all previous tasks (task-1,2, . . . ,i−1). The metric $g^i$ measures the change in performance on task-i as the network moves towards a location in the weights space defined by another network trained on all previous tasks (task-1,2, . . . , i−1). Therefore, in some embodiments, the disclosed optimization strategy finds a set of path-connected networks beginning at network trained on task-i, and moving to another network trained on all previous tasks (1, 2, . . . ,i−1) with the objective of minimizing the change in performance on task-i alone. The procedure converges (One of the stopping criterion discussed above is reached—where the network makes small oscillations towards and away from the target network) at a network that performs well on all tasks (including most recent task-i) seen until then (task-1,2, . . . , i).

Figure 6A:
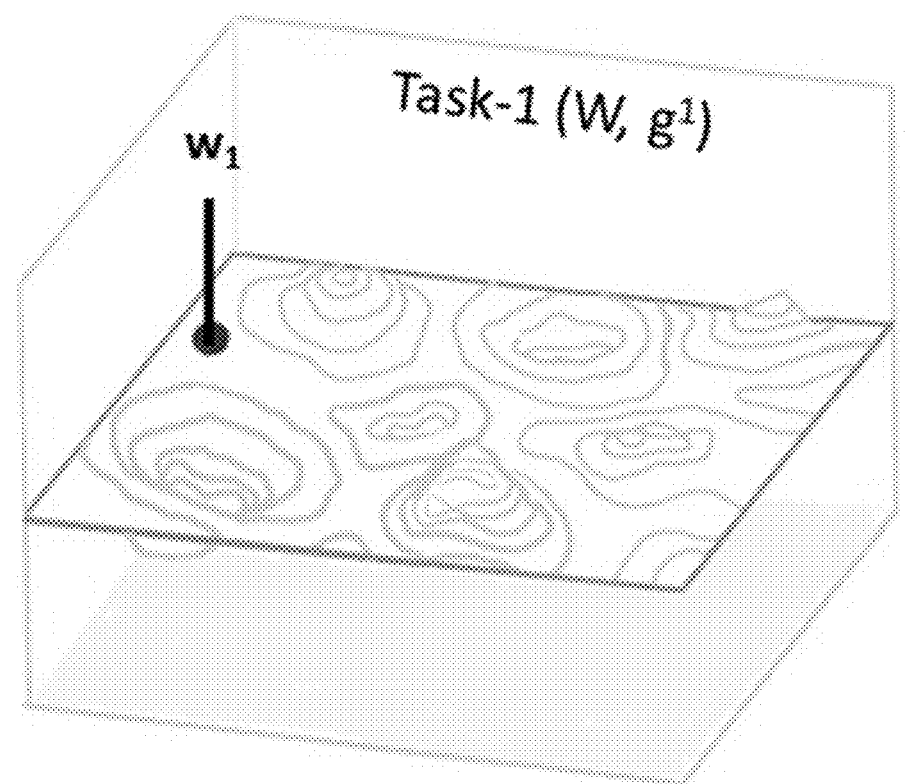
FIG. 6A-FIG. 6B show an exemplary framework for mitigating catastrophic interference via geodesics.
Figure 6B:
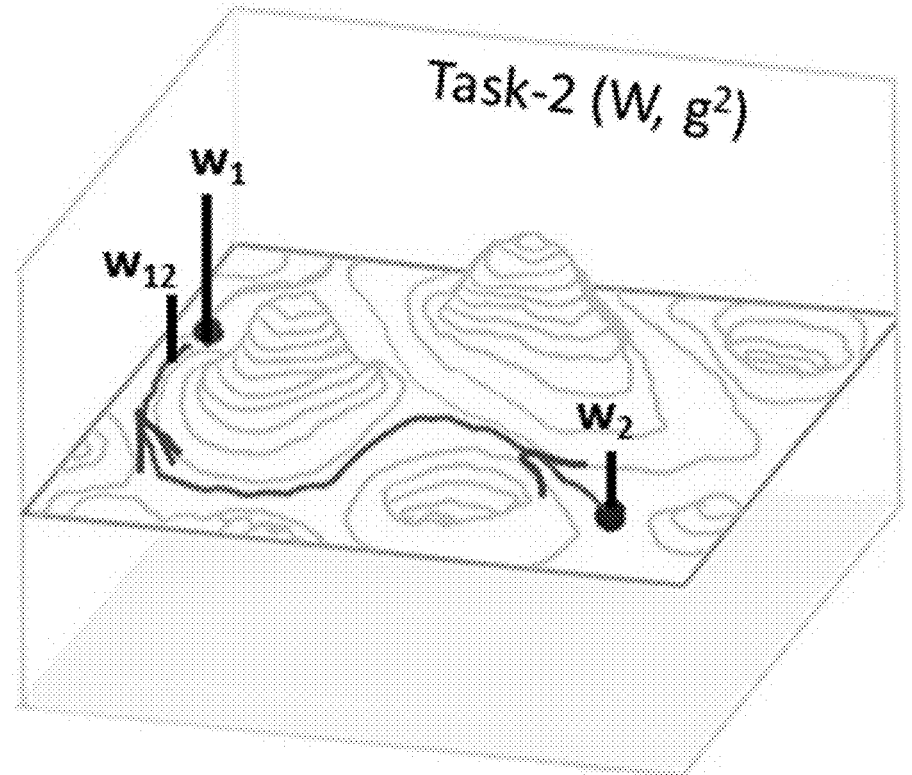

In FIG. 6A-FIG. 6B, the disclosed framework for learning two sequential tasks is illustrated in action. Two different networks can be trained on the sequential tasks one after the other to get $w_1$ and $w_2$ trained on task-1,2 respectively. Subsequently, the geodesic on the networks weights space can be computed, beginning from $w_t=w_2$, network trained on task-2 by traversing the manifold ($W, g^2$) towards the target network $w_a=w_1$, network trained on task-1. The metric $g^2$ can measure the change in performance on task-2 as the network moves towards a location in the weights space defined by the network trained on the first task. The procedure can converge at a network $w_{1,2}$ that performs well on both tasks.

ALGORITHM 1.2
ALLEVIATING CF: LEARNING k SEQUENTIAL TASKS VIA GEODESICS

| | | Notes |
|---|---|---|
| 1: | Train net on Task-1 ($w_1$) | Train random network on Task-1 |
| 2: | Set i = 2 | Update to Task-2 |
| 3: | while i ≤ k do | Iterate procedure for k tasks |
| 4: | Train net on Task:i ($w_i$) | Train random network on latest task |
| 5: | $w_p = w_{1:i−1}$ | $w_p$ := network that performs well on all previous tasks: task:(1, 2, . . . , i − 1) |
| 6: | g = $g^i$ | Compute metric tensor for most recent task (task-i) |

-continued

| ALGORITHM 1.2 |
| --- |
| ALLEVIATING CF: LEARNING k SEQUENTIAL TASKS VIA GEODESICS |

| | | Notes |
| --- | --- | --- |
| 7: | $\gamma(t) \leftarrow Geo(w_i, g, w_p, N_s)$ | Constructing geodesic path |
| 8: | $w_p \leftarrow \gamma(1)$ | Terminal net of geodesic performs well on all tasks |
| 9: | Set i = i + 1 | Moving on to the next task |

The disclosed geodesic framework was applied to the classic permuted-MNIST task, wherein every new task corresponds to a (fixed) unique permutation of the input pixels of the MNIST dataset. For k tasks, k permuted MNIST datasets were used. The Lenet-MLP (784-300-100-10) architecture was used to test the disclosed framework on sequential learning of permute-MNIST tasks.

Figure 5A:
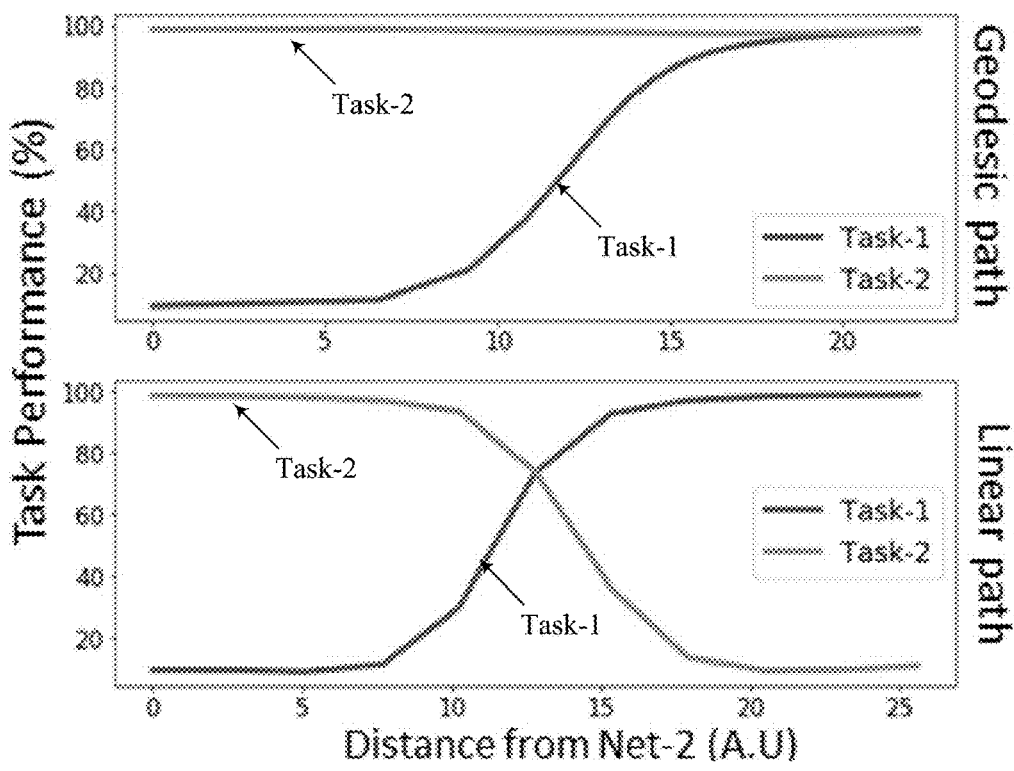
FIG. 5A-FIG. 5F depict exemplary data related to sequential permuted-MNIST tasks.
Figure 5B:
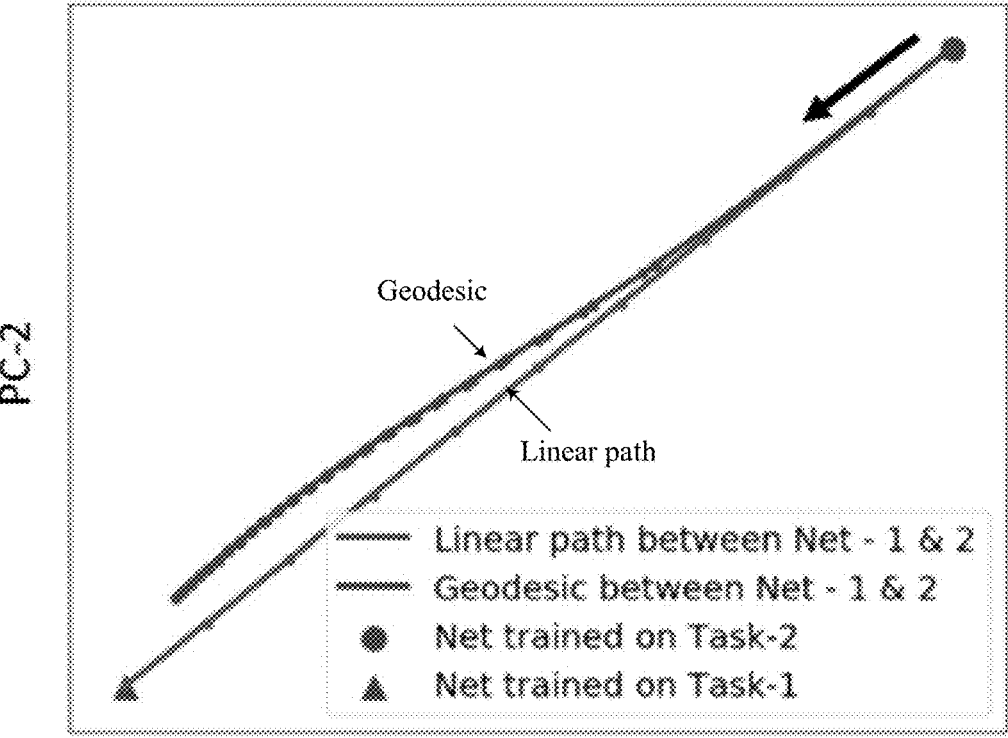
Figure 7A:
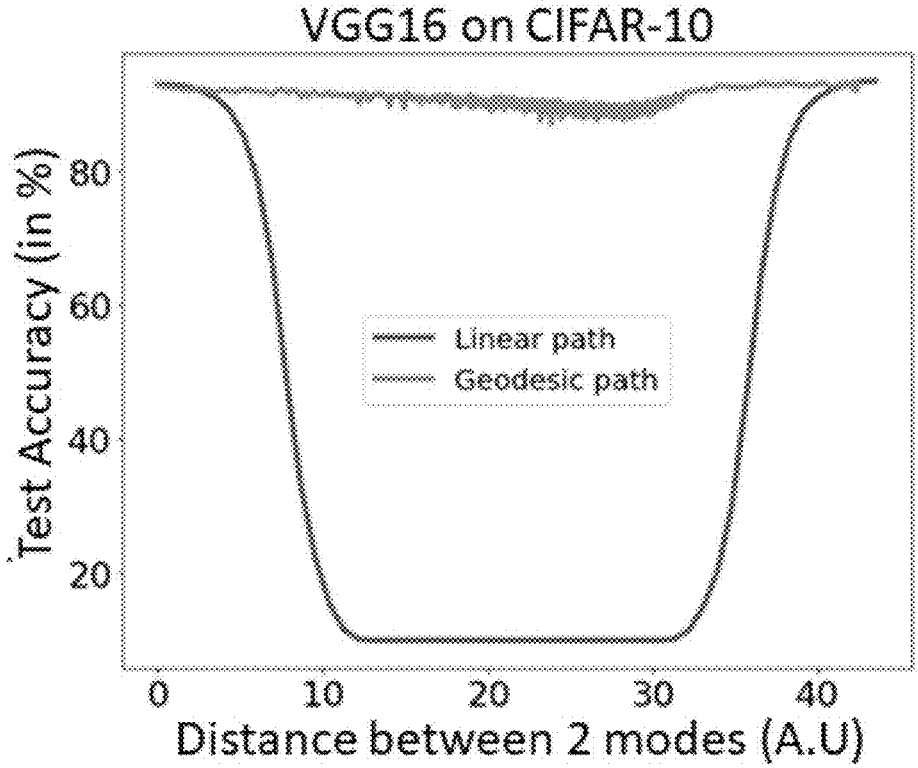
FIG. 7A-FIG. 7C depict data related to discovering high performance paths connecting network modes.
Figure 7B:
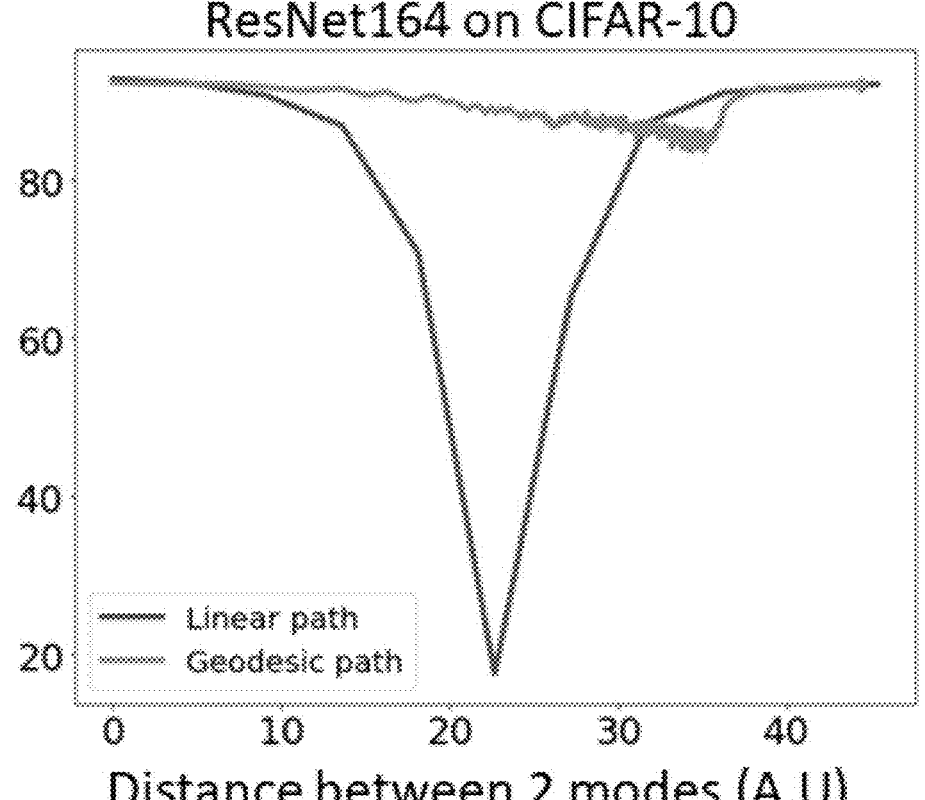
Figure 7C:
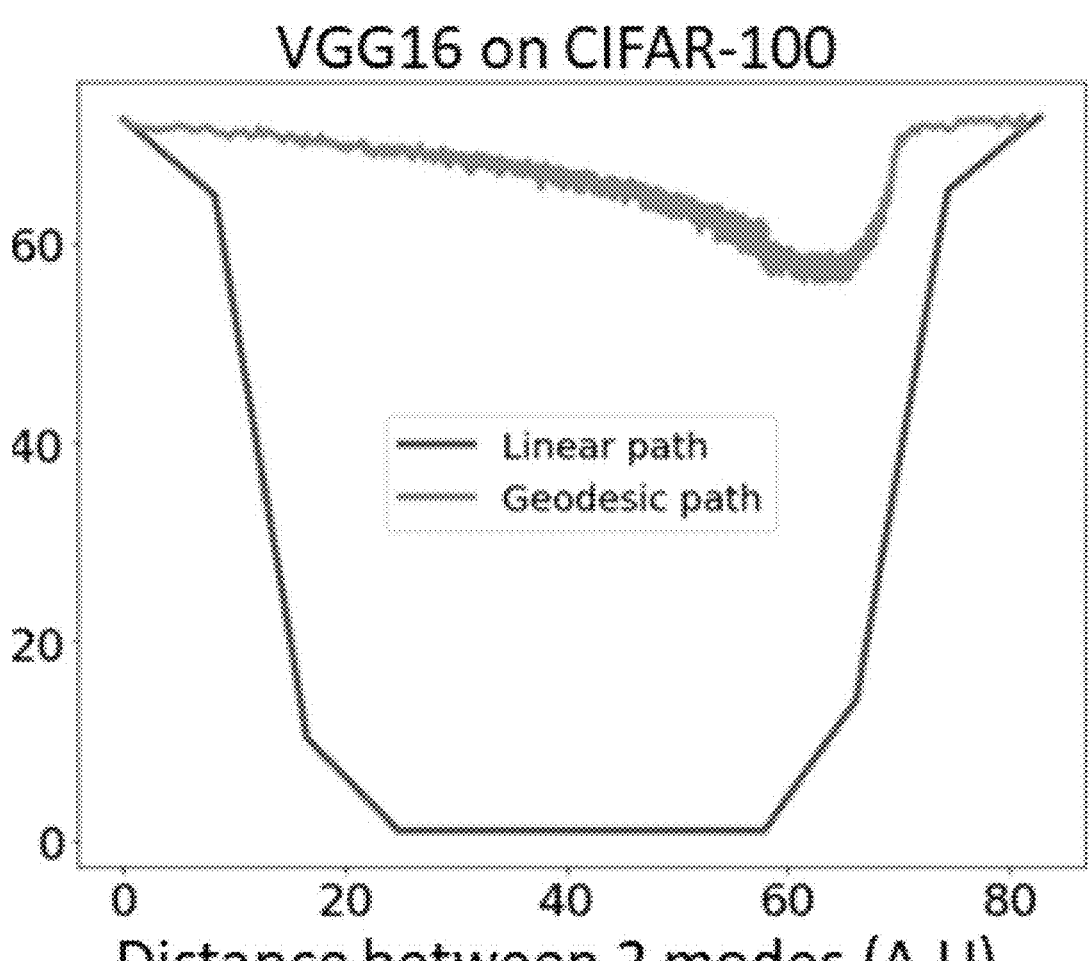

To highlight the performance of the presently disclosed optimization strategy, the geodesic path was compared with the linear path between two locations in weights space: one defined by the network trained on the latest task, while the other trained on all previous tasks—obtained by iterative application of the optimization strategy. FIG. 5A shows that a wide range of network architectures and datasets. For each model and dataset chosen, two networks were trained with different random initializations to find two modes, corresponding to two optima in the loss landscape ($w_1$, $w_2$). Subsequently, $Geo(w_1, g, w_2)$ constructed a geodesic starting from the first mode $w_1$ to the target network (second mode) $w_2$, while minimizing functional difference of networks along the path on the task (CIFAR-10/100 classification), using metric tensor g computed on the same task. In FIG. 7A-FIG. 7C contrast of the high-performance path obtained from the optimization strategy from the linear path that connects the two modes of (FIG. 7A) VGG-16 on CIFAR-10, (FIG. 7B) ResNet-164 on CIFAR-10 and (FIG. 7C) VGG-16 on CIFAR-100 is shown.

| ALGORITHM 1.3 |
| --- |
| DISCOVERING HIGH PERFORMANCE PATHS |
| CONNECTING MODES OF DEEP NETWORKS |

| | | Notes |
| --- | --- | --- |
| 1: | Train deep network 1 ($w_1$) | Training deep network with random seed 1 |
| 2: | Train deep network 2 ($w_2$) | Training deep network with random seed 2 |
| 3: | $\gamma(t) \leftarrow Geo(w_1, g, w_2)$ | Geodesic from $w_1$ to $w_2$ | the network discovered along the geodesic path performs well on both tasks, and is much better than the ones uncovered by the linear path.

Figure 5C:
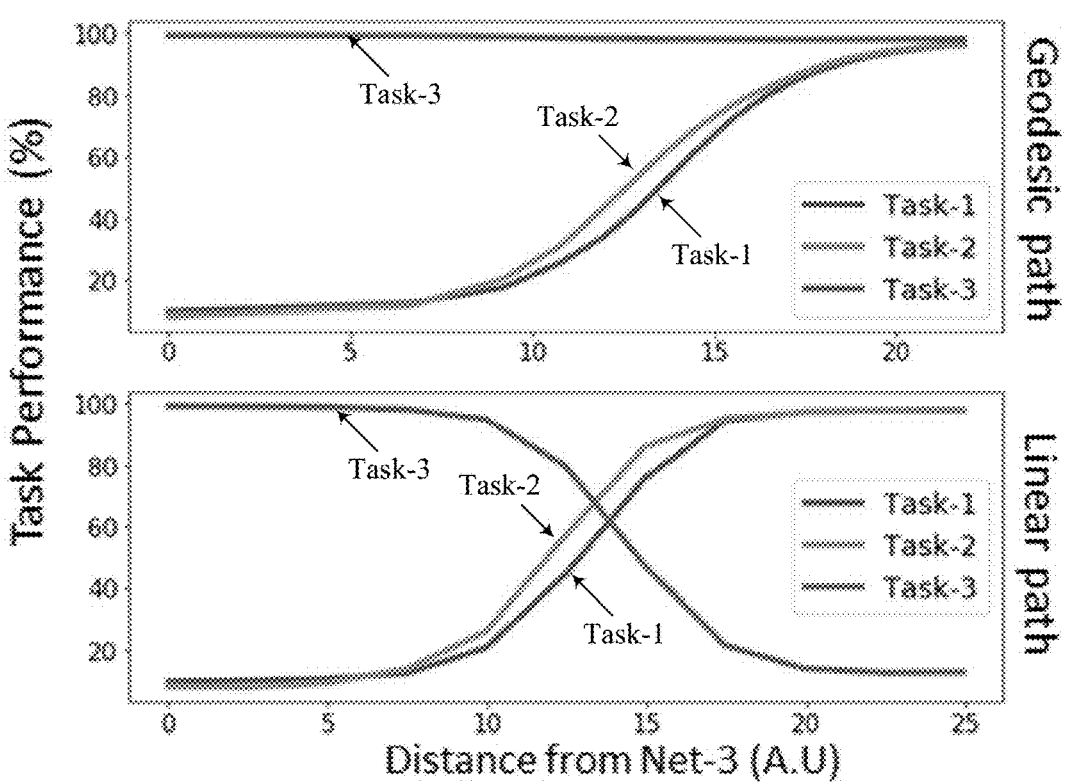
Figure 5D:
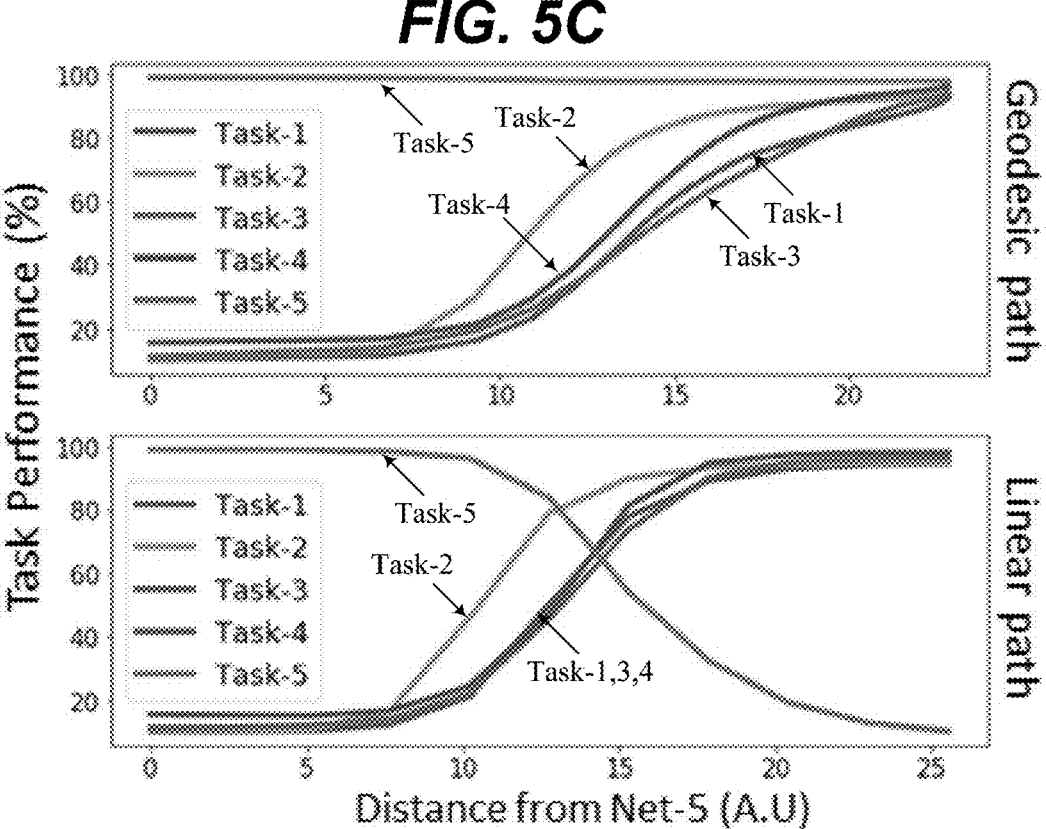
Figure 5E:
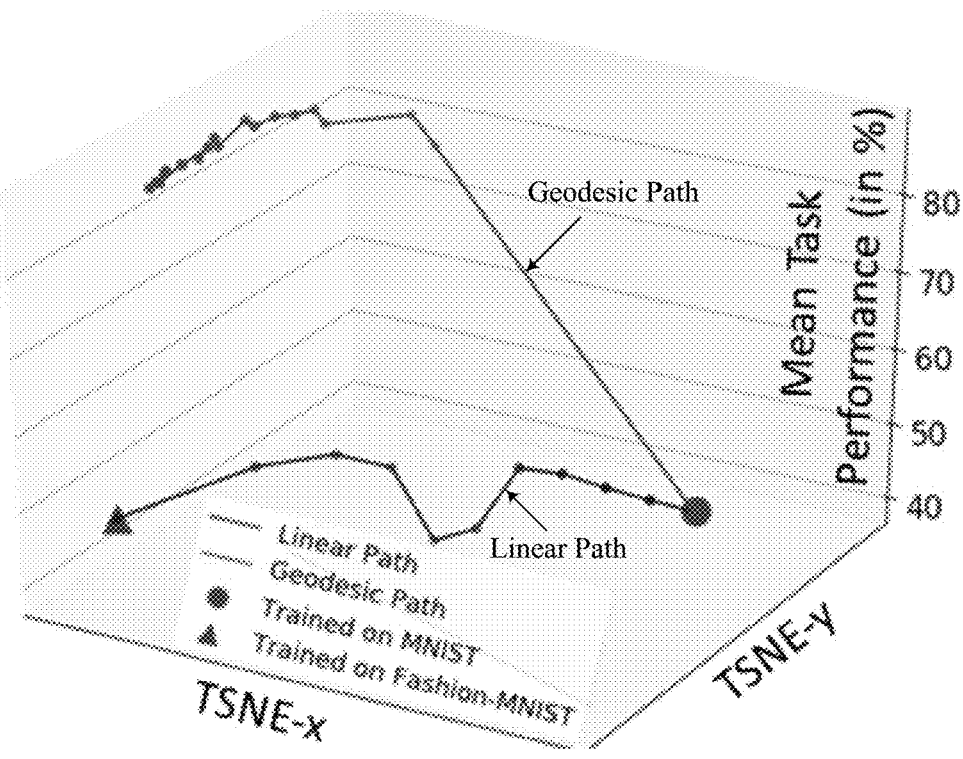
Figure 5F:
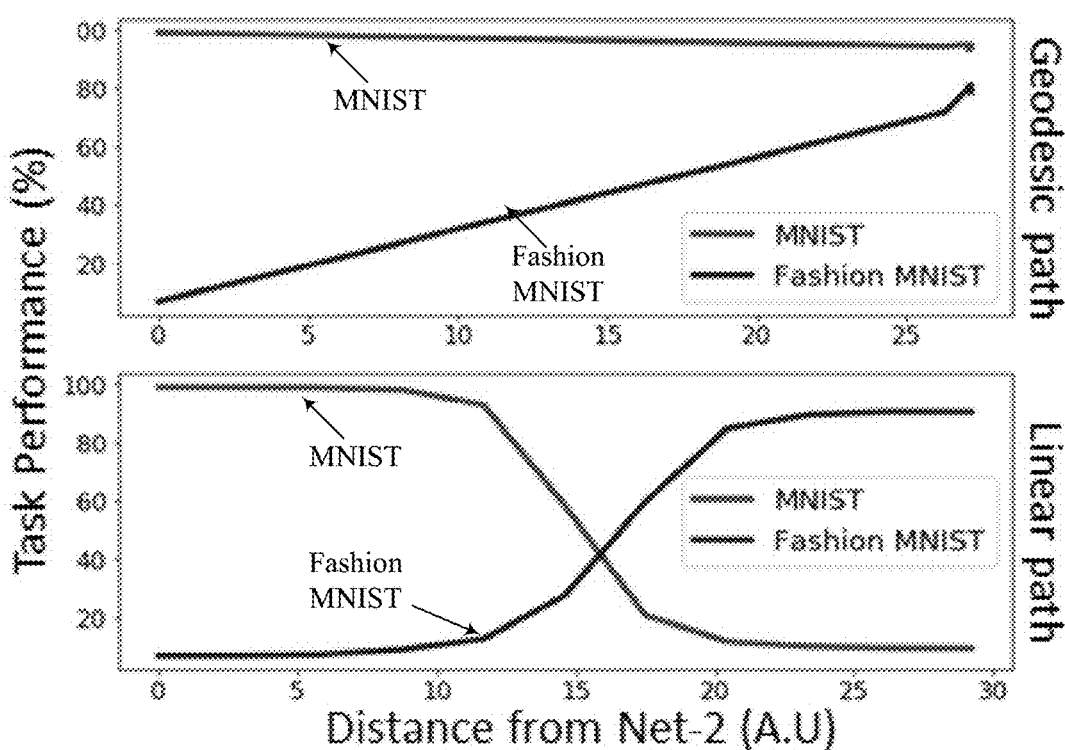

The strategy can be scaled up to an arbitrary number of tasks. FIG. 5C-FIG. 5D show 5 permuted-MNIST tasks learned sequentially without facing CF. The results show improved performance over strategies like SGD with dropout regularization and SGD with L2 regularization proposed earlier and is comparable to EWC (Note that EWC uses a large neural network with up to 1000 nodes for 3 task analysis, while the networks disclosed herein use only 400 for 5 tasks). The analysis was extended to CNN's trained on 2 different datasets (tasks): MNIST and Fashion-MNIST (FIG. 5E-FIG. 5F).

Achieving Mode Connectivity Via Geodesics

The disclosed geodesics framework was applied to discover high-performance paths for connecting different instances of trained DNN's (modes). As the loss landscape of DNNs are non-convex, can rely on millions of parameters, and are studded with a large number of local optima and saddle points, it makes the search for discovering high performance paths between the two modes of DNN's challenging. It is also observed that the linear path connecting the modes incurs high loss implying the presence of isolated local optima in the loss landscape.

Experiments were performed on VGG16 trained on CIFAR-10, CIFAR-100 and 164-layer ResNet bottleneck trained on CIFAR-10. These models and datasets were chosen to demonstrate that the disclosed algorithm works on

Discussion

Described herein is a mathematical framework to construct global paths for navigating the space of neural networks to discover novel networks that have high task-performance while satisfying additional constraints on task-independent network properties. The disclosed framework is capable for solving at least 3 major problems in ML: (i) Network sparsification, (ii) Mitigation of catastrophic interference when learning sequential tasks, and (iii) Finding high-accuracy paths to connect modes of deep networks. With AI being built into many critical applications, the need for real-time processing and continuous learning on personal devices is on the rise. The presently disclosed algorithm can be used for catering to this need. In some embodiments, local processing on personal devices increases data security for the user as information remains local, without having to be streamed to the cloud.

Engineering Flexible Machine Learning Systems by Traversing Functionally Invariant Paths in Weight Space Deep neural networks achieve human-like performance on a variety of perceptual and decision making tasks. However, deep networks perform poorly when confronted with changing tasks or goals, and broadly fail to match the flexibility and robustness of human intelligence. Described herein are mathematical and algorithmic frameworks that enable continual training of deep neural networks on a broad range of objectives by defining path connected sets of neural networks that achieve equivalent functional performance on a given machine learning task while modulating network weights to achieve high-performance on a secondary objective. The weight space of a neural network can be viewed as a curved Riemannian manifold and a neural network can be moved along a functionally invariant path in weight space while searching for networks that satisfy a secondary objective. Described herein is a path-sampling algorithm that trains networks with millions of weight parameters to learn a series of image classification tasks without performance loss. In some embodiments, the algorithm generalizes to accommodate a range of secondary objectives including weight-pruning and weight diversification and exhibits state of the art performance on network compression and adversarial robustness benchmarks. It is disclosed herein how the intrinsic geometry of machine learning problems can be harnessed to construct flexible and robust neural networks.

Artificial neural networks can now out-perform humans on tasks ranging from image recognition and game playing, to predicting three-dimensional structures of proteins. However, in many respects, artificial neural networks fail to replicate the flexibility and robustness that are defining features of human intelligence. Humans can learn new tasks and accommodate novel goals with minimal instruction and without loss of performance on existing tasks. Unlike humans, deep neural networks suffer significant performance decay when trained to perform additional tasks or integrate new information, a phenomenon known as catastrophic forgetting. For example, a network trained to recognize images of hand-written digits will 'forget' the digit recognition task when trained to recognize additional objects like letters or faces. In addition to well-known flexibility limits, deep neural networks have other pathologies, like vulnerability to targeted corruption of input data or adversarial fragility. Small, imperceptible changes in the input data can cause complete failure of network performance, a phenomenon known as adversarial fragility.

The current limitations of deep learning present challenges for the application of deep neural networks in industrial settings that require neural networks to adapt to changing data streams and to be robust to perturbation and corruption of input data. Fundamentally, the disparity between biological and artificial neural networks motivates the development of theoretical frameworks that define underlying principles and circuit architectures that enable flexibility and robustness in both artificial and natural systems. While a range of specialized algorithms have emerged to separately address challenges like catastrophic forgetting and adversarial fragility in artificial neural networks, the strategies are often heuristic and specific and do not explain the missing principles of intelligence to more broadly address known limits of deep learning. Conceptual and mathematical frameworks that provide a unified perspective on the pathologies of deep learning would provide new insights into the mathematical principles of flexible intelligence in both machines and humans.

In artificial neural networks, network function is encoded in the mathematical weights that determine the strength of connections between neural units (FIG. 8A-FIG. 8D). Modern deep learning procedures train multi-layered neural networks to solve problems by performing gradient descent to adjust the weights of a network based on a mathematical function known as an objective function that encodes the performance of a network on a specific task. Standard learning methods, like back-propagation and gradient descent, adjust network weights to define a single, optimal weight configuration to maximize performance on a task specific objective function using training data. Training the network on new tasks through the traditional paradigm of stepping along the gradient of the task-specific objective function adjusts the networks' weights, inevitably resulting in the loss of information from previous tasks.

The weight adjustment problem underlies other challenges in modern machine learning. As an example, in many applications it is advantageous to prune or sparsify a network to minimize the number of non-zero weights and thus reduce the memory and power consumption of a network. Just like multi-task learning, network sparsification requires the adjustment of network weights while maintaining function, and sparsification procedures often proceed through heuristic weight pruning strategies. In the case of adversarial robustness, a central goal is to identify ensembles of networks that perform a task with distinct weight configurations and thus avoid vulnerabilities associated with a single weight configuration.

Unlike contemporary artificial neural nets, neural networks in the human brain, which are well known ingredients of natural intelligence, perform multiple functions and can flexibly switch between different functional configurations based on context, goals or memory. Neural networks in the brain are hypothesized to overcome the limitations of a single, optimal weight configuration and perform flexible tasks by continuously 'drifting' their neural firing states and neural weight configurations, effectively generating large ensembles of degenerate networks. Fluctuations might enable flexibility in biological systems by allowing neural networks to explore a series of network configurations while responding to sensory input.

Inspired by the notion of network ensembles, there is disclosed herein a geometric framework and algorithm to construct path connected sets of neural networks that solve a given machine learning task. By building sets of networks rather than single networks, networks that accommodate a secondary goal can be searched for within an ensemble of weight space. The central conceptual shift is that path-connected sets of neural networks can be considered, rather than single-networks (isolated points in weight space) to be the central objects of study and application. A core algorithm is disclosed herein for identifying sets of networks that solve a given machine learning problem and search within the set to identify networks that accommodate secondary tasks without loss of functional performance. Previous work has demonstrated that large models often contain significant parameter degeneracy, and the disclosed path ensembles exploit weight degeneracy in neural networks to create functionally similar networks with distinct internal weights.

A neural networks' weight space can be viewed as a pseudo-Riemannian manifold equipped with a distance metric that represents task performance. Rather than focusing on single, optimal networks, one can move along the Riemannian manifold to identify path connected sets of networks that minimize the change in functional performance on one task while simultaneously capturing a secondary objective. The "search" for a suitable network can be formalized as a dynamic movement on the curved pseudo-Riemannian manifold. In some embodiments, the path-sampling algorithm identifies functionally invariant paths in weight space that maintain network performance while 'searching-out' for other networks that satisfy additional objectives like sparsification or mitigating catastrophic interference. The section titled "Engineering flexible machine learning systems by traversing functionally invariant paths in weight space" demonstrates that the path sampling algorithm achieves state of the art performance on three core challenges: sequential task learning, network sparsification, and adversarial robustness. In each case, the path-sampling algorithm achieves state of the art results on large networks with millions of parameters obtaining performance similar to domain-specific approaches.

Using the framework, three core challenges in modern machine learning can be cast within the language of differential geometry to develop a single, unified theoretical and algorithmic framework to address all three challenges. Beyond the algorithmic results, there is provided herein a mathematical framework that unifies a variety of contemporary machine learning problems in a single, geometric language. As described herein, each deep learning pathology has a geometric interpretation as finding a path that minimizes distance traveled along a curved manifold while also following the flow field defined by a secondary goal. In some embodiments, the disclosed methods motivate the search for biological strategies for allowing networks to explore path-connected sets through weight fluctuations or explicit weight modulation of perceptual networks by higher level networks. In some embodiments, the geometric perspective can provide a unified framework for linking distinct problems associated with understanding mechanisms of intelligence, both natural and artificial.

Construction of Functionally Invariant Paths in Neural Network's Weight Space Provided herein is a mathematical framework to quantify how the output of an artificial network changes as the network's weights are adjusted. The framework can be applied to explore path-connected sets of neural networks that have divergent weight values but similar output on training data. To construct path-connected neural network ensembles, the weight-space of a neural network can be viewed as a Riemannian manifold equipped with a local distance metric. In some embodiments, Riemannian manifolds are used in physics and geometry to study the properties of curved spaces and to formalize notions of distance, velocity, and acceleration on curved manifolds. In some embodiments, a distance metric can be constructed on weight space that measures the change in the output of a network given infinitesimal changes in network weights. By using basic notions from differential geometry, paths can be constructed through weight space that maintain the functional performance of a neural network while adjusting network weights to flow along a secondary goal. While the secondary goal can be general, the secondary goal can be initially considered to be performance on additional classification tasks. For instance, a neural network can be converted that only recognizes hand-written digits to a network that can recognize both, digits (MNIST) and images of garments (Fashion-MNIST).

Figures 8A, 8B:
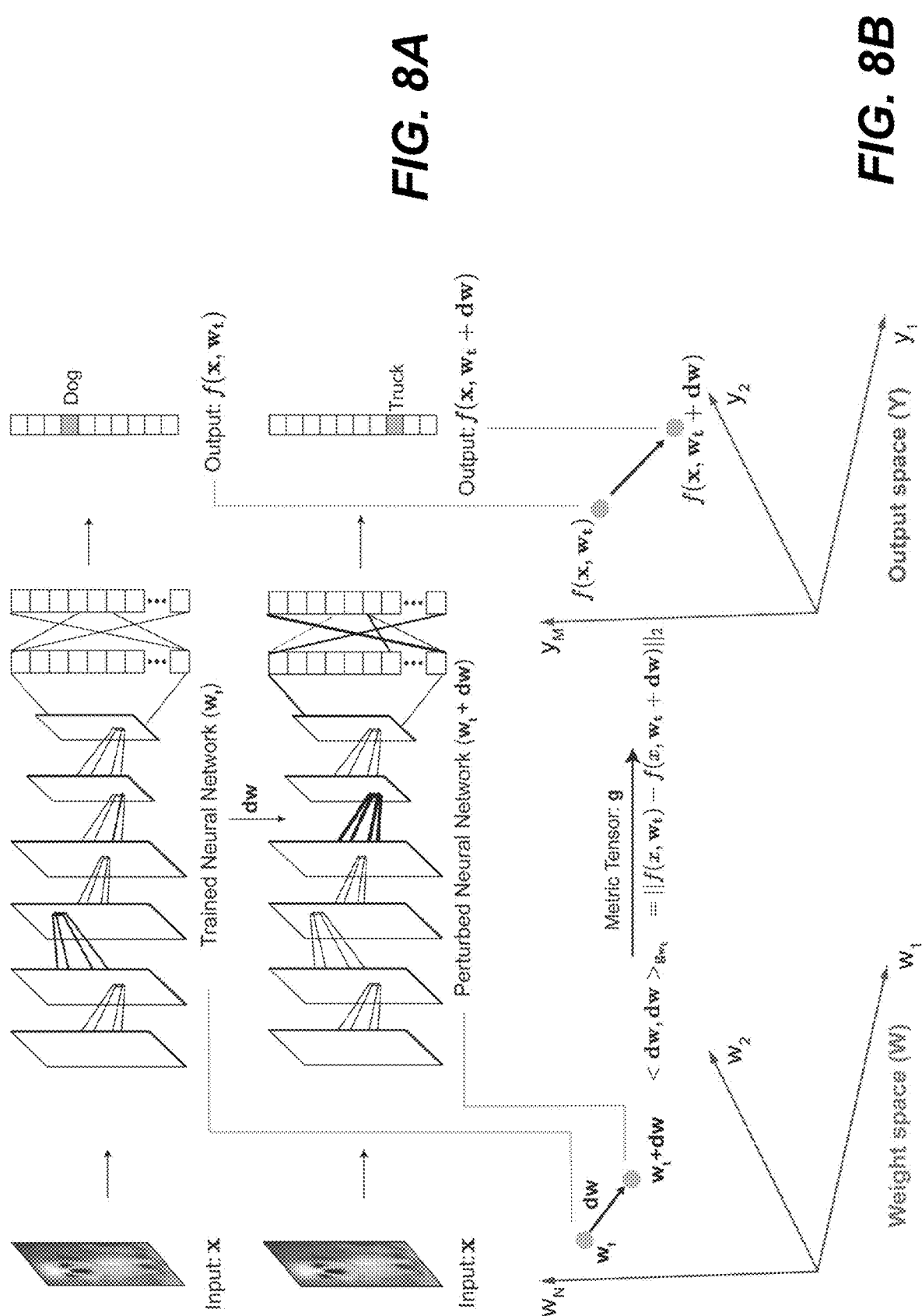
FIG. 8A-FIG. 8D depict non-limiting exemplary embodiments of a geometric framework for constructing functionally invariant paths (FIP) in weight space.
Figure 8C:
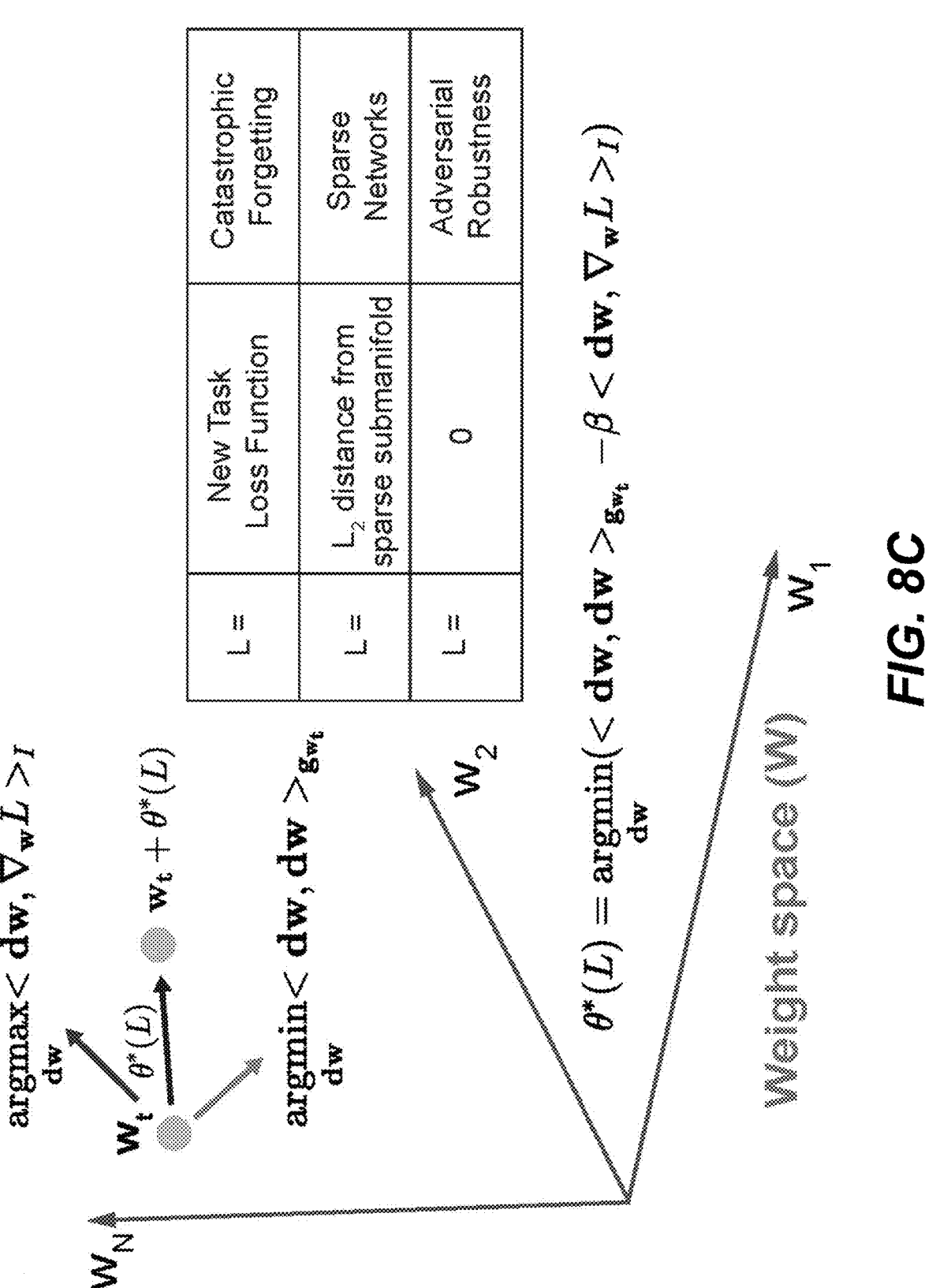
Figure 8D:
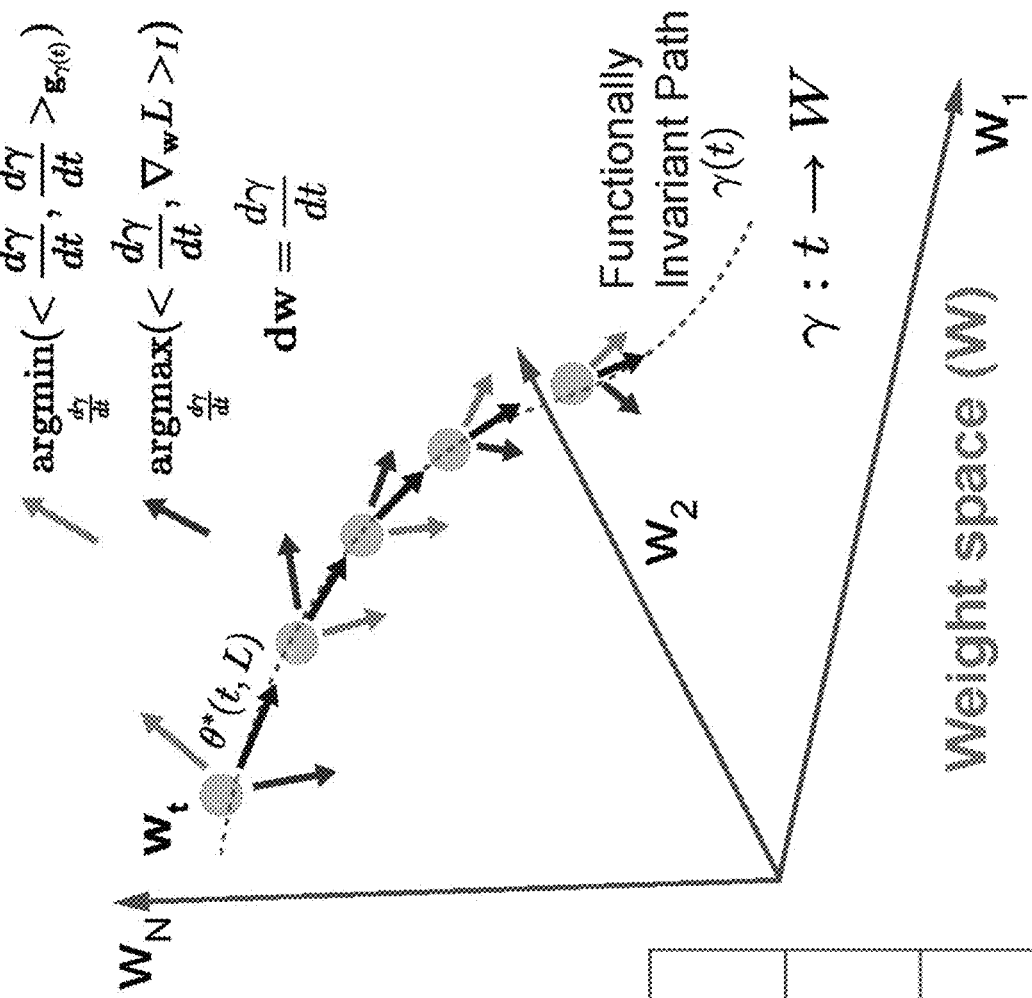

In some embodiments, the defining feature of a Riemannian manifold is the existence of a local distance metric. A distance metric can be constructed in weight space that defines the distance between two nearby networks to be their difference in output. A neural network can be considered to be a smooth function, f(x; w), that maps an input vector, $x \in \mathbb{R}^k$, to an output vector, f(x; w)=$y \in \mathbb{R}^m$, where the map is parameterized by a vector of weights, $w \in \mathbb{R}^n$, that are typically set in training to solve a specific task. W=$\mathbb{R}^n$ can be referred to as the weight space of the network, and $\mathcal{Y} = \mathbb{R}^m$ can be referred to as the output space as shown in FIG. 8B. For pedagogical purposes, the action of f is considered on a single input, x. In some embodiments, results extend naturally to an arbitrary number of inputs $x_i$.

Initially, it can be asked how the output, f(x; w), of a given neural network changes for small changes in network weights. Given a neural network with weights $w_t$, a fixed input x, the output of the perturbed network can be computed, $w_t$+dw for an infinitesimal weight perturbation, dw as $$f(x, w_t + dw) \approx f(x, w_t) + J_{w_t} dw, \tag{2.1}$$

where $J_{w_t}$ is the Jacobian of f(x, $w_t$) for a fixed x, $$J_{ij} = \frac{\partial f_i}{\partial w_j},$$

evaluate at $w_t$.

Thus, the total change in network output for a given weight perturbation dw is $$|f(x, w_t + dw) - f(x, w_t)|^2 = dw^T \left( J_{w_t}(x)^T J_{w_t}(x) \right) dw \tag{2.2}$$

$$\left| < dw, dw >_{g_{w_t}} \right|^2 = dw^T g_{w_t}(x) dw$$

where $g_{w_t}(x)=J_{w_t}(x)^T J_{w_t}(x)$ is the metric tensor evaluated at the point $w_t \in W$ for a single data point, x. The metric tensor is an n×n symmetric matrix that allows for computation of the change in network output for a perturbation along any direction in weight space as $$\langle dw, dw \rangle_{g_{w_t}(x)}.$$

The metric also allows for computation of the infinitesimal change in network output while moving along a path γ(t) in weight space as $$\theta(t) = \frac{d\gamma(t)}{dt}.$$

At every point in weight space, the metric allows for the discovery of directions dw that have large or small impact on the output of a network. While moving along a path in weight space, a series of neural networks are sampled over time, t. Using the metric, a notion of 'output velocity' can be defined, $$v = \frac{df(x, \gamma(t))}{dt},$$

that quantifies the distance a network moves in output space along the path. In some embodiments, 'Functionally invariant paths (FIPs)' (γ: [0,1]→W) are identified in weight space along which the output velocity is minimized for a fixed change in weight. To do so, the following optimization problem can be solved $$\theta^*(t) = \operatorname{argmin}_\gamma \left\langle \frac{d\gamma}{dt}, \frac{d\gamma}{dt} \right\rangle_{g_{\gamma(t)}} \tag{2.3}$$

27

-continued $$\text{with} \left\langle \frac{d\gamma}{dt}, \frac{d\gamma}{dt} \right\rangle_I = \epsilon$$

where a direction to perturb the network can be found, such that it is $\epsilon$ units away in the weight space (in the euclidean sense)

$$\left( \left\langle \frac{d\gamma}{dt}, \frac{d\gamma}{dt} \right\rangle_I = \epsilon \right)$$

while minimizing the distance moved in the networks' output space, given by $$\left\langle \frac{d\gamma}{dt}, \frac{d\gamma}{dt} \right\rangle_{g_{\gamma(t)}}.$$

The optimization problem is a quadratic program at each point in weight space. The metric g is a matrix that takes on a specific value at each point in weight space, and vectors $$\theta^*(t) = \frac{d\gamma(t)}{dt},$$

can be identified that minimize the change in functional output of the network.

The optimization problem can be amended with a second objective function L(x, w). Paths can be enumerated that minimize the functional velocity in the output space while moving along the gradient of the second objective ($\nabla_w L$). A path-finding algorithm can be defined that captures the trade-off between these two terms.

$$\theta^*(t, L) = \text{argmin}_{\gamma} \left( \left\langle \frac{d\gamma}{dt}, \frac{d\gamma}{dt} \right\rangle_{g_{\gamma(t)}} - \beta \left\langle \frac{d\gamma}{dt}, \nabla_w L \right\rangle_I \right) \qquad (2.4)$$

$$\text{with} \left\langle \frac{d\gamma}{dt}, \frac{d\gamma}{dt} \right\rangle_I = \epsilon$$

where now the first term, $$\left\langle \frac{d\gamma}{dt}, \frac{d\gamma}{dt} \right\rangle_{g_{\gamma(t)}},$$

identifies functionally invariant directions while the second term, $$\left\langle \frac{d\gamma}{dt}, \nabla_w L \right\rangle_I,$$

biases the direction of motion along the gradient of a second objective. When L=0, the algorithm merely constructs paths in weight space that are approximately isofunctional, i.e. the path is generated by steps in the weight space comprising of networks with different weight configurations while preserving the input-output map. L(x, w) can also represent the loss function of a second task, for example a second input classification problem. In this case, vectors are identified that simultaneously maintain performance on an existing task (via term 1) while also improving performance on a second task by moving along the negative gradient of the second task loss function, $\nabla_w L$.

To approximate the solution to Equation 2.2, in large neural networks, a numerical strategy was developed that samples points in an $\epsilon$ ball around a given weight configuration, and then performs gradient descent to identify vectors $\theta^*(t)$. In some embodiments, the metric formulation can be extended to cases where a set of N training data points are considered, X, and g is viewed as the average of metrics derived from individual training examples. $g_w=$ $$g_w(X) = \sum_{i=1}^{N} g_w(x_i)/N$$

. The metric, g, provides a local measure of output distance on the Riemannian manifold (W, $g_w$) . At each point in weight space, the metric defines the length, $\langle dw, dw \rangle_{g_w}$, of a local perturbation by its impact on the functional output of the network (FIG. 8B).

Functionally Invariant Paths Alleviate Catastrophic Forgetting

The geometric framework described herein was applied to a series of catastrophic forgetting problems. Catastrophic forgetting (CF) problems have important applications in industrial settings where it is often advantageous to extend an existing neural network to accommodate additional labels or training data while maintaining its ability to perform an existing function. A series of algorithms including the elastic weight consolidation (EWC), Gradient Episodic memory (GEM), and Optimal Relevance Mapping (ORM) have been developed to address CF. The geometric algorithm allows for extension of current strategies to achieve high performance on CF problems and also to address a series of CF problems through iteration of the method. In some embodiments, in the CF problems, a goal is to modulate the weights of an existing neural network to achieve high performance on an additional classification task while maintaining performance on earlier tasks. While the algorithm can be general, described herein is an application in the context of image classification tasks as a canonical setting for analyzing deep learning algorithms generally and the phenomena of CF specifically.

Figure 9A:
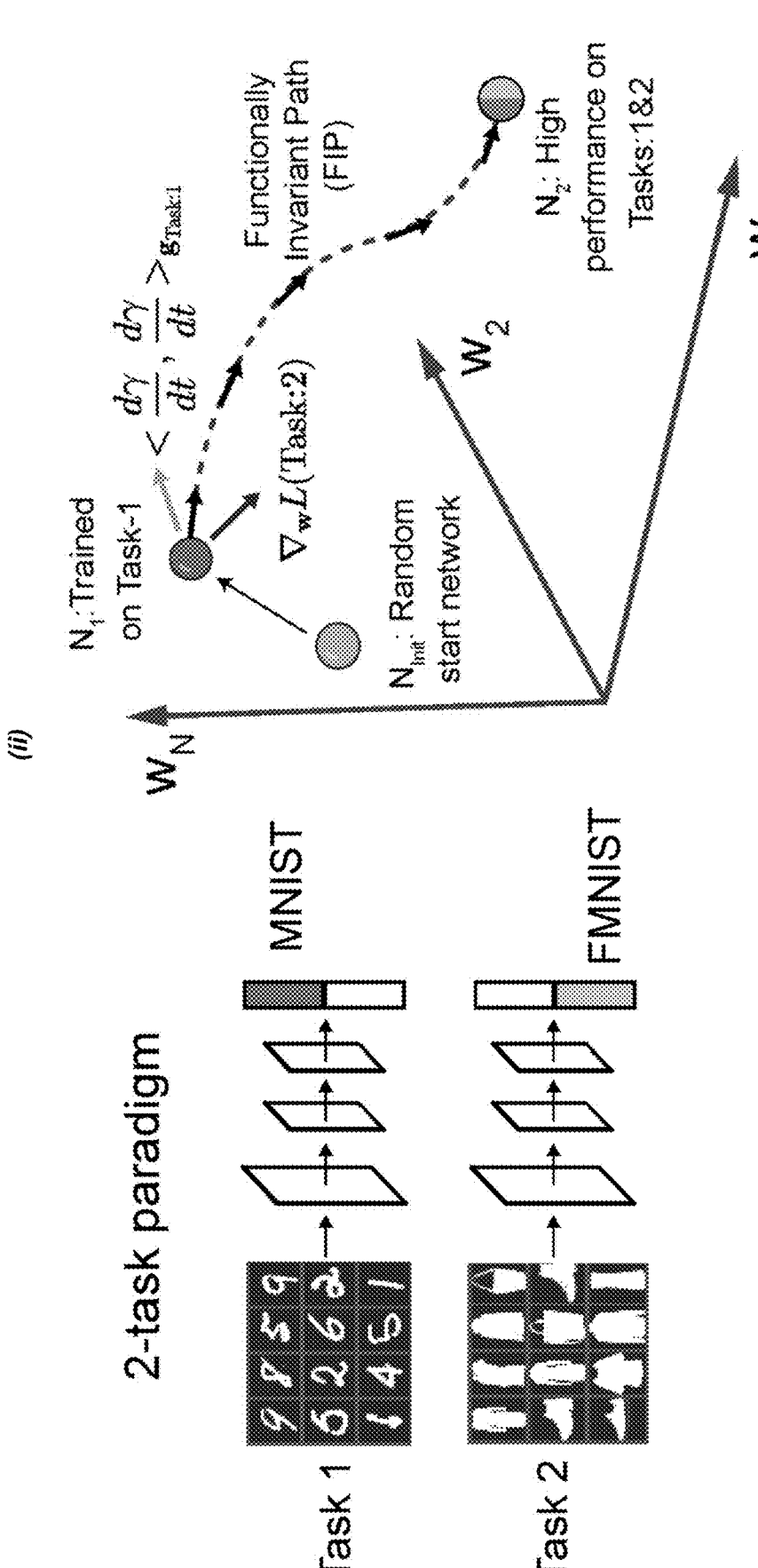

To circumvent catastrophic forgetting while learning two sequential tasks, the optimization problem in Equation 2.4 can be solved, by setting L(x, w) as the classification loss function specified by the second task and $$\left\langle \frac{d\gamma}{dt}, \frac{d\gamma}{dt} \right\rangle_{g_{Task1}}$$

as the distance moved in the networks' output space for a small number of inputs sampled from the first (earlier) task. As demonstrated in FIG. 9A, panel (ii) the optimization problem can be solved (in Equation 2.4) for a fixed value of $\beta$ by simultaneously minimizing the distance moved in the networks' output space (top, light gray arrow) corresponding to inputs from the first task while maximizing alignment with the gradient of L(x, w) (bottom, dark gray arrow) encoding the classification loss from the second task. In this manner, a functionally invariant path (FIP) (dotted line) is constructed in weight space from $N_1$ (node), trained on the first task, to $N_2$ (node) that retains performance on the first task while gaining performance on a second task (FIG. 9A, panel (ii)).

The path-finding algorithm was applied to mitigate catastrophic forgetting in a large convolutional network (See, Methods below) with one million weights and twenty output classes for learning two sequential tasks: (Task-1) recognizing images of 10 classes of handwritten digits from MNIST and (Task-2) recognizing images of 10 classes of fashion-apparel from the Fashion-MNIST dataset (FIG. 9A, panel (i)). Convolutional neural networks (CNN's) are widely used in the ML community for large scale visual recognition challenges. The present exemplary CNN has 5 layers: 2 convolutional layers, with 32 and 64 convolutional filters each, and 3 fully connected layers—with 600, 120 and 20 nodes each and a total of 1476548 weights in all. The MNIST data set is a canonical data set representing 60,000 examples of human hand written digits and the Fashion-MNIST data contains 60,000 images of fashion items.

Figure 9B:
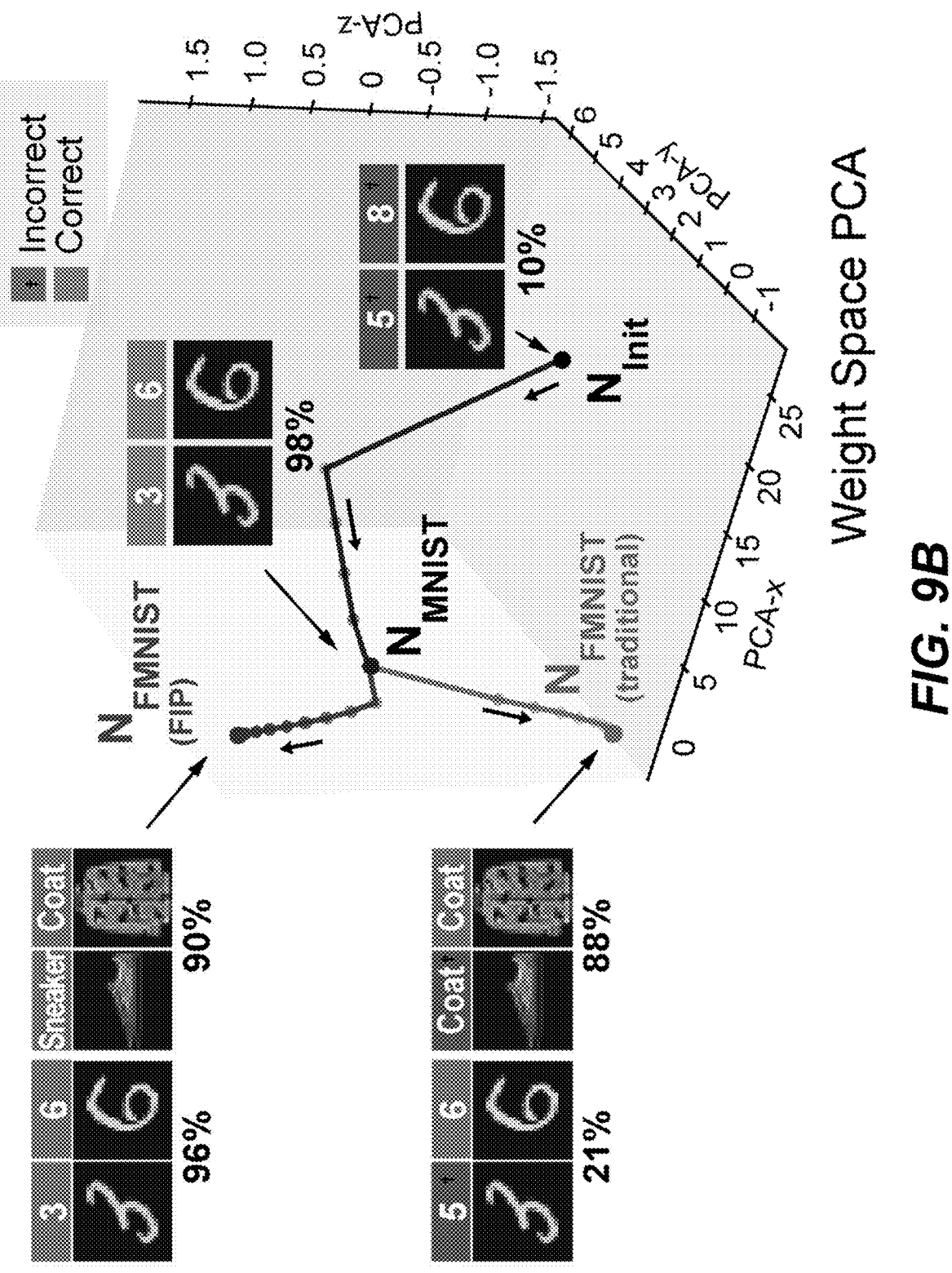
Figure 9C:
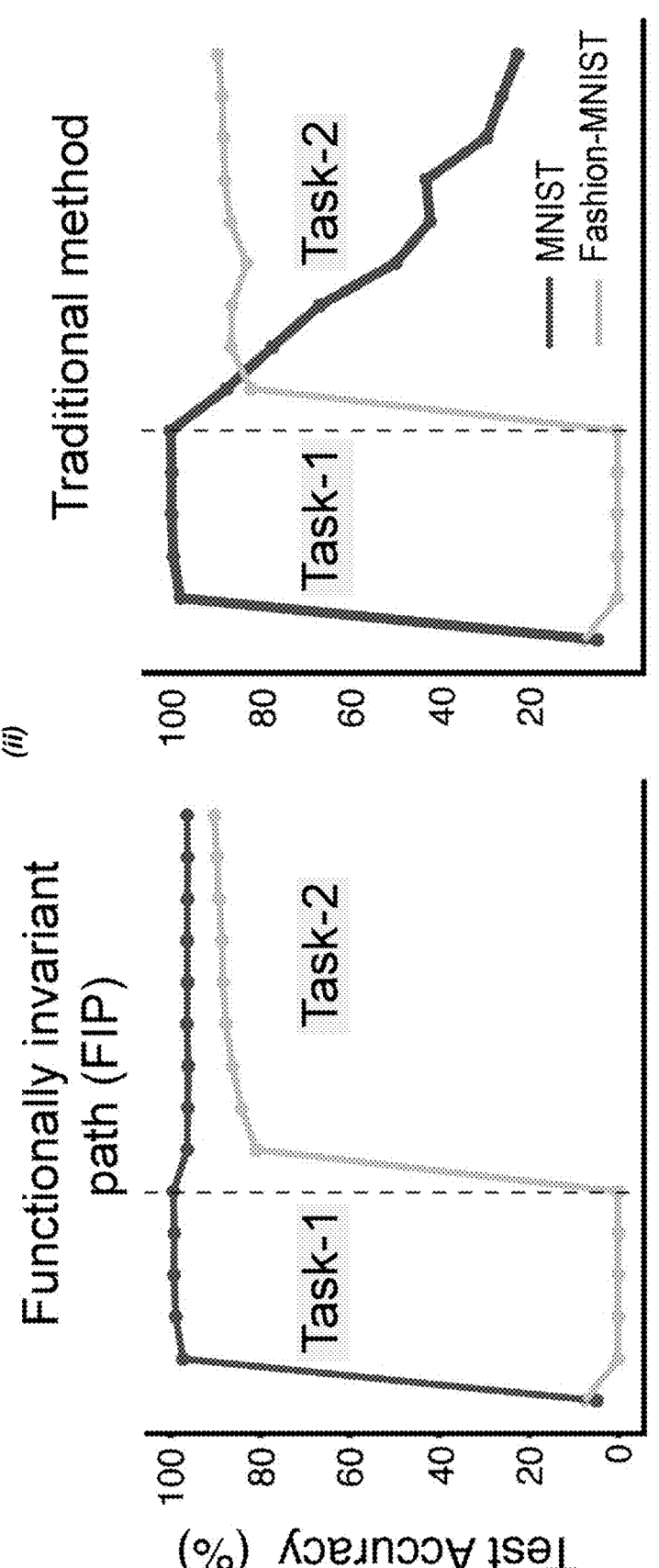

Naive training of the CNN on MNIST and retraining on FMNIST led to significant performance decays on the MNIST classification task. Specifically, the initial CNN network weights were randomized, and 98% on MNIST image classification was obtained following gradient descent based weight optimization (FIG. 9C). When the MNIST classification network was trained to classify Fashion-MNIST garments, the network rapidly lost accuracy on the MNIST task as performance increases on Fashion-MNIST (FIG. 9C). The traditional training/retraining paradigm resulted in discovering networks that drop its accuracy on the first task, from 98% to 21% (dark line, from network-7 onwards in graphs in FIG. 9C, panel (ii)) while gaining performance on the second task from 10% to 88% (light line from network-7 in FIG. 9C, panel (ii)). The networks along the light gray path (downward sloping to the left) in the weight space PCA (FIG. 9B) initially were able to recognize image '3' as the number-3, but as they stepped along the loss gradient from the second task, they lost performance on the first task and misclassified the image of digit '3' as a '5'. The heatmaps (FIG. 9C, panel (iv)) show that networks obtained by the traditional method for retraining on the second task have a uniformly low classification score (lighter pixels) for MNIST images, while having a high classification score (dark pixels) for Fashion-MNIST images.

While naive training and retraining paradigm induce catastrophic forgetting of the MNIST classification task, the FIP algorithm discovered networks that simultaneously retain performance on the first task (MNIST), staying between 98% to 96% test accuracy (dark line, from network-7 onwards in FIG. 9C, panel (i)) while gaining performance on the second task (Fashion-MNIST) reaching 89% (light line, from network-7 onwards in FIG. 9C, panel (i)). The networks along the dark gray path in the weight space PCA (FIG. 9B) retained their ability to correctly recognize images of digits '3' and '6', while additionally becoming capable of classifying images of fashion-apparel 'Sneaker' and 'Coat' from Fashion-MNIST. The heatmaps (FIG. 9C, panel (iii)) show that networks along the FIP have a high classification score (dark pixels) for both, MNIST and Fashion-MNIST images.

The FIP algorithm induces curved weight space paths that differ considerably from the naive training/retraining paradigm. The curved training paths allow the network to achieve high performance broadly across the held out testing set as indicated in the heatmaps in FIG. 9C. The introduction of the second task caused a small number of MNIST examples to decline in classification performance while the network improves monotonically on the Fashion-MNIST examples (light band in histograms in FIG. 9C, panel (iii)). In comparison, the naive training and retraining strategy caused monotonic performance decay with increasing loss of performance across MNIST images as performance on Fashion-MNIST increases.

Functionally Invariant Paths Enable Continuous Learning in Large Networks

Figure 9D:
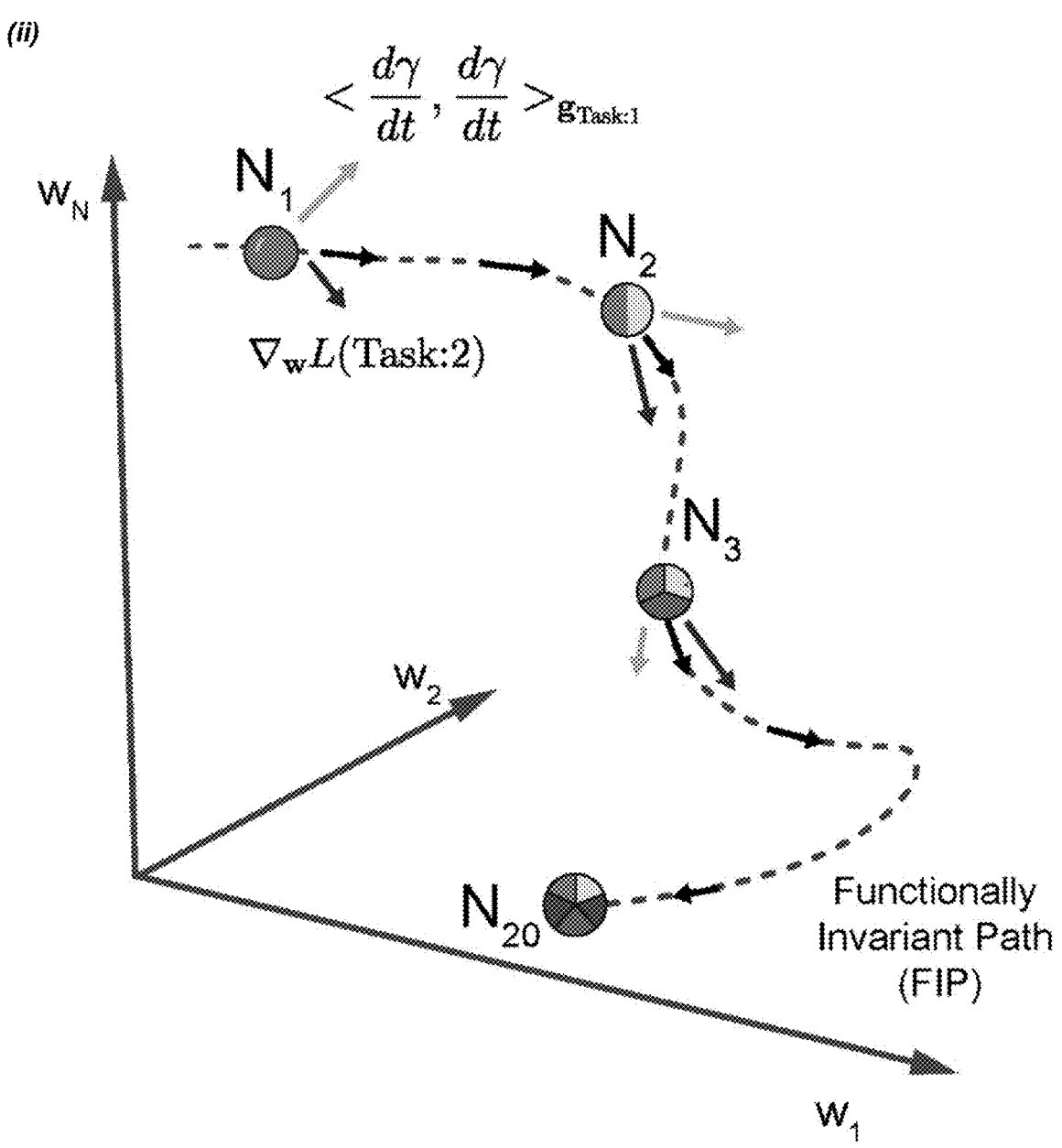

Owing to the generality of the disclosed framework, the FIP approach can naturally be scaled to learn a series of tasks rather than two through iterative application of Equation 2.4. To demonstrate sequential task learning, a standard sequential CIFAR100 task was executed where a network is asked to identify new sub-sets of CIFAR100 images at each round. The framework was applied to a large convolutional network (ResNet18) with 18 layers, 100 output classes and a total of 1.1 million parameters, by subjecting them to 20 sequential tasks derived from the CIFAR100 dataset. As shown in FIG. 9D, panel (i), each task requires the network to identify 5 distinct image-classes from the CIFAR100 dataset. Task-1 comprises identification of images from 5 CIFAR100 classes, namely dolphin, whale, otter, baby, wardrobe, Task-2 comprises of a different set of 5 CIFAR100 image-classes, namely boy, man, bowls, cups, cattle, and so on.

To circumvent catastrophic forgetting in the twenty sequential task paradigm, the optimization problem in Equation 2.4 was solved by setting L(x, w) as the loss function specified by the incoming new task (Task-i), while $$\left\langle \frac{d\gamma}{dt}, \frac{d\gamma}{dt} \right\rangle_{g_{Task-1:i-1}}$$

was set to be the distance moved in output space for a small number of inputs sampled from all the previous tasks (from Task:1 to Task:i−1).

The network was first trained to obtain high accuracy on the first task by gradient descent. Specifically, the ResNet18 was initialized with random weights using the Xavier initialization protocol and the network was trained by stepping along the loss gradient of the first task to achieve a performance of 78% on the first task (to recognize CIFAR100 images pertaining to Task:1). In the test accuracy graph shown in FIG. 9E, panel (i), the first point on the x-axis corresponds to the network trained on the first task alone, and the "Task:1" line records test accuracy of networks along the FIP on the first task.

Having trained ResNet18 on the first task, the network was trained on subsequent tasks (e.g., recognizing images from disjoint sets of 5 image-classes sampled from CIFAR100) by construction of FIPs in the weight space and obtaining networks that simultaneously retain performance on all previous tasks while learning a new task. In the graph in FIG. 9E, panel (i), it was found that networks along the FIP do not merely retain task performance on previous tasks, but also increase their test performance on previous tasks while learning new CIFAR100 tasks. For instance, the networks performance on Task:1 (as seen from the "Task:1" line) remained constant at 76% while being introduced to tasks 2 through 15, but increased its performance to 80% when exposed to tasks 16 through 20. Similarly, the networks average test performance on Tasks 1 through 5 (as seen from the "Tasks: 1 to 5" line) remained constant at 77% until Task-14 and increased to 81% while learning Tasks 15 through 20. Similar trends of retaining previous task performance while learning new tasks were observed for the networks average test performance on Tasks 1 thru 10 and Tasks 1 thru 15. On introducing the last task (Task-20), the networks along the FIP had a mean performance of 82% on the entire CIFAR100 dataset having shown 5 classes at a time.

Figure 9E:
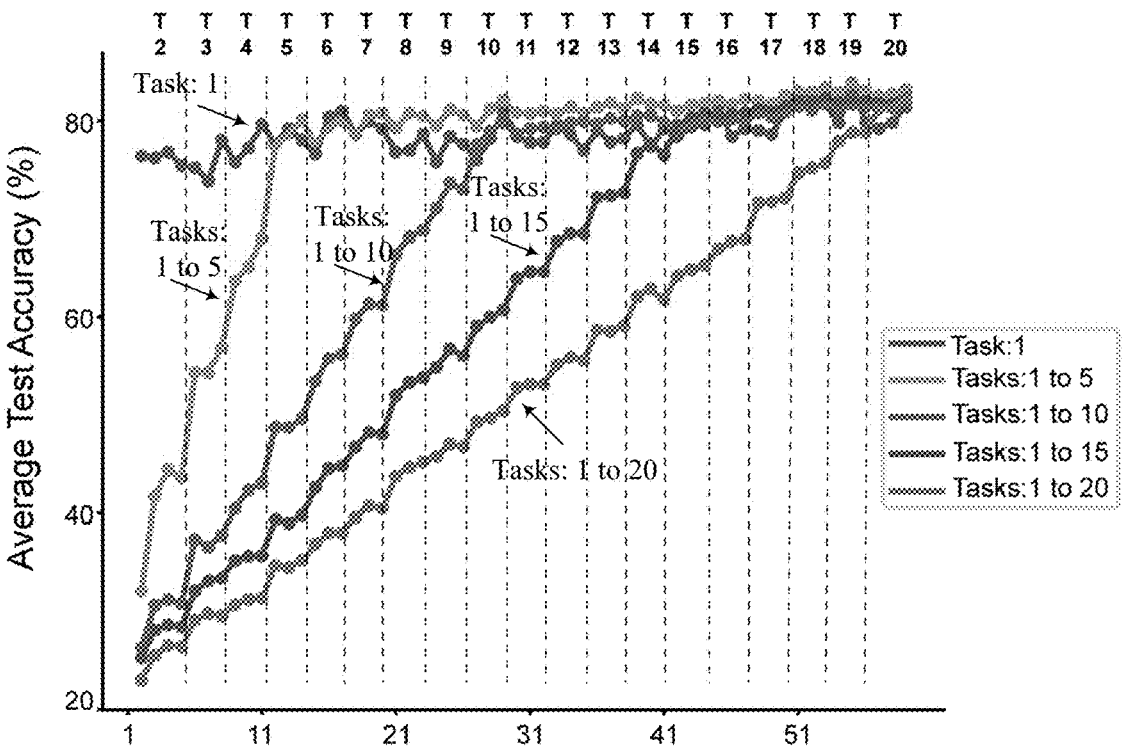
Figure 9E:
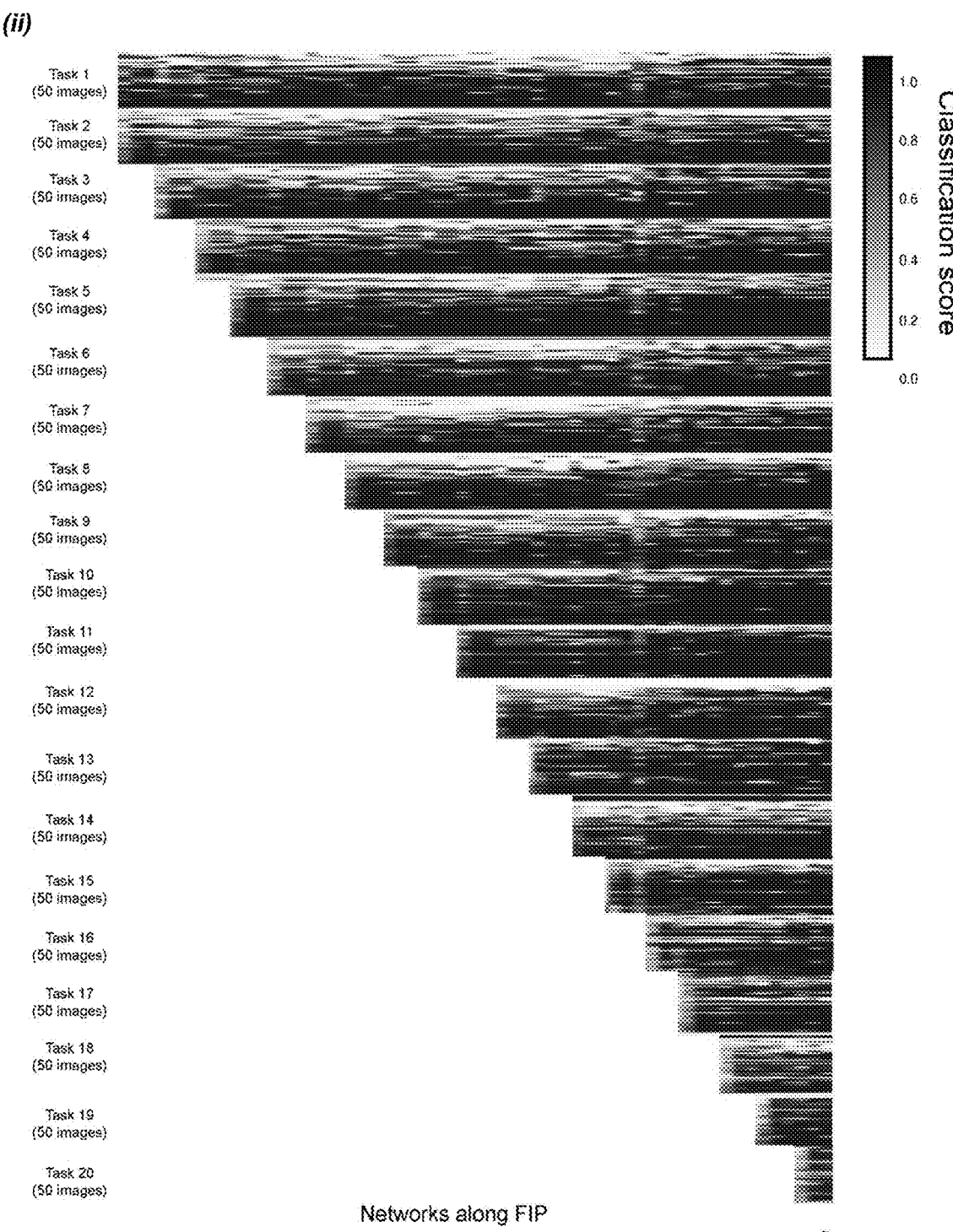

The heatmaps in FIG. 9E, panel (ii) show that the FIP strategy can achieve high performance broadly across the held-out testing set. The introduction of a new task (along the heatmaps' y-axis) caused a small number of examples from the previous task to decline in classification performance while the network improved monotonically on the new task. As shown in the heatmaps in FIG. 9E, panel (ii), the first 4 networks (1-4) retained their classification score on Task-1, while increasing their classification score on Task-2. The subsequent set of 3 networks (5-7, 8-10, . . . ) retained their classification score on previous tasks (Tasks 1-2, Tasks 1-3, . . . ) while increasing their classification score on (Task-3, Task-4 . . . ) respectively. Having presented all 20 tasks to the network, the path-finding framework discovered networks that performed at 82.54±0.17% accuracy on the 20 tasks, while the conventional method performed at 26.86±1.05%.

Figure 9F:
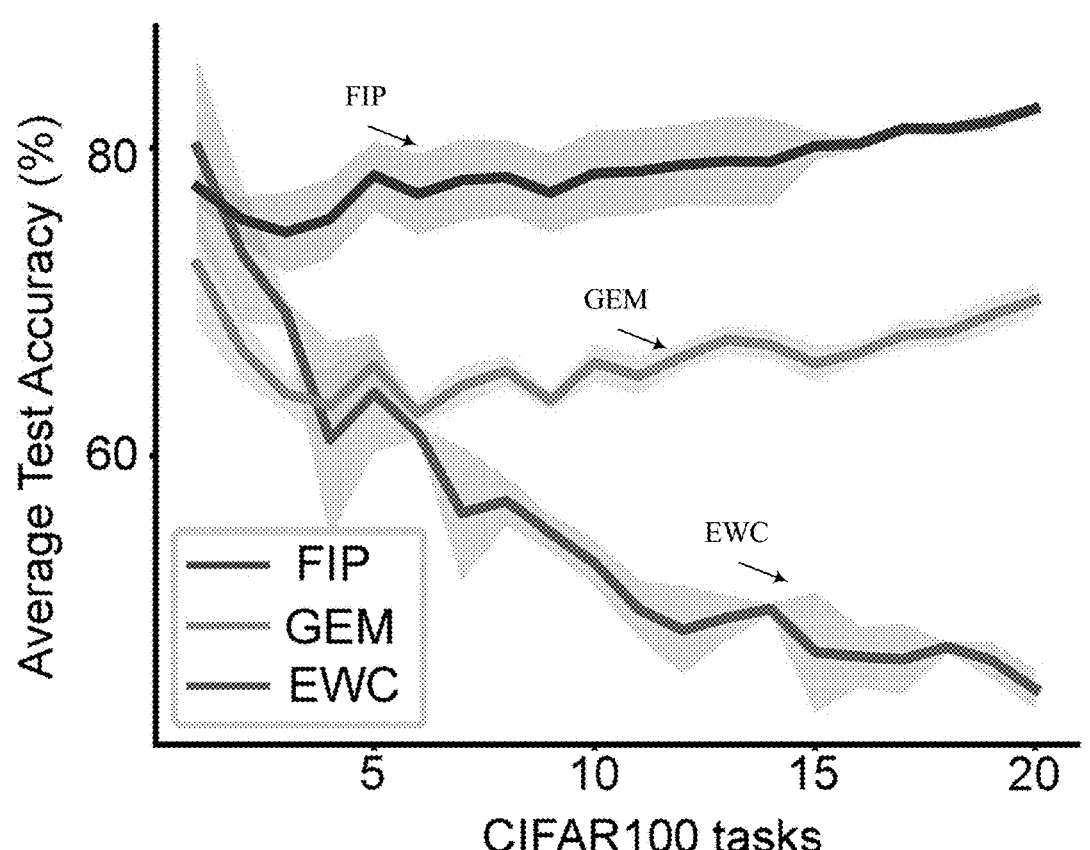

The FIP approach outperforms other methods that have been introduced to mitigate catastrophic forgetting, specifically elastic weight consolidation on the 2 task paradigm (FIG. 9F) (FIP: 91±1.1%, EWC: 87±1.6%) and 20-task paradigm (FIP: 82.54±0.17%, EWC:44.9±0.01%) (FIG. 9G). Elastic Weight Consolidation (EWC) is a state of the art algorithm that adjusts a neural network by identifying weights that are rarely used in a given task and adjusting those weights to achieve high performance on a second task. The path finding algorithm disclosed herein has, in some embodiments, conceptual and mathematical similarities with EWC. Both the procedures find weights (directions), along which changes in weights accrue little change in network output. Without being bound by any particular theory, the key difference is that the approach described herein scales to overcoming catastrophic forgetting on multiple tasks as functionally invariant paths are explicitly constructed over long distances in the weight space, while EWC relies on finding suitable networks in the vicinity of a previously trained network (which may or may not exist) by computing a local Fisher Information metric.

In addition to performing better than regularization based methods (like EWC) on the 20-task paradigm (FIG. 9F), the methods presented herein perform better than Gradient episodic memory (GEM) with a memory budget of 500 memories from each task previously encountered. GEM is a method that stores gradients from previous tasks while being trained on new tasks (GEM: 70.14±0.1%). In this comparison, a 500 example memory budget was chosen for GEM as the disclosed path-finding algorithm uses 500 randomly sampled data points from the previous tasks for constructing the FIPs in weight space.

In summary, demonstrated herein is a FIP strategy allowing for training of neural networks on a series of sequential image classification tasks. By stepping along a path defined through a trade-off between function invariance and a secondary loss function, networks can be trained that achieve high performance on multiple tasks with similar or greater performance than existing state of the art methods.

Network Sparsification by Traversing Path Connected Network Sets

In some embodiments, one of the critical aspects of the FIP framework is that it can be generalized beyond sequential task training to address a broad range of machine learning problems by considering a more general set of secondary objective functions, e.g., sparsification of neural networks, which is important for reducing the memory and computational footprint of a network. Sparsification refers to the problem of reducing the number of non-zero weights in a network. The sparsification of networks decreases the required memory and computational foot-print of a network and is therefore of great practical interest for applying neural networks on memory limited devices.

The FIP framework can be applied to sparsify neural networks by discovering functionally invariant paths in weight space that also decrease the number of non-zero network weights. p % sparse neural networks can be discovered (wherein p % of the networks' weights are set to zero) with a high performance on the task of interest by recasting the optimization problem in Equation 2.4 as a problem of constructing FIPs in the weight space from a high-performance densely connected neural network (all non-zero network weights) to a p % sparse submanifold in the weight space. In some embodiments, the p % sparse submanifold can be comprised of a set of networks that have an architectural constraint of having p % of their weights set to zero, while having no constraint on the networks' task performance. To solve the optimization problem in Equation 2.4, L(x, w) is set to be the euclidean distance in the weight space between the dense network and a network in the p % sparse submanifold, obtained by setting p % of the smallest weights in the dense network to zero.

Figure 10A:
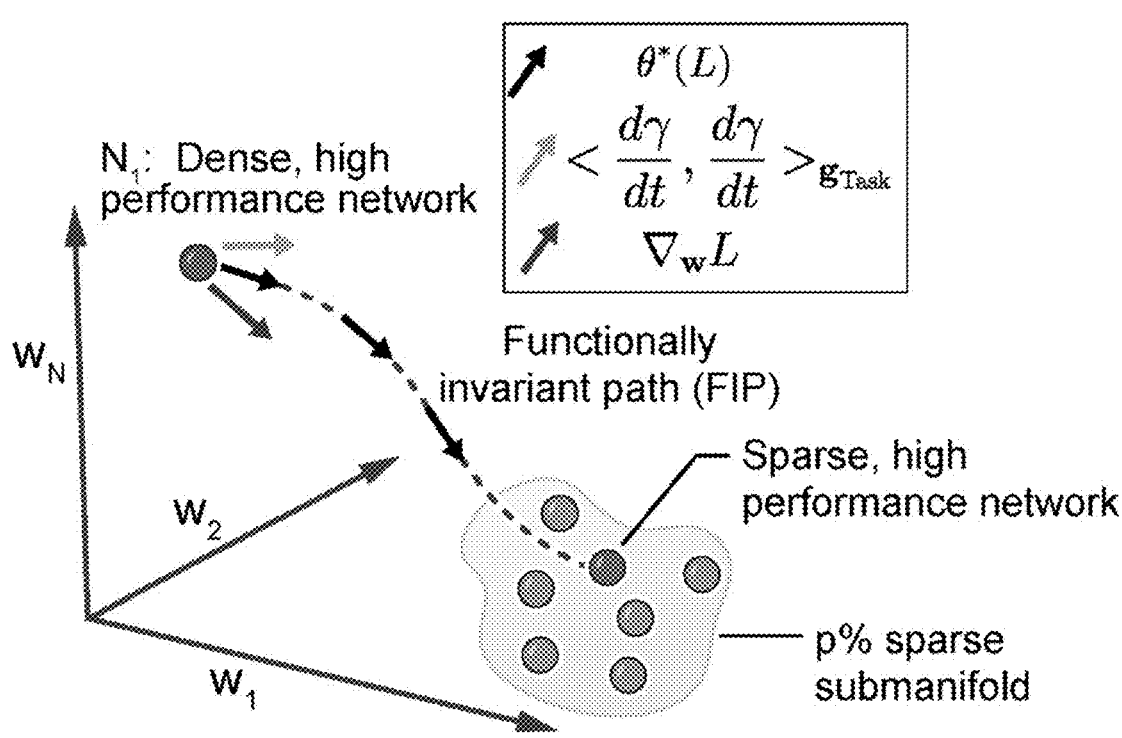
FIG. 10A-FIG. 10G depict non-limiting exemplary embodiments of sparse networks discovered by traversing FIPs in the weight space.
Figure 10B:
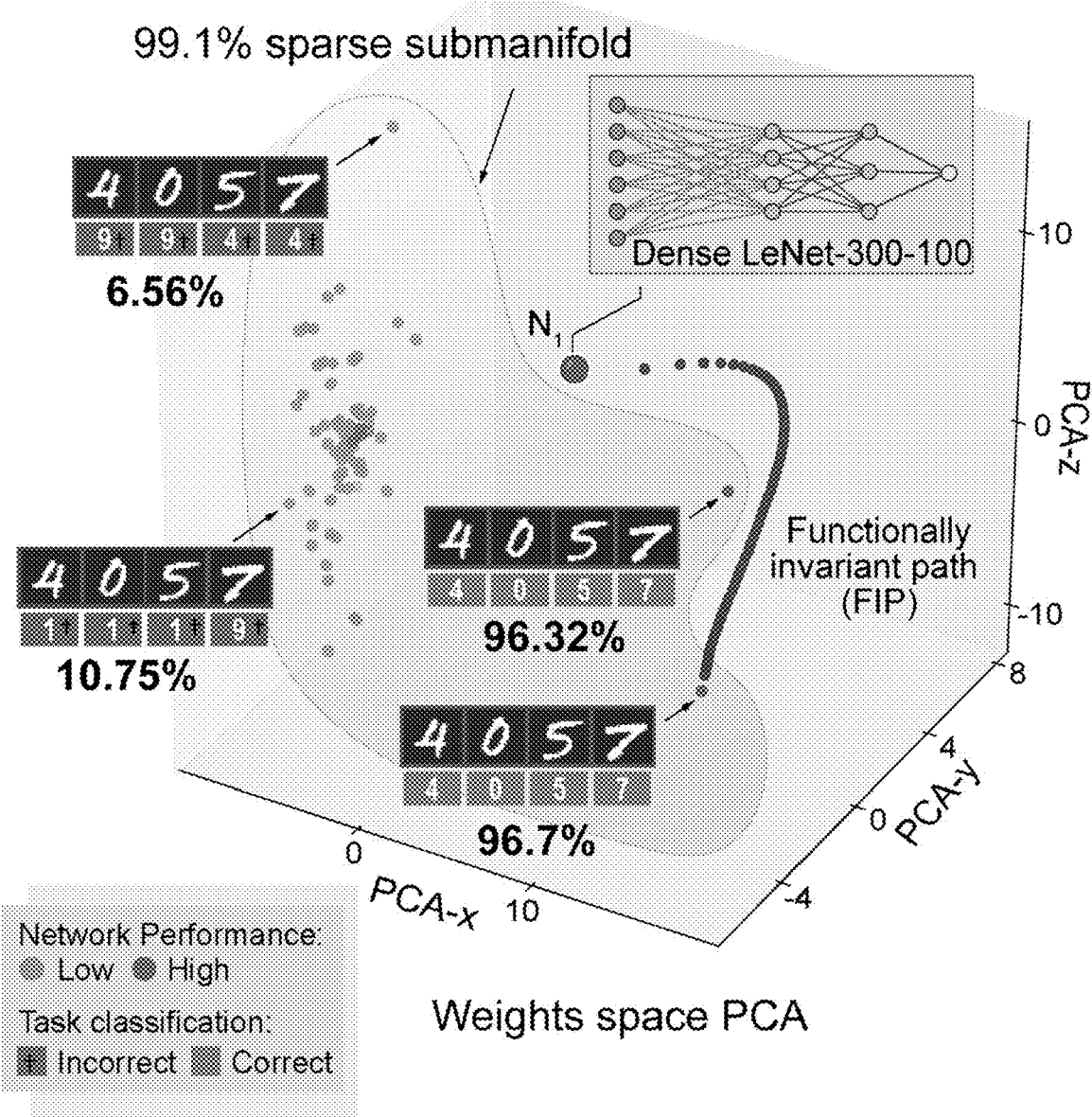

A series of sparsified LeNet-300-100 networks were discovered with sparsities ranging from 20% to 99.4% that exhibit a high performance on the task of classifying images of handwritten digits from MNIST by traversing FIPs in the weight space. LeNet-300-100 is a multilayer perceptron with two hidden layers consisting of 300 and 100 nodes each, and a total of 484000 non-zero weights. Although most networks randomly sampled from the 99.1% sparse submanifold in the weight space performed poorly on the MNIST task (with test accuracies ranging from 6 to 10%), the FIP algorithm found a curved path in the weight space from densely connected LeNet (with test accuracy of 98% on MNIST) to networks in the 99.1% sparse submanifold that performed at test accuracies between 96.3% to 96.8% on the MNIST classification task (FIG. 10B).

Figure 10C:
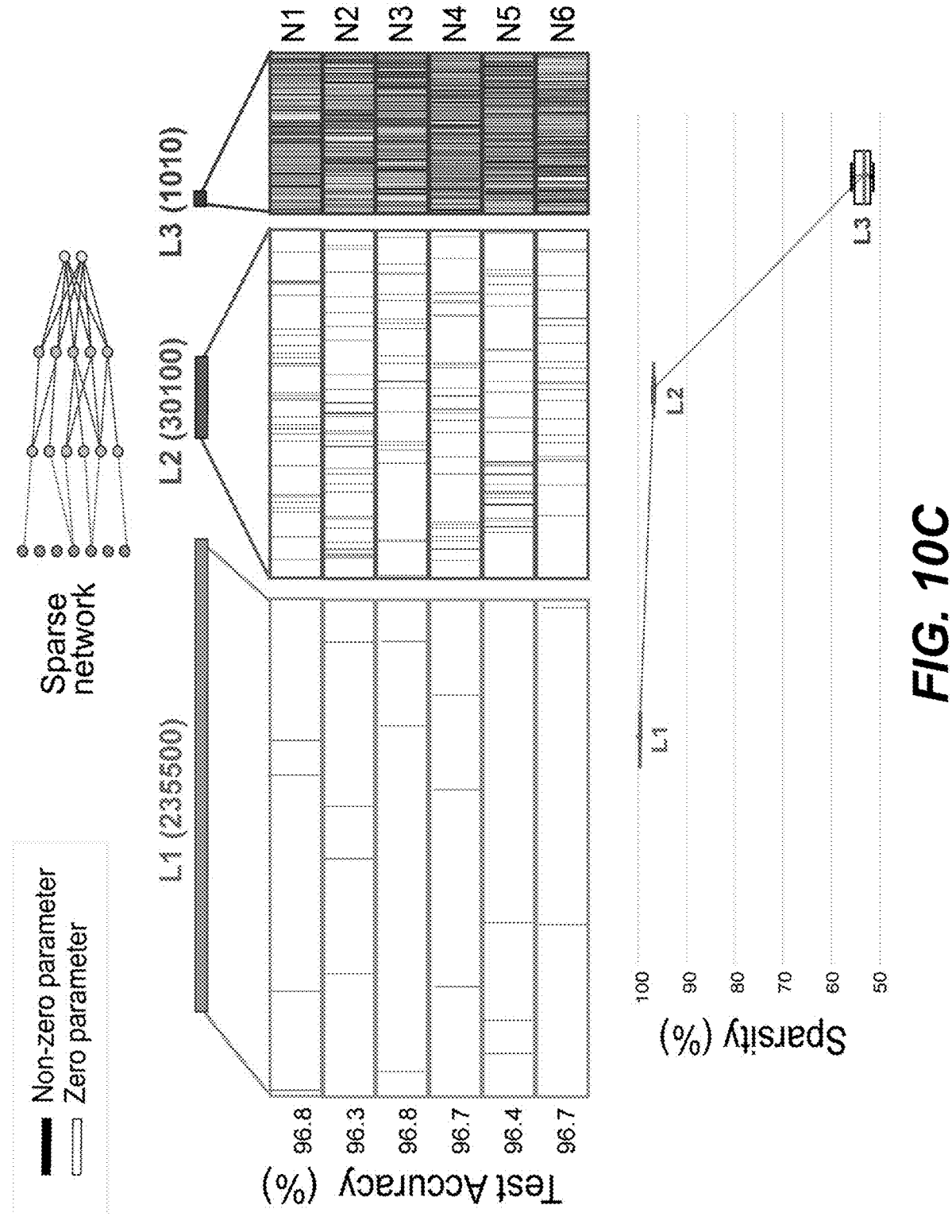

In addition to identifying high performance sparse networks in the sparse submanifold, the FIP-discovered sparse networks were found to have diverse inter-layer connectivity structures. FIG. 10C (top) illustrates the connectivity structure of 6 high performance sparse networks in the 99.1% sparse submanifold performing at accuracies ranging from 96.3% to 96.8%. Vertical bars in the figure indicate the position of non-zero weights. Non-zero weights occurred in different positions across the six networks indicating that the FIP algorithm discovered architecturally diverse sparse solutions.

While the FIP solutions varied locally, there were also patterns observed across networks. Specifically, 99.2±0.2% and 98.4±0.3% of the weights between layers 1-2 and 2-3 respectively are zeroed out, while only 52±4% of the weights between layers 3-4 are zeroed out. The differential sparsification across different layers indicates that connections between the first few layers contain more redundancy than the later layers.

Figure 10D:
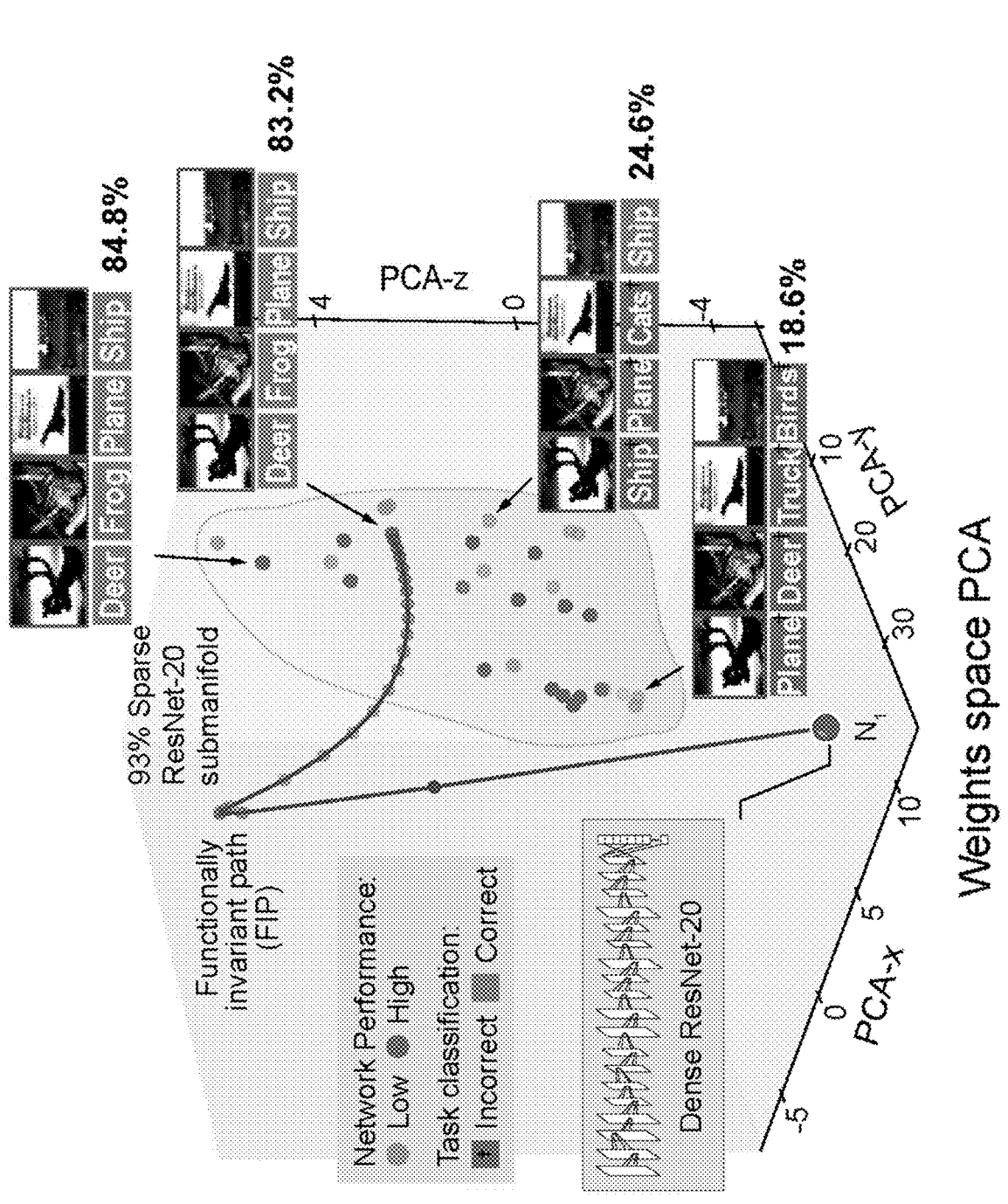
Figure 10E:
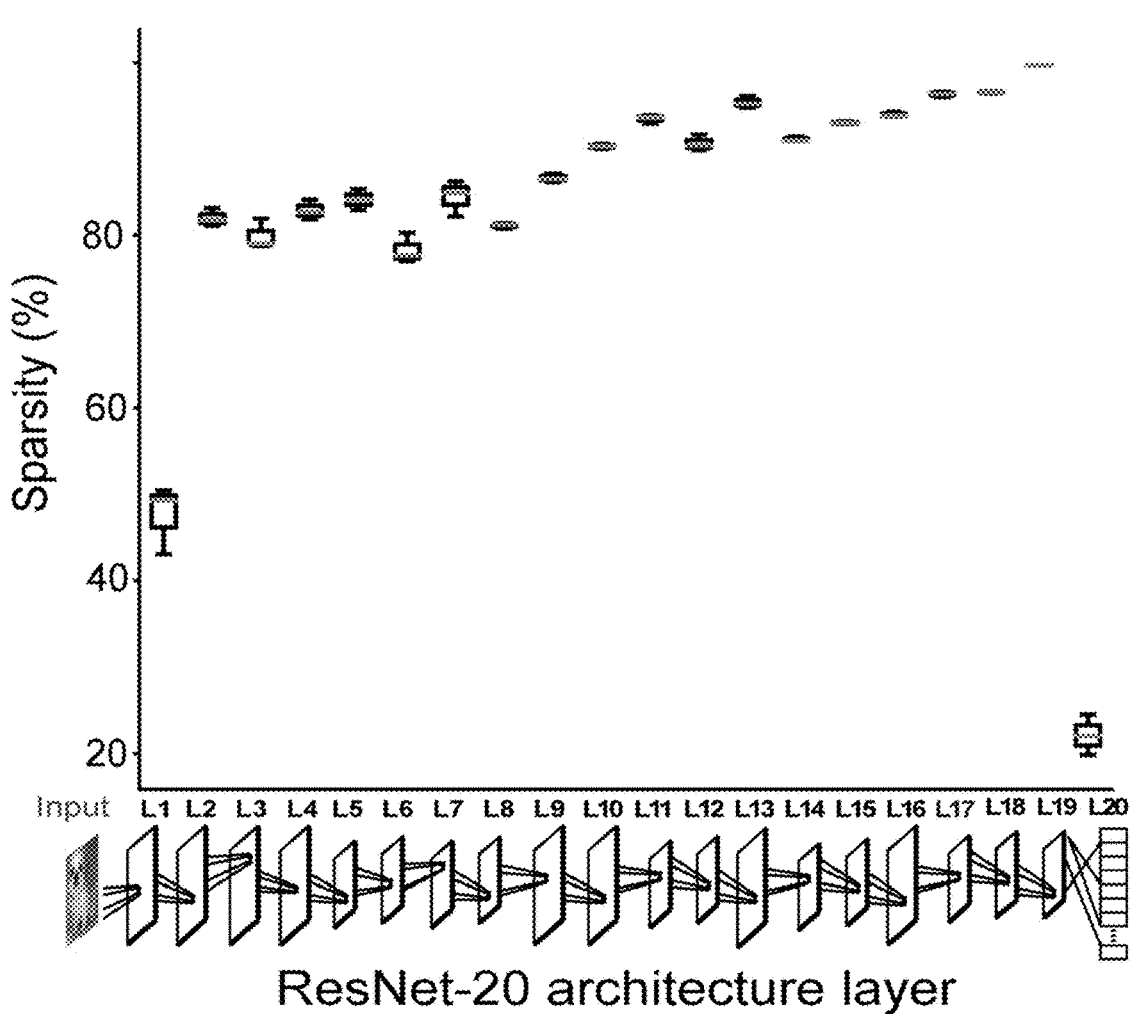
Figure 10F:
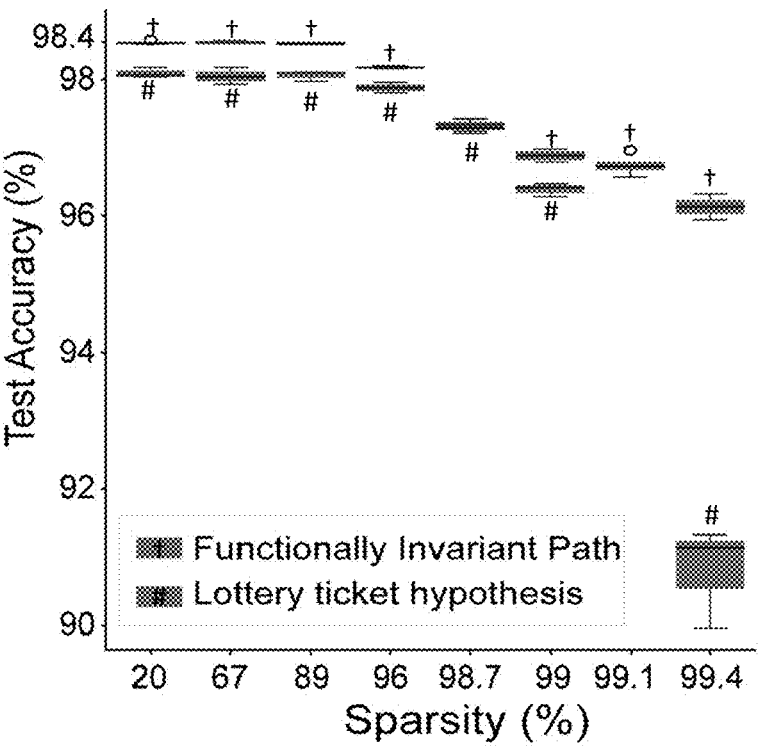

The sparse networks discovered by traversing FIPs from dense network trained on MNIST to the sparse sub-manifold were found to have a higher task-performance than the ones discovered by the lottery ticket hypothesis (LTH), which entails subjecting trained dense networks to multiple prune-train cycles (FIG. 10F). Across a wide range of sparsities (from 20% to 99.4%), the sparse networks discovered by FIP were comparable in test accuracy on MNIST to those obtained by LTH, while the presently disclosed method succeeded in discovering extremely sparse networks with high-performance. In FIG. 10F, the FIP method found a 99.4% sparse network performing at an accuracy of 96±0.6%, while the LTH strategy found a 99.4% sparse network performing at 91±3% on the MNIST dataset.

The FIP algorithm scales to finding sparser counterparts of large convolutional networks with skip, like the ResNet-20 architecture, which has a series of 20 convolutional layers, trained to recognize images of automobiles, animals and man-made structures from the CIFAR-10 dataset. Although most networks sampled from the 93% sparse submanifold of ResNet20 networks performed at accuracies between 18 to 30% on CIFAR10, an FIP constructed from a dense, trained ResNet20 network to the 93% sparse sub-manifold was successful in picking out high performance sparse ResNet20 networks functioning at accuracies between 82 to 84.7% on CIFAR-10. Shown in FIG. 10D is the 93% sparse submanifold of ResNet20 networks (light and dark gray dots), the dense trained ResNet20 ($N_1$, larger grey dot), and the curved FIP constructed between the two in the weight space PCA. The 93% sparse submanifold is comprised of networks that have 19073 non-zero weights (out of 272474 weights), wherein the light gray dots represent networks that were randomly sampled from the sparse submanifold while the dark gray dots correspond to networks uncovered by traversing the FIP. The random sparse networks (light gray dots) were found to perform poorly on the task, incorrectly recognizing the images of 'deer', 'frog', 'plane', 'ship' as 'plane', 'deer', 'truck' and 'bird' respectively.

Like the LeNet example, the inter-layer connectivity of discovered sparse ResNet-20 networks are distinct locally, but have globally conserved patterns. For instance, in FIG. 10E, the weights between layers 2 to 19 had an average inter-layer sparsity of 85% while having a maximum sparsity of 99.2%, present between layers 18-19 (penultimate layer), across all sparsified ResNet20 networks. On the other hand, the weights between layer 1-2 (first 2 layers) and the layers 19-20 (last 2 layers) were least sparsified, with them being 41% and 24% sparse respectively. The differential sparsification across different layers points to the fact that the redundancy in ResNet-20 architectures is encoded majorly between layers 3 and 18.

Figure 10G:
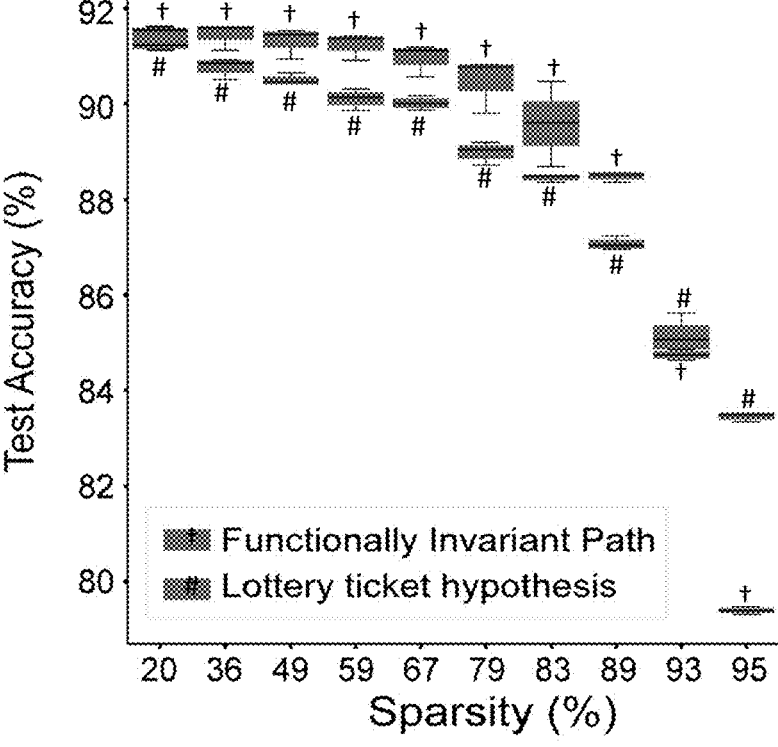

The FIPs were found to be successful in discovering high performance sparse ResNet20 networks on a wide range of sparse submanifolds (from 20% to 95%) that are at par with the state-of-art technique Lottery ticket hypothesis (LTH). As shown in FIG. 10G, the path-finding algorithm discovered sparse networks that perform at par with the LTH strategy for sparsities ranging from 20% to 93%, while performing 3% lower than sparse networks discovered by LTH in the 95% sparse submanifold. Lottery ticket hypothesis adopts the iterative prune-train strategy to discover sparse networks. Here, a densely connected network was initially trained, then a part of their weights were pruned (or set to zero), before commencing the next cycle of training and pruning. As each cycle of training maintains the $L_0$ norm of the weights, it forces the pruned network to train on smaller subspaces after every prune-train cycle.

Path-Connected Sets of Networks Confer Robustness Against Adversarial Attack

Figure 11A:
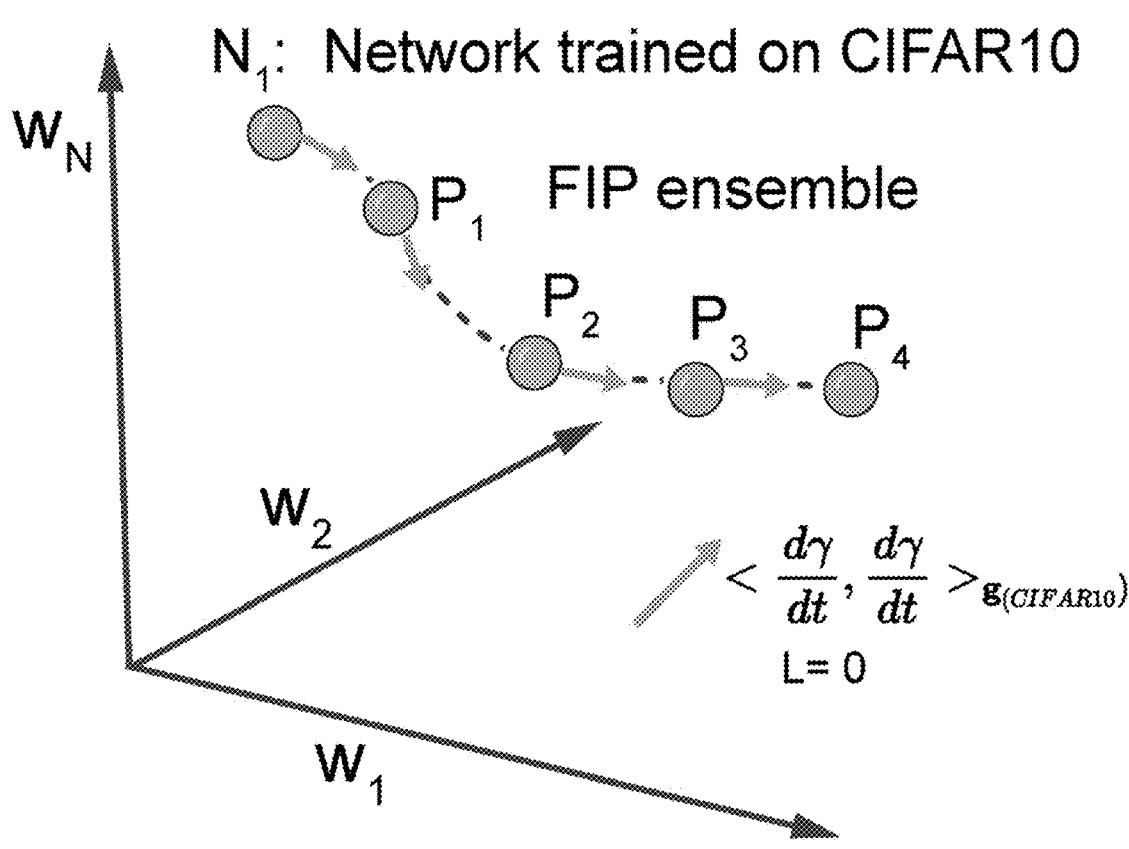
FIG. 11A-FIG. 11F depict non-limiting exemplary embodiments showing that FIPs in weight space generate ensembles of networks that confer adversarial robustness.
Figure 11B:
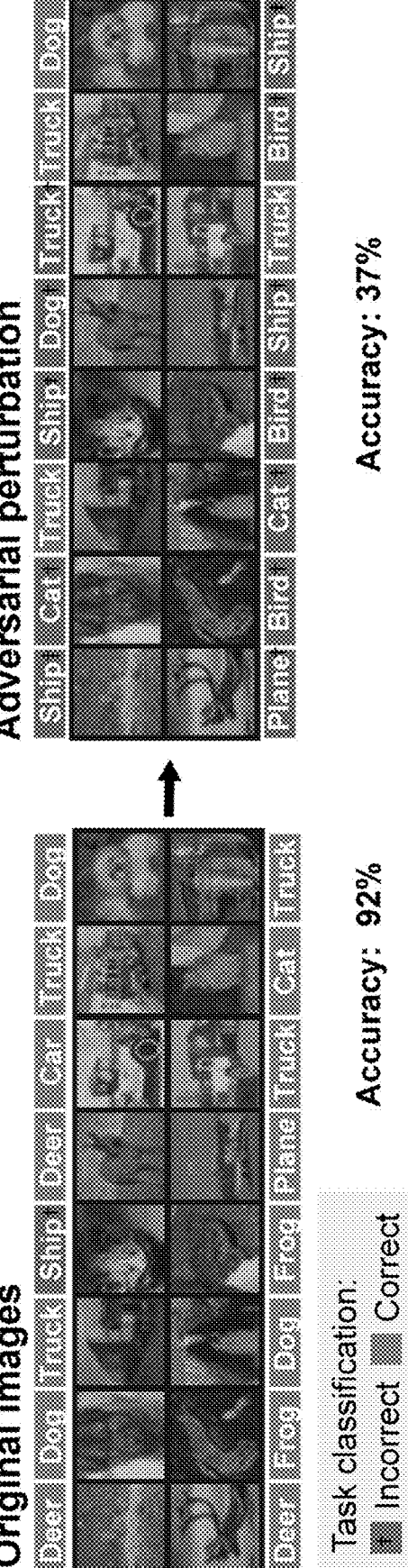

Adversarial perturbations to neural networks involve the selection of data perturbations that lead to incorrect network decisions. Although deep networks have achieved remarkable performance on image-recognition tasks, they remain extremely vulnerable to small perturbations of the input image. That is, human-imperceptible additive perturbations to the input image are successful in fooling deep networks, ultimately resulting in a failed image recognition (FIG. 11B). The intentionally crafted human-imperceptible additive perturbations to the input image are called adversarial examples. Classical work has demonstrated that data perturbations that are imperceptible to humans can lead to catastrophic performance loss in deep neural networks. Adversarial robustness is a major goal for deep learning in industrial settings where catastrophic performance declines could compromise user safety in autonomous vehicle and medical applications of Deep Neural Networks.

Adversarially perturbed images were generated for deep networks trained on an image-classification task and it was found that, although humans perceive the adversarial images to be identical to the original images, it caused significant performance loss to deep neural networks. Specifically, adversarial examples were generated for an instance of the VGG16 network (with 16 layers and 130 million parameters) trained to recognize images from the CIFAR-10 dataset, by applying the projected gradient descent (PGD) attack. The PGD attack can compute the best direction (in image space) to perturb the image such that it maximizes the trained networks' loss on the image while constraining the $L_{inf}$ norm of the perturbation. Prior to the adversarial attack, the VGG16 network performed at an accuracy of 92% on the held-out test dataset consisting of 10 k original CIFAR-10 images. FIG. 11B (left) shows 16 images sampled from the CIFAR-10 dataset where the trained network recognized 15 out of 16 images correctly, as shown by the text-labels displayed above each image. Following the PGD attack, the network performed at an accuracy of 37% on the held-out adversarial test set consisting of 10 k images. FIG. 11B (right) shows 16 adversarially perturbed images that look identical to the images in FIG. 11B (left) to humans, but the trained network recognized only 4 out of 16 images correctly, as shown by the text-labels above each image. The adversarial attack paradigm clearly demonstrates deep networks' susceptibility to adversarial failure.

Figure 11C:
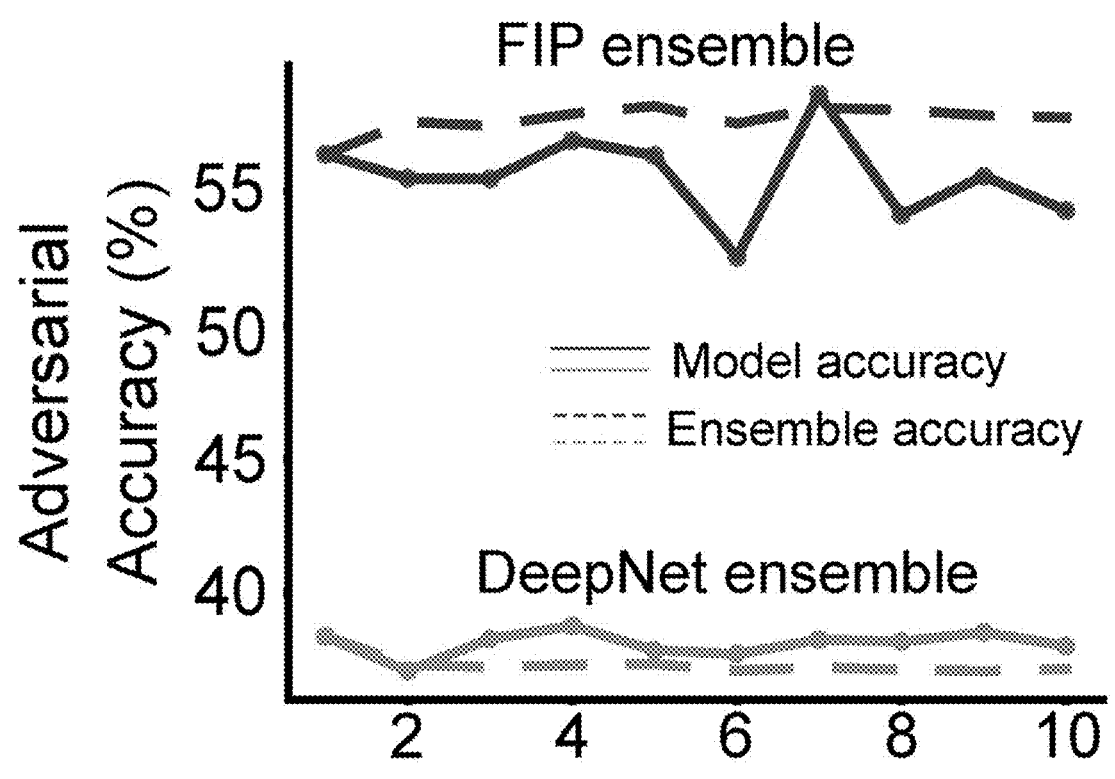
Figure 11C:
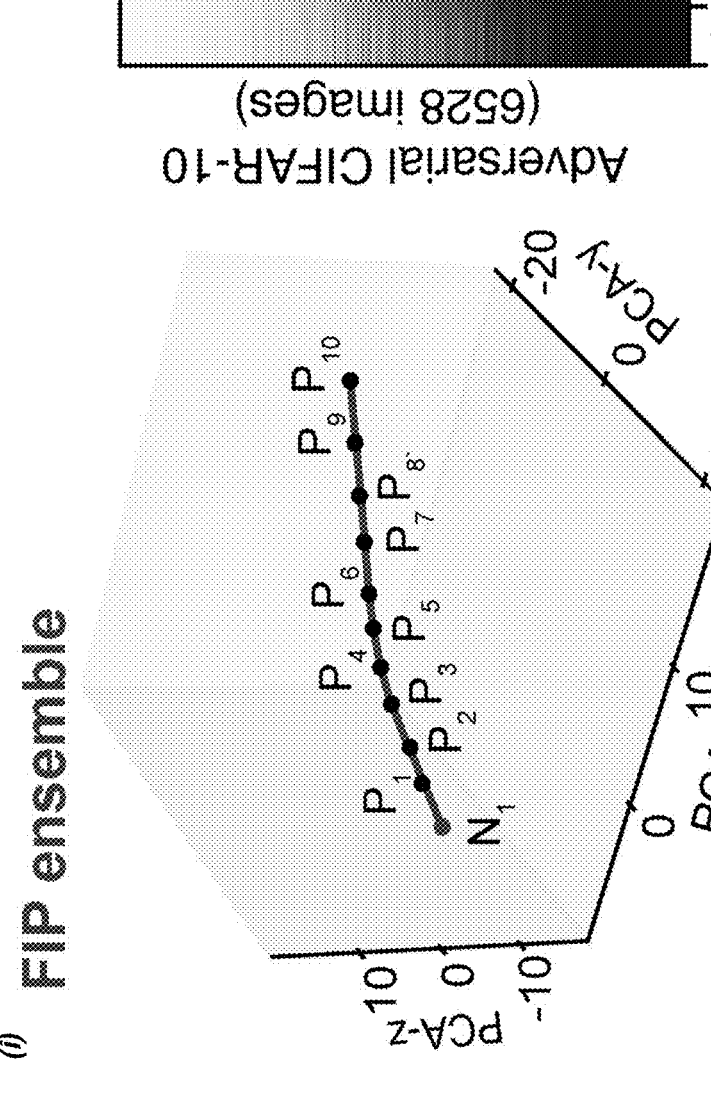
Figure 11C:
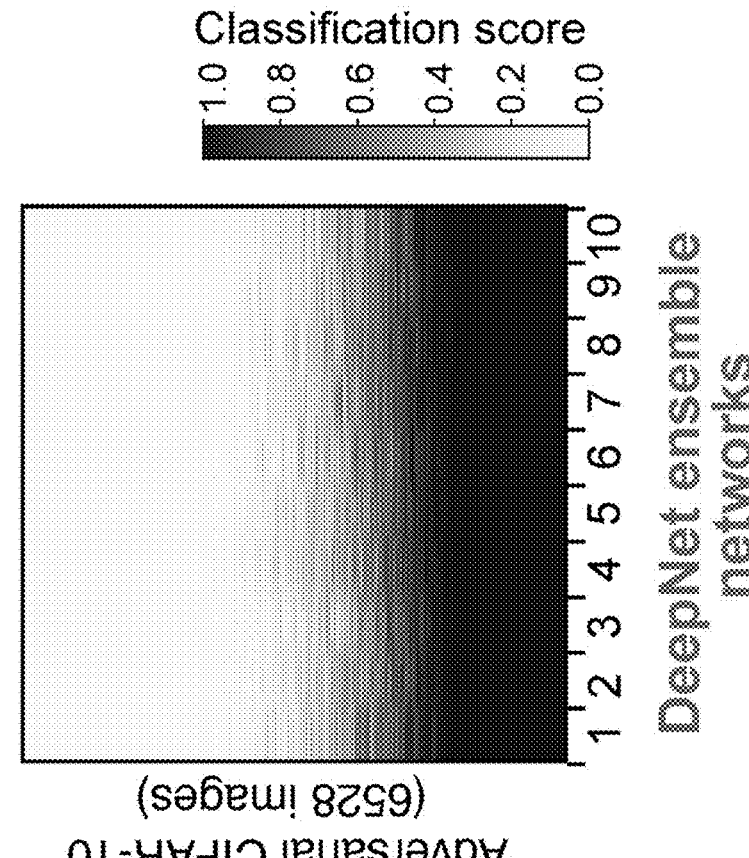

As described herein, the FIP algorithm can provide an efficient strategy to increase network robustness and mitigate adversarial failure by generating path-connected sets of network with diverse weights that can be used collectively for image-classification tasks. Initially, the FIP was constructed computationally by setting L=0, in the optimization problem in Equation 2.4, while $$\left( \frac{d\gamma}{dt}, \frac{d\gamma}{dt} \right)_{g_{CIFAR10}}$$

is set to the distance moved in the networks' output space for images obtained from the original CIFAR-10 dataset. Following the FIP construction, 10 networks were sampled along the FIP in the weight space and an ensemble constructed. The ensemble's prediction was computed by feeding an image-input through all the networks in the ensemble followed by summing their softmaxed' output across all networks in the ensemble. The adversarial performance of individual networks from the FIP ensemble (composed of 10 networks sampled from the FIP) was 55.61±1.1%, with a joint ensemble accuracy of 57.8% (FIP ensemble, solid, dashed line on the top of FIG. 11C, first panel), while the DeepNet ensemble (composed of 10 independently trained deep networks) had an adversarial performance of 38.12±0.44% for individual networks in the ensemble and a joint ensemble accuracy of 37.18% (DeepNet ensemble, solid, dashed line on the bottom of FIG. 11C, second panel).

Figure 11D:
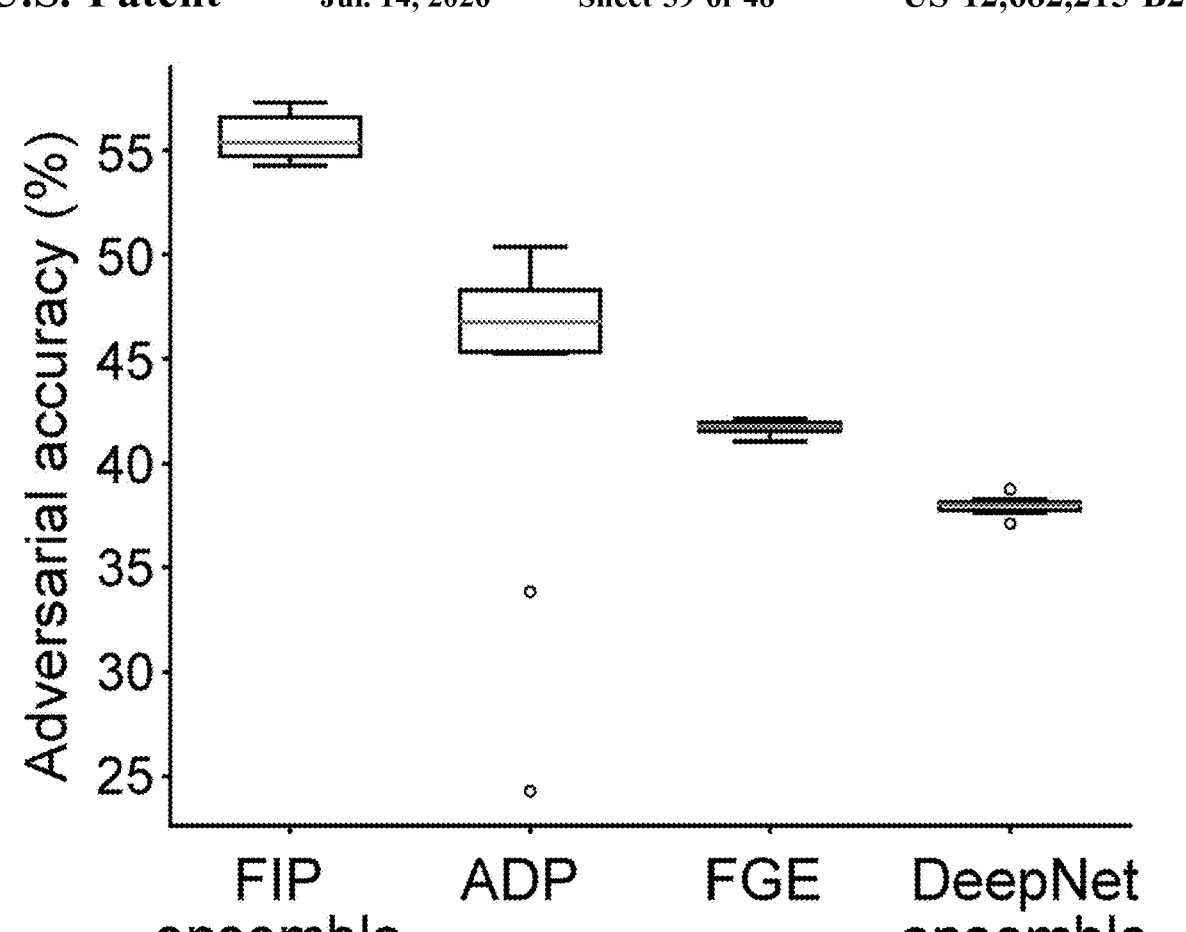

The FIP ensemble has a significantly higher adversarial accuracy than other state of the art ensemble methods, like the DeepNet (DN) ensemble, Adaptive Diversity promoting (ADP) ensemble and the Fast Geometric Ensembling (FGE) method. In FIG. 11D, the adversarial performance of three state-of-art techniques was compared with the FIP ensemble, wherein each ensemble contained 10 deep networks. The FIP ensembles performed at an accuracy of 55.61±1.1 on the adversarial examples, ADP at an accuracy of 43.84±7.8%, FGE performs at 41.7±0.34% and DeepNet (DN) ensemble at an accuracy 38.12±0.44% on adversarial input.

Figure 11E:
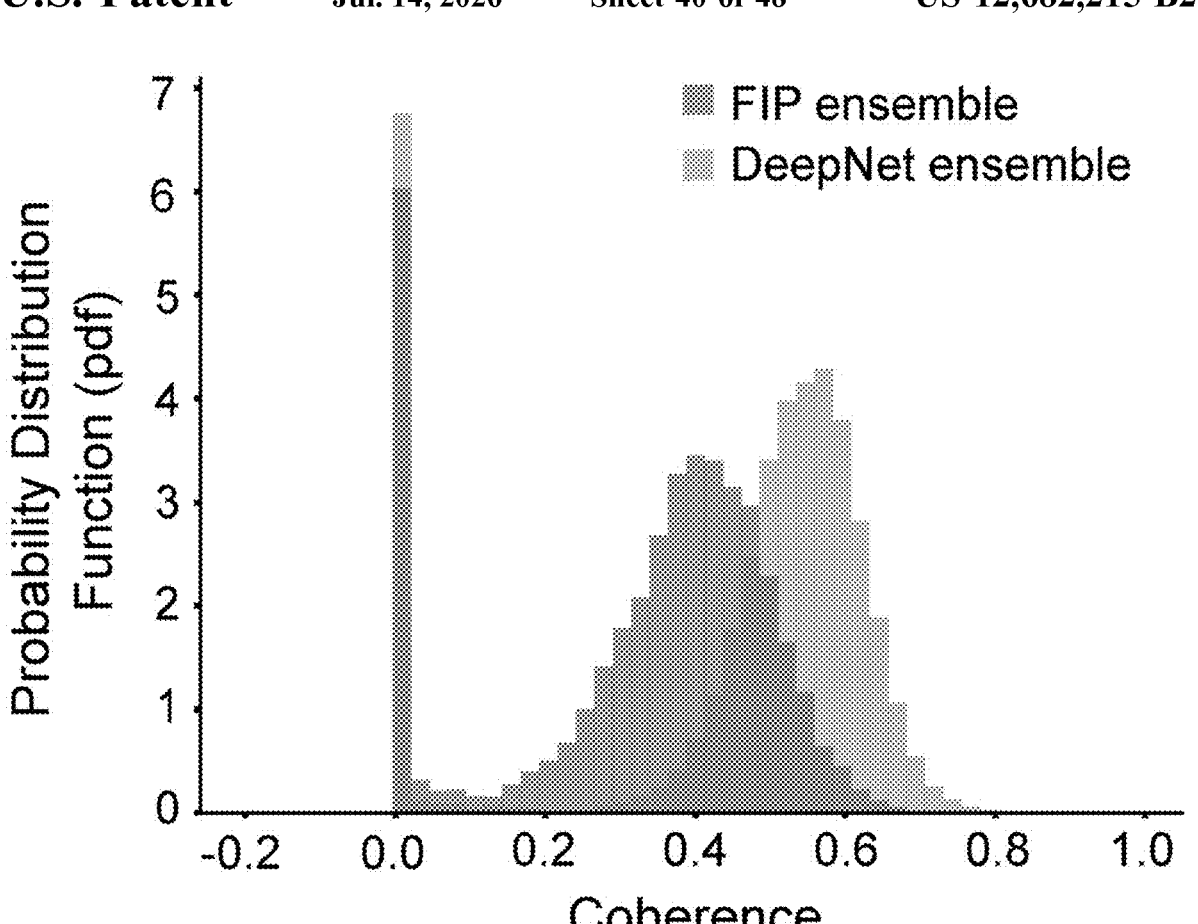
Figure 11F:
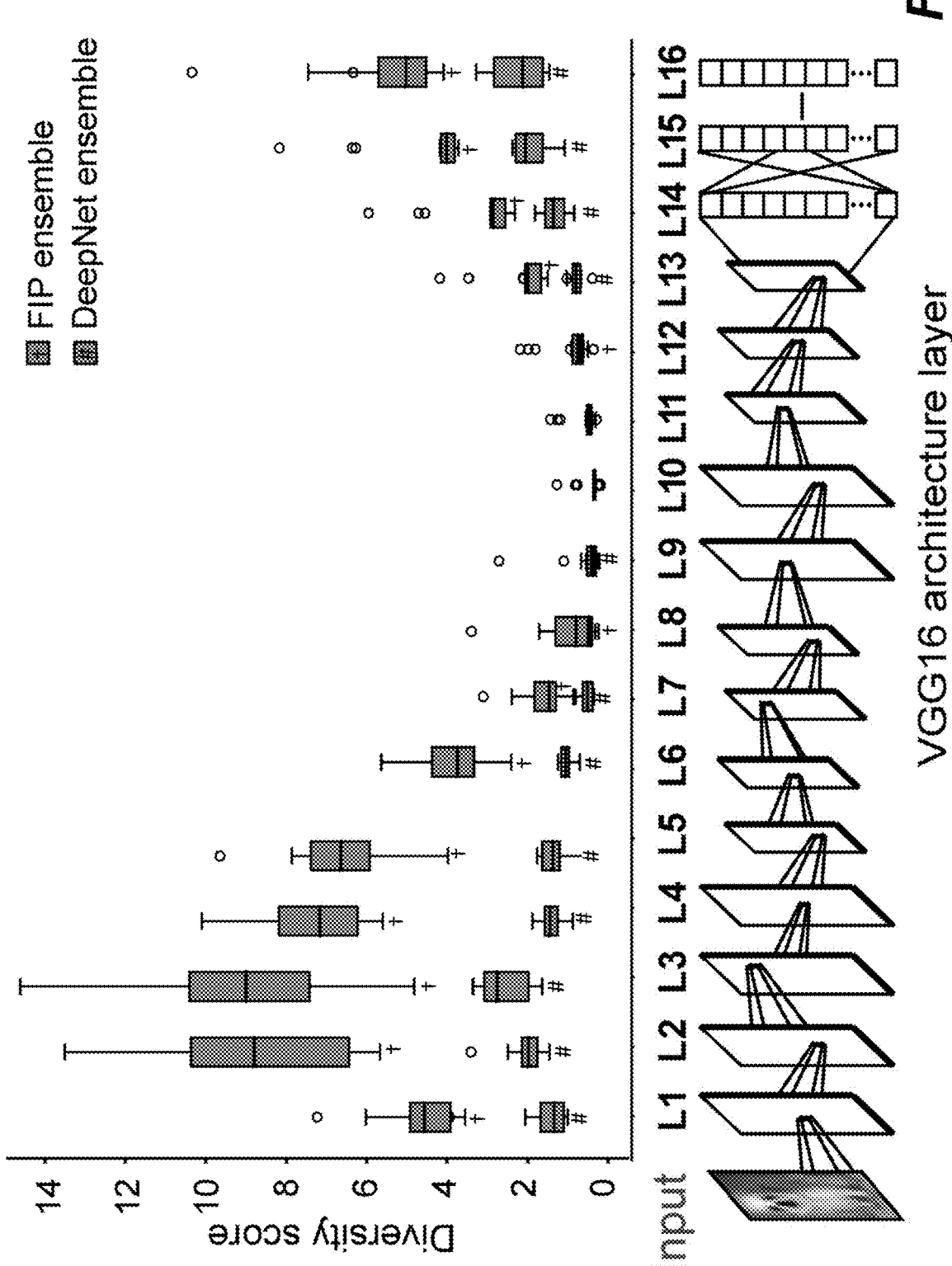

As FIP ensembles have a higher intra-ensemble diversity as measured by the representation diversity score, they are more robust in mitigating adversarial failure. A diversity score was computed for both ensembles (FIP, DN) by evaluating the standard deviation of the $L_2$ norm of the network's activation across all networks in the ensemble along each layer for a set of image-inputs. As shown in FIG. 11F, the FIP ensemble had a much higher diversity score than the DeepNet ensemble, with a more pronounced difference between the two in the earlier layers (from Layer 1 to Layer 6) and the later layers (Layer 15 and Layer 16).

In addition to having a high intra-ensemble diversity, it was found that the networks in the FIP ensemble have low coherence with a trained surrogate network (network instance used to generate adversarial images) as compared to the DN ensemble. In FIG. 11E, the left-shifted coherence distribution of the FIP ensemble (dark gray histogram) when compared to the DN ensemble (light gray histogram) suggests that the adversarial examples generated against the surrogate network are less likely to attack the FIP ensemble, improving robustness of the FIP ensemble against adversarial attacks.

Discussion

Described herein is a mathematical theory and algorithm for training path connected sets of neural networks to solve machine learning problems. In some embodiments, path connected sets of networks can be applied to diversify the functional behavior of a network, enabling the network to accommodate additional tasks, to prune weights, or generate diverse ensembles of networks for preventing failure to adversarial attack.

Fundamentally, the methods disclosed herein exploit a parameter degeneracy that is intrinsic to large mathematical models. Recent work in physics has demonstrated that physical models with large numbers of parameters often contain parameter degeneracy such that model parameters can be set to any value within a sub-manifold of parameter space without loss of accuracy in predicting experimental data. In such situations, input data constrains parameters to lie within a sub-manifold of manifold parameter space, but the models contain an intrinsic 'sloppiness'. Sloppiness can emerge for a variety of reasons including low dimensional structure in the input data, blurring out of short-length scale behaviors, and non-linearity. Signatures of model degeneracy exist in the spectrum of the Fisher information matrix of the model which provides an analogous mathematical object to the metric tensor developed in the path framework.

Modern deep neural networks contain large numbers of parameters that are fit based on training data, and so are similar mathematical objects to large physical models with large numbers of parameters, and in fact, exact mappings between statistical mechanics models and neural networks exist. Further, like large physical models, neural networks contain the same potential sources of degeneracy. Neural networks utilize non-linear weight functions like the ReLU or sigmoid function. Input data sets used in image classification like MNIST and FashionMNIST or CIFAR also have low dimensional structure. Moreover, if data classes depend only on coarse grained information within an image, then pixel level changes in image interpretation can become insignificant, and entire space of models emerges that can solve a specific image classification problem.

Mathematically, the neural networks that are analyzed have mathematical signatures of significant parameter degeneracy after training, through spectral analysis of the metric tensor. In considered models, weight space contains sub-spaces of dimension where movement of parameters causes insignificant change in network behavior. The FIP algorithm explores these degenerate sub-spaces or sub-manifolds of parameter space. It is implicitly shown that exploration of the degenerate sub-space can find regions of flexibility where parameters can accommodate a second task (a second image classification task) or goal like sparsification. Basic methods from differential geometry can be applied to identify and traverse these degenerate sub-spaces. In some embodiments, additional concepts from differential geometry can be applied to refine paths by minimizing not only the velocity along a weight space path but also acceleration.

Broadly, the method presented herein can shift attention from single networks to the path-connected sets of neural networks that can emerge due to local variation in network weights. The weights within biological neural networks, synaptic strength, can fluctuate due to stochastic chemical effects and the impact of activity based regulation. In some embodiments, biological neural networks also explore paths of networks to increase their flexibility and robustness. In some embodiments, networks also explore paths through fluctuations or also through the influence of top-down activity. By traversing functionally invariant paths, networks can find routes to learning new tasks or secondary goals. However, in some embodiments, the paths can be even more broadly useful, allowing a single network to take on a range of different functions. In this way, by shifting attention from networks as single points to exploring sub-manifolds of the weight space, the methods described herein introduce a potential principle of intelligence and motivates the use of mathematical methods for studying the local and global geometry of functionally invariant solution sets to machine learning problems.

Materials and Methods

Described herein is a geometric framework to solve at least three core challenges in modern machine learning, namely: (i) Alleviating Catastrophic forgetting, (ii) Network sparsification, and (iii) Increasing robustness against adversarial attacks. Discussed below are the datasets, parameters/hyperparameters used for the algorithms, and the pseudo-code for each of the core challenges addressed above.

Catastrophic Forgetting

Datasets and Preprocessing

The models were tested on two paradigms. The first is a 2-sequential task paradigm, where the model is exposed two tasks, sampled from the MNIST and Fashion-MNIST dataset sequentially. The MNIST training dataset contains 60,000 gray-scale images of 10 classes of hand-written digits (0-9), and Fashion MNIST training dataset contains size respectively. The last three layers are fully connected layers with 600, 120 and 20 nodes in Layers 3, 4 and 5 respectively. Both the convolutional layers have a 2D batchnorm as well as a 2×2 MaxPool layer. All the layers (except layer 5) has a ReLU non-linearity. The 5 layer CNN has a total of 1.4 million trainable parameters. A Reduced ResNet18 with a total of 100 output classes was used for the 20 task paradigm from SplitCIFAR100. The Reduced ResNet18 has three times lesser feature maps in each of the layers as compared to ResNet18, same as the architecture introduced in "D. Lopez-Paz, M. Ranzato, *Advances in neural information processing systems* 30 (2017)." Reduced ResNet18 has a total of 1.1 million trainable parameters.

Pseudo-Code: FIP Construction for CF Problems

ALGORITHM 2.1
FIP CONSTRUCTION FOR CF PROBLEMS
Require: $\lambda$, $\eta$: step-size hyperparameters, $N_T$: Number of sequential tasks

| | | Notes |
|---|---|---|
| 1: | procedure FIP-CF($\lambda$, $\eta$, $N_T$) | |
| 2: | random initialize $w_0$ | |
| 3: | $B_i \leftarrow \{\ \}$ $\forall$ i = 1,2, ..., $N_T$ | Buffer with $n_{mem}$ memories from previous tasks |
| 4: | for i $\leftarrow$ 1 to $N_T$ do | |
| 5: | $w_i \leftarrow w_{i-1}$ | |
| 6: | (x, t) $\leftarrow$ Task-i | minibatch of images (x) and target labels (t) from task-i |
| 7: | $B_1 \leftarrow B_1 \cup x$ | update buffer |
| 8: | CEloss $\leftarrow$ crossEntropy(f(x, $w_i$, t) | Classification loss for new task |
| 9: | Yloss $\leftarrow$ 0 | |
| 10: | for j $\leftarrow$ 1 to i–1 do | |
| 11: | Yloss += Ydist(f(x, $w_i$), f($B_j$, $w_{i-1}$)) | Distance moved in output space (Y) |
| 12: | end for | |
| 13: | S $\leftarrow$ CEloss + $\lambda$*Yloss | Construct FIP with direction from loss gradient |
| 14: | $w_i \leftarrow w_i - \eta \nabla_{w_i} S$ | |
| 15: | end for | |
| 16: | return $w_i$ | |
| 17: | end procedure | |

60,000 gray-scale images of 10 classes of fashion items (e.g., purse, pants, etc.). The test set contains 10,000 additional images from each dataset. Together, the two datasets contain 20 classes. The 10 digits in MNIST are labelled 0-9, and the 10 classes in Fashion MNIST are labelled 10-19 in the experiments. Images and labels corresponding to the first 10 classes (MNIST) are fed to the network as Task-1, followed by the images and labels from the next 10 classes (Fashion-MNIST) as Task-2. The second paradigm was SplitCIFAR100 (20 sequential task paradigm), where the model is exposed to 20 tasks, sampled from the CIFAR100 dataset. The CIFAR100 dataset contains 50,000 RGB images for 100 classes of real-life objects in the training set, and 10,000 images in the testing set. Each task requires the network to identify images from 5 non-overlapping CIFAR100 classes.

Network Architecture

All state-of-art methods for alleviating CF in the 2-task and 20-task paradigm used the same network architecture, as described below. A 5-layered CNN with a total of 20 output classes (10 from MNIST and 10 from Fashion-MNIST) was used for the 2 task paradigm. The first 2 layers are convolutional layers, with 32 and 64 cony-filters with 3×3 kernel

Code Specifications

All the code was written in the PyTorch framework, and the automatic-differentiation package was extensively used for constructing computational graphs and computing gradients for updating network parameters. The code for constructing FIP's for the 2-task and 20-task paradigm were run on Caltech's High-Performance computing cluster—using a single GPU for a total time of 1 hour and 10 hours respectively (for the 2-task, 20-task paradigm).

Parameters Used

The parameters used for current state-of-art methods across different models and datasets were selected after grid-search to maximize accuracy. Functionally invariant path (FIP) for 2-task paradigm: $\eta$=0.01, Optimizer used: Adam, weight decay=2e-4, $\lambda$=1, n-memories from previous task=500/60000 (=0.8% previous dataset). Elastic weight consolidation (EWC) for 2-task paradigm: Optimizer used=Adam, EWC regularization coefficient ($\lambda$)=5000, learning-rate=0.001, batch-size=128, number of data samples from previous task to construct Fisher metric=500. Functionally invariant paths (FIP) for 20-task paradigm: $\eta$=0.01, Optimizer used: Adam, weight decay=2e-4, $\lambda$=1, n-memories from previous task=250/2500 (=10% previous tasks). Gradient episodic memory (GEM) for 20-task paradigm: n-memories from previous task=250, learning-rate=0.01, number of epochs (per task)=20, memory-strength=0.5, batch-size=128. Elastic Weight consolidation (EWC) for 20-task paradigm: Optimizer used=Adam, EWC++ alpha=0.9, EWC regularization coefficient ($\lambda$)=5000, learning-rate=0.001, Fisher metric update after 50 training iterations, batch-size=128.

Implementation of Other CF Methods

We implemented the Elastic Weight consolidation (EWC) method by adapting code from the repository: github.com/moskomule/ewc.pytorch. The Gradient episodic memory (GEM) method was applied by adapting code from: github-.com/facebookresearch/GradientEpisodicMemory.

Network Sparsification

Datasets and Preprocessing

The models were sparsified on two well-known image datasets: MNIST: The MNIST training dataset contains ReLU non-linearity. ResNet20 with a total of 10 output classes was used for training and compression on the CIFAR-10 dataset. The ResNet-20 network has 20 convolutional layers with skip connections, with a total of 0.27 million trainable parameters.

Pseudo-Code: FIP Construction for Network Sparsification

Code Specifications

All the code was written in the PyTorch framework, and the automatic-differentiation package was extensively used for constructing computational graphs and computing gradients for updating network parameters. The code for constructing FIP' s to the p % sparse submanifolds were run on Caltech's High-Performance computing cluster—using a single GPU for a total time ranging between 2-6 hours for final network sparsity's below 80%, and between 24-30 hours for identifying high performance networks in submanifolds with larger than 80% sparsity.

---

ALGORITHM 2.2
FIP CONSTRUCTION FOR NETWORK SPARSIFICATION
Require: $\lambda$, $\eta$: step-size hyperparameters
Require: p: Final desired network sparsity (in %)
Require: $w_t$: Network trained on MNIST or CIFAR-10 dataset

| | Notes |
|---|---|
| 1: procedure FIP-SPARSE($\lambda$, $\eta$, p, $w_t$) | |
| 2:   $w \leftarrow w_t$ | |
| 3:   while ($\|w\|_0 / \|w_t\|_0$) NOT (1 − p/100) do | Until w not in p % sparse submanifold |
| 4:     $w_p \leftarrow$ project(w, p) | Set p % of smallest weights to zero |
| 5:     $L(w) \leftarrow \|w - w_p\|_2$ | |
| 6:     $x \leftarrow$ Dataset (MNIST or CIFAR) | Sample minibatch of images from dataset |
| 7:     OPloss $\leftarrow$ odist(f(x, w), f(x, $w_t$)) | Distance moved in output space |
| 8:     $S \leftarrow$ OPloss + $\lambda$ * L(w) | |
| 9:     $w \leftarrow w - \eta \nabla_w S$ | Constructing FIP towards sparse submanifold |
| 10:   end while | |
| 11:   return w | |
| 12: end procedure | |

---

60,000 gray-scale images of 10 classes of hand-written digits (0-9). The test set contains 10,000 additional images from the 10 digit classes. CIFAR-10: The CIFAR10 training dataset contains 50,000 RGB images of 10 classes of natural images (like trucks, horses, birds, ships to name a few). The test set contains 10,000 additional images from each of the 10 classes.

Network Architecture

The networks used for demonstrating the strategy of constructing FIP in weight space for compression were: Multilayer perceptron (LeNet-300-100), which has 3 fully connected layers for the MNIST task. The first layer (input) has 784 nodes, hidden layers 2, 3 have 300 and 100 nodes respectively. The last layer (output) has 10 nodes (corresponding to 10 digit classes in the dataset). LeNet-300-100 has a total of 484000 trainable parameters (all non-zero, post training on MNIST). All the layers (except output layer) has

Parameters Used

FIP for network sparsification: $\lambda$=1, $\eta$=0.01, Optimizer used: Adam ($\beta$=(0.9, 0.999)), Final (desired) network sparsities for LeNet-300-100 on MNIST: p=[20%, 67%, 89%, 96%, 98.7%, 99%, 99.1%, 99.4%], Final (desired) network sparsities for ResNet-20 on CIFAR-10: p=[20%, 36%, 49%, 59%, 67%, 79%, 83%, 89%, 93%, 95%].

Lottery ticket hypothesis: (For LeNet-MNIST):=batch-size=128, model-init=kaiming-normal, batchnorm-init=uniform, pruning-strategy=>sparse-global, pruning-fraction=0.2, pruning-layers-to-ignore=fc.weight, optimizer-name=sgd, learning rate=0.1, training-steps=40 epochs. (For ResNet20-CIFAR10): batch-size=128, model-init=kaiming-normal, batchnorm-init=uniform, pruning-strategy=sparse-global, pruning-fraction=0.2, optimizer-name=sgd, learning rate=0.1, training-steps=160 epochs, momentum=0.9, gamma=0.1, weight-decay=>0.0001.

Implementation of Other Sparsification Methods

The Lottery ticket hypothesis was implemented for sparsifying both LeNet-300-100 trained on MNIST and Res- Net20 trained on CIFAR-10. To do so, code was adapted from the repository: github.com/facebookresearch/open_1th.

Adversarial Robustness

Datasets and Preprocessing

The models were trained on CIFAR-10 dataset and the adversarial examples were generated on the same using the was constructed by taking multiple steps (S) in the image-input space, wherein the adversary is within within an $\epsilon$-$1_\infty$ bound. $x^{t+1}=\Pi_{x+S}$ ($x^t+\alpha$ sgn($\nabla_x C(w_t,$ x, y))). In some embodiments, as many steps (S) as required can be taken until the adversarial input ($x^{t+1}$) exits the $\epsilon$-$1_\infty$ bound. $\epsilon$=0.3 and $\alpha$=2/255 can be chosen for generating CIFAR-10 adversarial examples against VGG16 networks.

Pseudo-Code: FIP for Adversarial Robust Ensembles

ALGORITHM 2.3
FIP FOR ADVERSARIALLY ROBUST ENSEMBLES
Require: $\eta$: step-size, $w_t$: Network trained on CIFAR-10 dataset, $\in$: $1_\infty$ of adversary perturbation
Require: $\delta$: permissible change in output distance, max-iter: number of steps in the FIP

| | | Notes |
|---|---|---|
| 1: | procedure FIP-ENSEMBLE ($\eta$, $w_t$, $\delta$, $\in$) | |
| 2: | w ← $w_t$ | |
| 3: | ii ← 0 | setting counter = 0 |
| 4: | F ← { } | List of networks in the FIP ensemble |
| 5: | while ii ≤ max – iter do | |
| 6: | (x, y) ← Dataset (CIFAR10) | Sample minibatch of images from dataset |
| 7: | S ← odist(f(x, w), f(x, $w_t$)) | Output space distance for varying network's weights |
| 8: | w ← w – $\eta\nabla_w S$ | Construct undirected FIP |
| 9: | x' ← x + $\in$sgn($\nabla_x C$(w, x, y)) | |
| 10: | H ← odist(f(x, w), f(x', w))) | Output space distance for perturbed input |
| 11: | if H ≤ $\delta$ then | |
| 12: | F ← F ∪ w | |
| 13: | end if | |
| 14: | ii ← ii + 1 | |
| 15: | end while | |
| 16: | return F | Returning FIP ensemble with adversarial robustness |
| 17: | end procedure | | projected gradient descent (PGD) method. CIFAR-10: The CIFAR-10 training dataset contains 50,000 RGB images of 10 classes of natural images (like trucks, horses, birds, ships to name a few). The test set contains 10,000 additional images from each of the 10 classes.

Network Architecture

For the adversarial robustness section, the VGG-16 network was used, which has 16 layers, and a total of 138 million trainable parameters.

Generating an Adversarial Attack

The projected gradient descent (PGD) method was used to generate CIFAR-10 data samples that are imperceptibly similar to their original images for humans, but cause significant performance loss to deep networks. An exemplary procedure for generating adversarial inputs is detailed below. A VGG16 network was randomly initialized and trained on CIFAR-10 (trained network=$w_t$). A single image-input (x) was taken from the CIFAR-10 dataset and passed through the trained network, and the gradient of the classification loss was calculated (cross-entropy (C) with respect to the input (grad=$\nabla_x C(w_t,$ x, y)). An adversarial input (x')

Code Specifications

All the code was written in the PyTorch framework, and the automatic-differentiation package was extensively used for constructing computational graphs and computing gradients for updating network parameters. The code for constructing undirected FIPs in the weight space, followed by sampling a small sub-set of networks along the FIP was run on Caltech's High-Performance computing cluster—using a single GPU for a total time ranging between 2-6 hours.

Parameters Used

To generate ensembles of deep-networks, parameters were selected after a grid-search to maximize robustness against adversarial failure. FIP ensemble: $\eta$=0.01, $\epsilon$=0.3, Mini-batch size=100, $\delta$=35 (Inputs to the FIP construction/ensemble pseudo-code detailed above). Adaptive diversity promoting (ADP) ensemble: alpha=2, beta=0.5, (alpha, beta are parameters maximizing diversity of ensemble) optimizer used=SGD, momentum=0.9, learning rate=0.05, weight-decay=2e-4, batch-size=128, num-networks-per-ensemble=3, 5, 10 (three different ensembles). Fast Geometric ensembling (FGE): model=VGG16, epochs=40, weight-decay=3e-4, learning-rate-1=0.5e-2 learning-rate-2=1e-2, cycle=2

Implementation of Other Ensemble Generation Methods for Adversarial Robustness Ensembles of deep networks (VGG16) were generated using three state-of-art methods. The first method, "DeepNet (DN) ensemble" was constructed by training multiple independently initialized VGG16 networks. The second method "Adaptive Diversity promoting (ADP)" was obtained by adapting the code from: github.com/P2333/Adaptive-Diversity-Promoting. The third method "Fast geometric ensembling" was obtained by adapting the code from t: github.com/timgaripov/dnn-mode-connectivity.

FIPs Alleviate CF in 5-Task Paradigm

Figure 12A:
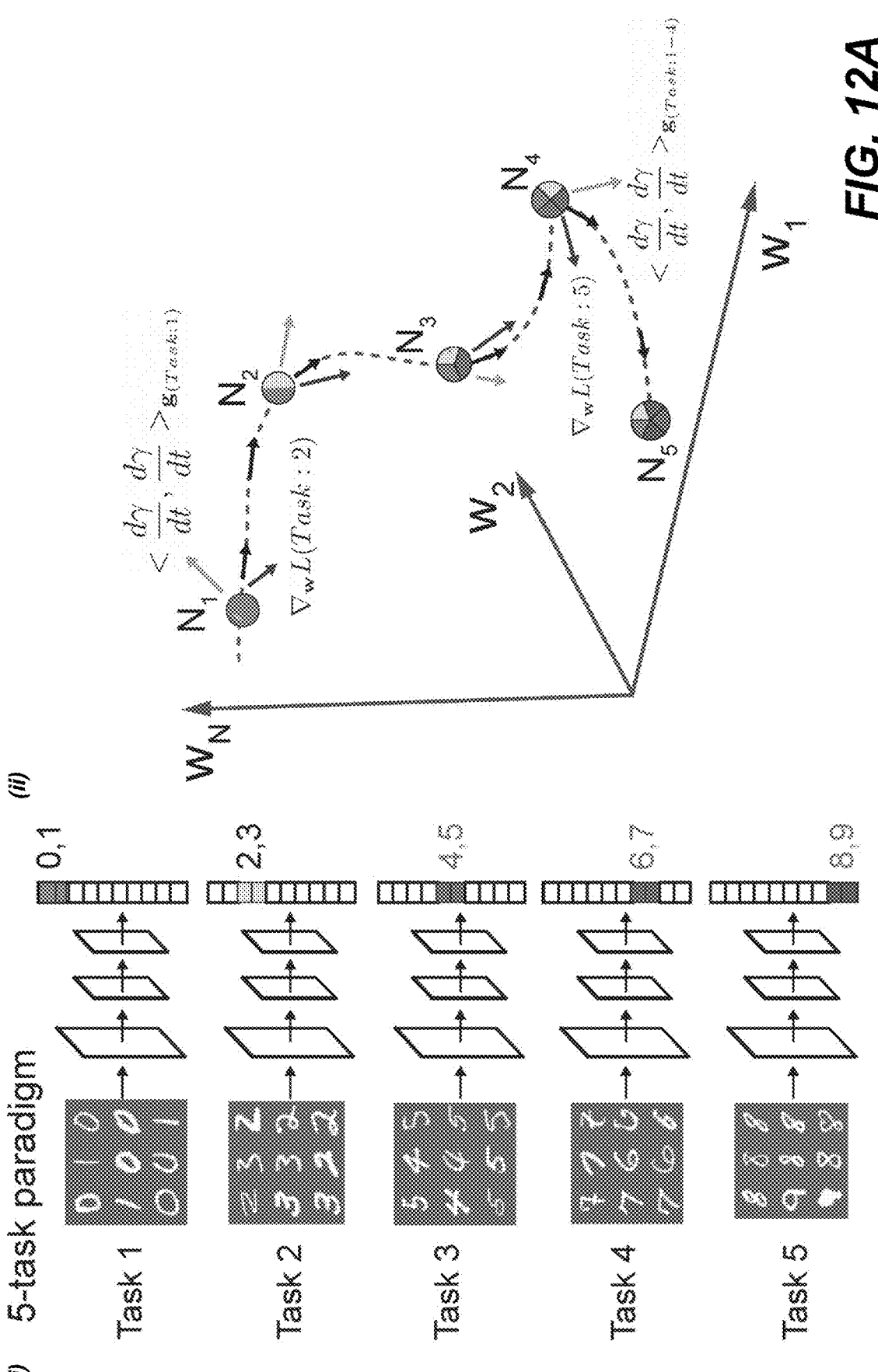

To demonstrate sequential task learning, the framework was applied to a Multi-layer perceptron (MLP) with 2 hidden layers of 400 nodes each and 10 output classes, by subjecting them to 5 sequential tasks derived from the MNIST dataset. As shown in FIG. 12A, panel (i), each task is generated from different subsets of image-classes from the MNIST dataset. Task-1 comprises of MNIST digits 0's and 1's, Task-2 comprises of MNIST digits 2's and 3's and so on.

To circumvent catastrophic forgetting in the 5 sequential task paradigm, the optimization problem in Equation 2.4 was solved by setting L as the loss function specified by the new task (Task-i) represented by dark-gray arrows in FIG. 12A, panel (ii), while $$\left( \frac{d\gamma}{dt}, \frac{d\gamma}{dt} \right)_{g_{Task-1:i-1}}$$

was chosen to be the distance moved in output space for a small number of inputs sampled from all previous tasks (from Task-1 to Task:i-1) represented by lightest gray arrows in FIG. 12A, panel (ii).

The MLP was trained on the first task (recognizing images of digits 0s and 1s) by gradient descent and a network was obtained that performs at an accuracy of 98% on the first task. In graph shown in FIG. 12B, panel (i), the first point on the x-axis corresponds to the network trained on the first task alone, and the "Task 1" line records test accuracy on the first task.

Having trained the MLP on the first task, the network was trained on subsequent tasks (e.g. recognizing images of digits 2s and 3s, recognizing digits 4s and 5s) by constructing FIPs in the weights space and obtaining networks that simultaneously retain performance on all previous tasks while learning a new task. In the graph in FIG. 12B, panel (ii), the region corresponding to Task-2 (first 25 points along the x-axis) captures the test accuracy of networks on the first two tasks ("1", "2" respectively) while traversing the FIP in weights space beginning from $N_1$ (MLP trained on Task-1). The networks along the path retained their performance on Task-1 ("1" line) at 98% while increasing their accuracy on Task-2 ("2" line) to 97%. The region corresponding to Task-3 (subsequent 11 points, 26 to 36, on the x-axis) is comprised of networks that retained their performance on both Task-1 and Task-2 (at 97% and 95% respectively) while increasing their accuracy on Task-3 ("3" line) to 97%. Finally, on introducing Task-5, corresponding to points 47-58 on the x-axis in region labeled Task-5, networks were uncovered that performed at 96.74%, 88.64%, 89.33%, 94.36% and 91.23% on Tasks 1 to 5 respectively, with an average performance of 92.01% on the MNIST dataset having shown 2 classes at a time.

Figure 12B:
Figure 12B:
Figure 12B:

The networks discovered along the FIP can mitigate catastrophic forgetting while being trained on multiple tasks in sequence as they retain their classification score on previous tasks while increasing their score on new tasks. In FIG. 12B, the heatmap captures the classification score by feeding 1000 images from each task to the network (or 5000 images from 5 tasks). The first 24 networks (1-24) retain their classification score on Task-1, while increasing their classification score on Task-2. The subsequent 11 networks (25-36) retain their classification score on both Task-1 and Task-2 while increasing its score on Task-3. The last segment of the path (corresponding to network-47 to network-58) retain their score on Tasks 1 through 4, while increasing their classification score on Task-5. Having presented all 5 tasks to the network, the path-finding framework discovered networks that perform at 92.1±0.06% accuracy on the 5 tasks, while the conventional method performed at 18±2%.

Figure 12C:
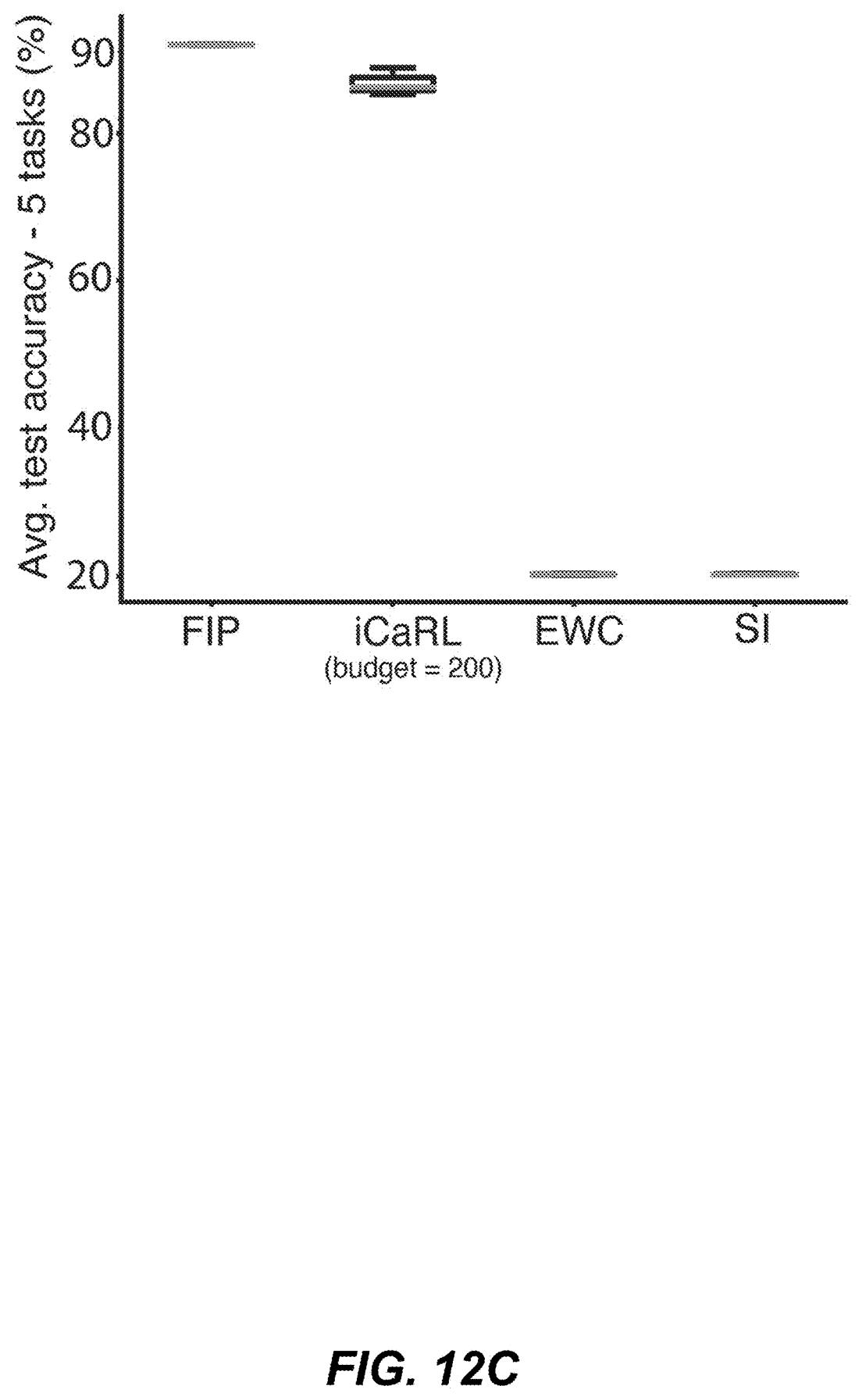

The FIP approach performs better than current state-of-art methods to alleviate catastrophic forgetting while learning sequential tasks, like Elastic Weight Consolidation (EWC) on the 5-task paradigm (FIP: 92.1±0.06%, EWC:20±0.08%) (FIG. 12C).

Constructing FIP Ensemble for Adversarial Robustness

Selection Criteria for FIP Ensemble

Having constructed an FIP in the weight space, beginning from a deep network trained on CIFAR-10, a selection-criteria was introduced to sample diverse networks along the FIP to construct the FIP ensemble. As it can be desirable for FIP ensemble to be robust to adversarial input perturbation, random perturbations were generated in the image space (within an $\epsilon$ ball) and the distance moved in the networks' output space was computed for a small perturbation in the image-space.

Figures 13A, 13B:
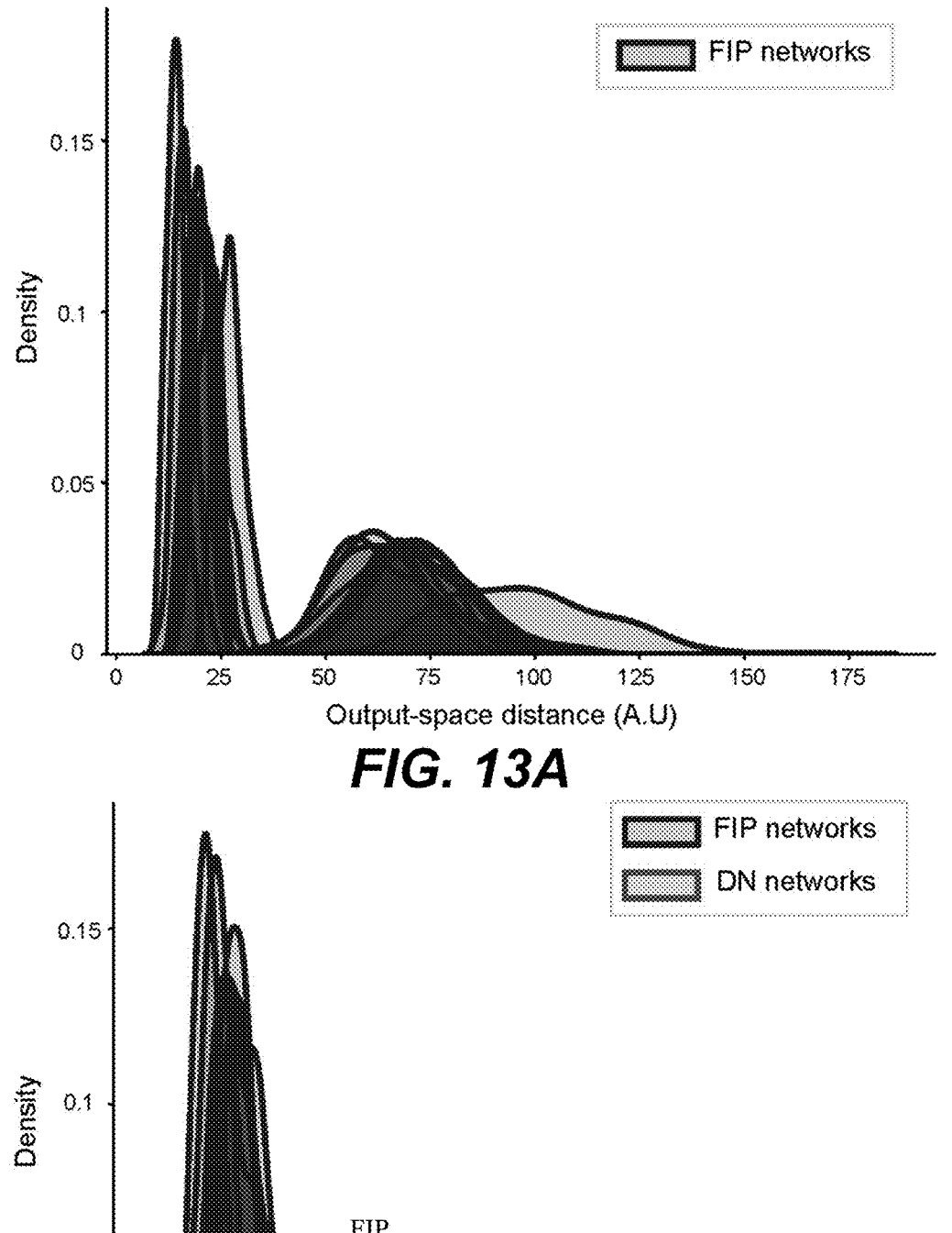
FIG. 13A-FIG. 13C depict non-limiting exemplary data related to FIP ensemble construction.

The distance moved in the networks' output space was recorded (across all networks in the constructed FIP) and a distribution was plotted of the distance moved in the output space for a small perturbation in the image-input space. As shown in FIG. 13A, it was found that some networks along the FIP exhibit smaller perturbation in the output space and have a narrower distribution across 10 k perturbed training inputs, while others exhibit larger perturbation in the output space. Networks were chosen that exhibited a smaller perturbation in the output space for constructing the FIP ensemble.

FIP Ensembles are More Robust than DN Ensemble

Figure 13C:
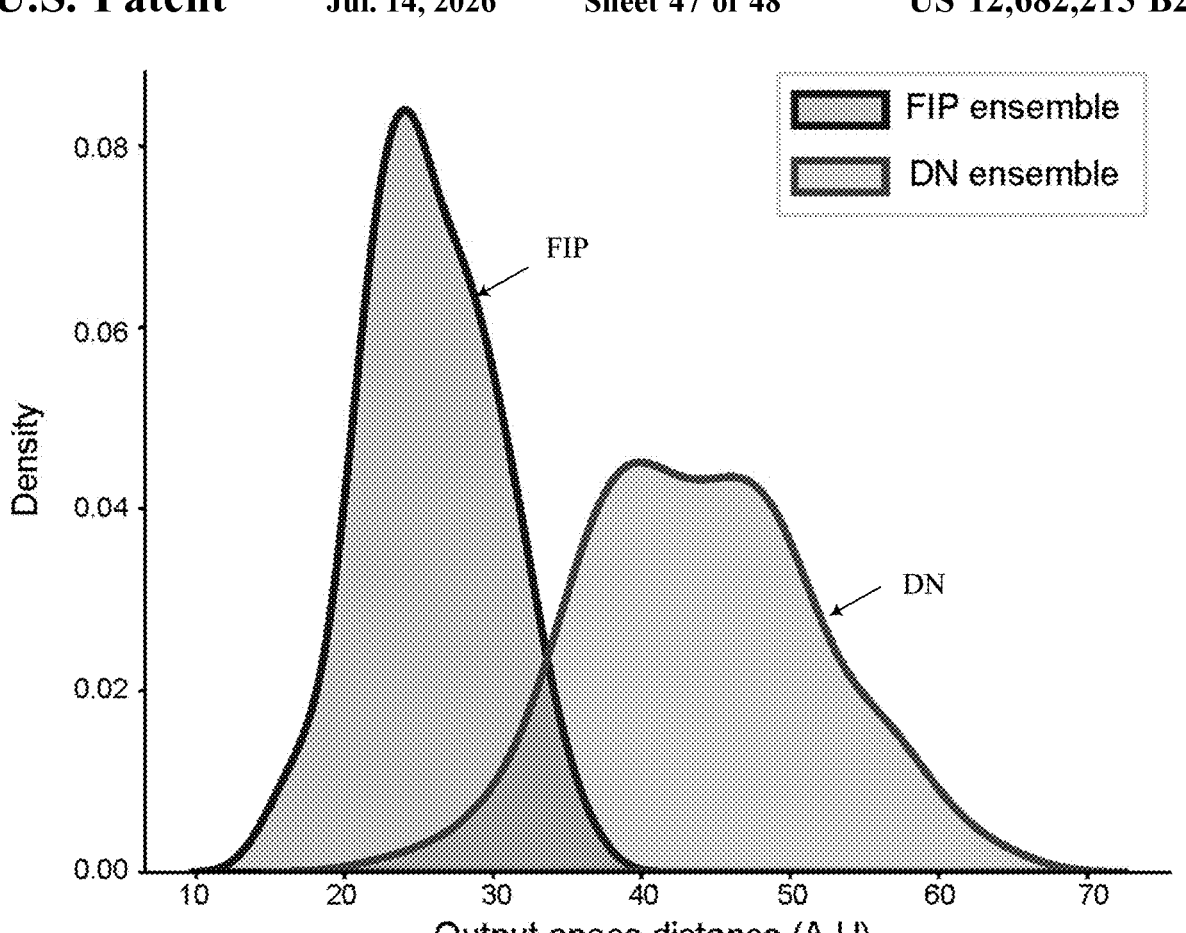

In some embodiments, the networks in the FIP ensemble exhibited much smaller perturbation in the output space for an $\epsilon$-perturbation in the input space, when compared to the networks in the DeepNet ensemble (composed of 10 independently trained deep networks), as seen in FIG. 13B-FIG. 13C. The "FIP" histogram corresponds to the output distance distribution of networks in the FIP, while the "DN" histogram corresponds to the output distance distributions of networks in the DeepNet ensemble.

Flexible Machine Learning

Disclosed herein include methods of generating a neural network (or a machine learning model in general). In some embodiments, a method of generating a neural network is under control of a processor (e.g., a hardware processor or a virtual processor) and comprises: (a) receiving a first neural network (or a first machine learning model generally).

The first neural network can comprise a plurality of first weights in a weight space. The first neural networks can map an input (e.g., of an input space) to an output in an output space. The method can comprise: (b) determining a second neural network of a plurality of second neural networks (or a second machine learning model of a plurality of second machine learning models) from the first neural network along a functionally invariant path (FIP) in the weight space. The FIP can be with respect to the first neural network. The second neural network can comprise a plurality of second weights in the weight space. The method can comprise: (c) determining another second neural network of the plurality of second neural networks (or another machine learning model of the plurality of second machine learning models) from the immediate prior second neural network (e.g., the second neural network from (b) during the first iteration of (c), or the second neural network from the immediate prior iteration of (c) for any subsequent iteration of (c)) along the FIP in the weight space. The other second neural network can comprise a plurality of second weights in the weight space. The method can comprise: (d) repeating (c) for a number of iterations. In some embodiments, the final second neural network (the second neural network from the last iteration) can have advantageous properties. For example, the first neural network can be for (e.g., trained for) a first task, and the final second neural network can retain performance on the first task while gaining performance on a second task. For example, the final second neural network can have performance similar (e.g., less than 1% or 0.1% difference) to that of the first neural network, but is sparsified. For example, the plurality of second neural networks (or the plurality of second neural networks with the first neural network) can be used as an ensemble which is not as susceptible to adversarial attach (e.g., relative to the first neural network).

In some embodiments, the number of the plurality of second neural networks (or any plurality of neural networks, such as a plurality of third neural networks, a plurality of ith network) is or is at least, for example, 2, 3, 4, 5, 6, 7, 8, 9, 10, 15, 20, 30, 40, 50, 60, 70, 80, 90, 100, 200, 300, 400, 500, 600, 700, 800, 900, 1000, 1000, or more. In some embodiments, the number of iterations is predetermined. For example, the number of iterations is or is at least 2, 3, 4, 5, 6, 7, 8, 9, 10, 15, 20, 30, 40, 50, 60, 70, 80, 90, 100, 200, 300, 400, 500, 600, 700, 800, 900, 1000, 1000, or more. In some embodiments, (d) repeating (c) comprises: repeating (c) until an accuracy of the second neural network from the current iteration of (c) is above a threshold (e.g., 80%, 81%, 82%, 83%, 84%, 85%, 86%, 87%, 88%, 89%, 90%, 91%, 92%, 93%, 94%, 95%, 96%, 97%, 98%, or 99%). The accuracy can be with respect to a held-out set or a test dataset (which can have a size of, for example, 100, 1000, 5000, 10000, 50000, 100000, 500000, or more). In some embodiments, (d) repeating (c) comprises: repeating (c) until a difference in an accuracy of the second neural network from the current iteration of (c) and an accuracy of the second neural network from the immediate prior iteration of (c) is less a threshold (e.g., 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, or 0.1%).

Disclosed herein include methods of generating a neural network (or a machine learning model generally). In some embodiments, a method of generating a neural network is under control of a processor (e.g., a hardware processor or a virtual process) and comprises: (a) receiving a first neural network. The first neural network can comprise a plurality of first weights in a weight space. The first neural networks can map an input (e.g., in an input space) to an output in an output space. The method can comprise: (b) determining a second neural network of a plurality of second neural networks (or a second machine learning model of a plurality of second machine learning models) from the first neural network along a functionally invariant path (FIP) in the weight space. The FIP can be with respect to the first neural network. The second neural network can comprise a plurality of second weights in the weight space. The method can comprise: (c) iteratively, determining another second neural network of the plurality of second neural networks (or another second machine learning model of the plurality of machine learning models) from the immediate prior second neural network (e.g., the second neural network determined in (b) for the first iteration of (c), or the second neural network determined in the immediate prior iteration of (c) for any subsequent iteration of (c)) along the FIP in the weight space. The other second neural network can comprise a plurality of second weights in the weight space.

In some embodiments, the number of the plurality of second neural networks (or any plurality of neural networks, such as a plurality of third neural networks, a plurality of ith network) is, for example, 2, 3, 4, 5, 6, 7, 8, 9, 10, 15, 20, 30, 40, 50, 60, 70, 80, 90, 100, 200, 300, 400, 500, 600, 700, 800, 900, 1000, 1000, or more. In some embodiments, the number of iterations is predetermined. For example, the number of iterations is or is at least 2, 3, 4, 5, 6, 7, 8, 9, 10, 15, 20, 30, 40, 50, 60, 70, 80, 90, 100, 200, 300, 400, 500, 600, 700, 800, 900, 1000, 1000, or more. In some embodiments, (c) is repeated until an accuracy of the second neural network from the current iteration of (c) is above a threshold (e.g., 80%, 81%, 82%, 83%, 84%, 85%, 86%, 87%, 88%, 89%, 90%, 91%, 92%, 93%, 94%, 95%, 96%, 97%, 98%, or 99%). The accuracy can be with respect to a holdout set or a test set (which can have a size of, for example, 100, 1000, 5000, 10000, 50000, 100000, 500000, or more). In some embodiments, (c) is repeated until a difference in an accuracy of the second neural network from the current iteration of (c) and an accuracy of the second neural network from the immediate prior iteration of (c) is less a threshold (e.g., 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, or 0.1%).

Disclosed herein include methods of generating a neural network (or a machine learning model generally). In some embodiments, a method of generating a neural network is under control of a processor (e.g., a hardware processor or a virtual processor) and comprises: receiving a first neural network (or a first machine learning model generally). The first neural network can comprise a plurality of first weights in a weight space. The first neural network can map an input (in an input space) to an output in an output space. The method can comprise: determining a plurality of second neural networks from the first neural network (or a plurality of second machine learning models) along a functionally invariant path (FIP) in the weight space. The FIP can be with respect to the first neural network. Each of the plurality of second neural networks can comprise a plurality of second weights in the weight space. In some embodiments, the number of the plurality of second neural networks (or any plurality of neural networks, such as a plurality of third neural networks, a plurality of ith network) is or is at least, for example, 2, 3, 4, 5, 6, 7, 8, 9, 10, 15, 20, 30, 40, 50, 60, 70, 80, 90, 100, 200, 300, 400, 500, 600, 700, 800, 900, 1000, 1000, or more.

In some embodiments, receiving the first neural network comprises: training the neural network using a first objective function, for example, using gradient descent and/or back propagation. The first neural network can be trained using a training dataset comprising 100, 500, 1000, 5000, 10000, 50000, 100000, 500000, or more, samples.

In some embodiments, determining the second neural network comprises: determining the second neural network using a first objective function. In some embodiments, determining the other second neural network using a first objective function. In some embodiments, determining the plurality of second neural networks comprises: determining the plurality of second neural networks using a first objective function.

In some embodiments, the first objective function is used to prevent or minimize adversarial fragility. The plurality of second neural network can have intra-ensembel diversity. The plurality of second neural networks as an ensemble (or the first neural network and the plurality of second neural networks as an ensemble) can have an accuracy of or of at least 40%, 45%, 50%, 55%, 60%, 65%, 70%, or more, against adversarial attack.

In some embodiments, determining the second neural network comprises determining the second neural network using a first objective function and a second objective function. In some embodiments, determining the other second neural network comprises determining the other second neural network using a first objective function and a second objective function. In some embodiments, determining the plurality of second neural networks comprises: determining the plurality of second neural networks using a first objective function and a second objective function. The second objective function is weighted (e.g., 0.01, 0.02, 0.03, 0.04, 0.05, 0.06, 0.07, 0.08, 0.09, 0.1, 0.11, 0.12, 0.13, 0.14, 0.15, 0.2, 0.3, 0.4, or 0.5) relative to the first objective function.

In some embodiments, the first objective function and the second objective function are together used to prevent or minimize catastrophic forgetting (e.g., for 2 or more tasks, such as 3, 4, 5, 6, 7, 8, 9, 10, 15, 20, 30, 40, 50, 60, 70, 80, 90, 100, 200, 300, 400, 500, or more tasks). In some embodiments, the first objective function corresponds to a first task (or an initial task), and the second objective function corresponds to a second task (or a secondary task). In some embodiments, the first task and the second task are different. In some embodiments, the first task in a classification task, such as an image classification task. The second task can be a different classification task (e.g., an image classification task). There can be, for example, 5, 6, 7, 8, 9, 10, 16, 17, 18, 19, 20, 30, 40, 50, 60, 70, 80, 90, 100, 200, 300, 400, 500, or more classes for a task (e.g., classified by a task). There can be, for example, 5, 6, 7, 8, 9, 10, 20, 30, 40, 50, 60, 70, 80, 90, 100, 200, 300, 400, 500, 1000, 2000, 3000, 4000, 5000, or more classes for all the tasks together (e.g., classified by all the tasks). A class can correspond to a node in the output layer. In some embodiments, the first neural network is for (e.g., trained for) a first task. A second neural network (e.g., a final second neural network) of the plurality of second neural network can be used for the first task and a second task.

In some embodiments, the first task and/or the second task comprises a computation processing task, an information processing task, a sensory input processing task, a storage task, a retrieval task, a decision task, an image classification (or processing or recognition) task, and/or a speech recognition task. In some embodiments, an input to a first neural network and/or a second neural network of the plurality of second neural network comprises an image. An output of the first neural network and/or a second neural network of the plurality of second neural network can be a classification. The first task and/or a second task can comprise an image classification task In some embodiments, determining the plurality of second neural networks comprises: determining the plurality of second neural networks with respect to the first neural network. The method can further comprise: determining a plurality of third neural networks from a final second neural network of the plurality of second neural networks along FIP in the weight space with respect to the final second neural network of the plurality of second neural networks. Each of the plurality of third neural networks can comprise a plurality of third weights in the weight space. The first neural network can be for (e.g., trained) for the first task. The final second neural network can be for a first task and a second task. The final second neural network can retain performance on the first task while gaining performance on a second task. A final third neural network of the plurality of third neural networks can retain performance on the first task and the second task while gaining performance on a third task. The process can be repeated such that a final ith network of a plurality of ith network retains performance on the first task to (i–1)th task while gaining performance on a ith task. i can be, for example, 2, 3, 4, 5, 6, 7, 8, 9, 10, 11, 12, 13, 14, 15, 16, 17, 18, 19, 20, 30, 40, 50, 60, 70, 80, 90, 100, 200, 300, 400, 500, 600, 700, 800, 900, 1000, 5000, or more.

In some embodiments, the first objective function and the second objective function are together used for sparsification. In some embodiments, the first neural network is for (e.g., trained for) a first task, and a second neural network (e.g., a final second neural network) of the plurality of second neural network is for the first task (not the second task). In some embodiments, a percentage of weights of a second neural network being zero is or is at least 10%, 20%, 30%, 40%, 50%, 60%, 70%, 80%, 90%, 91%, 92%, 93%, 94%, 95%, 96%, 97%, 98%, 99%, or a number or a range between any two of these values. In some embodiments, weights between two consecutive layers closer to an input layer is less sparse than weights between two consecutive layers closer to an output layer. Weights between two consecutive layers closer to an input layer can be more sparse than weights between two consecutive layers closer to an output layer. Weights between two consecutive layers closer to an input layer can be approximately or about the same as weights between two consecutive layers closer to an output layer. In some embodiments, weights between two consecutive layers close to an input layer is less sparse than weights between another two consecutive layers. Weights between two consecutive layers close to an input layer can be more sparse than weights between another two consecutive layers. Weights between two consecutive layers close to an input layer can be approximately or about the same as weights between another two consecutive layers. In some embodiments, weights between two consecutive layers close to an output layer is less sparse than weights between another two consecutive layers. Weights between two consecutive layers close to an output layer can be more sparse than weights between another two consecutive layers. Weights between two consecutive layers close to an output layer can be approximately or about the same as weights between another two consecutive layers. In some embodiments, weights between two consecutive layers is less sparse than weights between another two consecutive layers. Weights between two consecutive layers can be more sparse than weights between another two consecutive layers.

Weights between two consecutive layers can be approximately or about the same as weights between another two consecutive layers closer to an output layer. Approximate or about the same can mean less than 0.001%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, or 1% difference.

In some embodiments, the first neural network has an accuracy of or of at least 70%, 75%, 80%, 81%, 82%, 83%, 84%, 85%, 86%, 87%, 88%, 89%, 90%, 91%, 92%, 93%, 94%, 95%, 96%, 97%, 98%, or 99%, with respect to a first task. A second neural network (e.g., a final second neural network) of the plurality of second neural networks can have an accuracy of or of at least 70%, 75%, 80%, 81%, 82%, 83%, 84%, 85%, 86%, 87%, 88%, 89%, 90%, 91%, 92%, 93%, 94%, 95%, 96%, 97%, 98%, or 99% with respect to a first task. In some embodiments, the first neural network has an accuracy of or of at most 5%, 10%, 20%, 30%, 40%, or 50% with respect to a second task. A second neural network (e.g., a final second neural network) of the plurality of second neural networks has an accuracy of or of at least 70%, 75%, 80%, 81%, 82%, 83%, 84%, 85%, 86%, 87%, 88%, 89%, 90%, 91%, 92%, 93%, 94%, 95%, 96%, 97%, 98%, or 99% with respect to a second task.

In some embodiments, determining the plurality of second neural networks comprises: minimizing distances moved in the weight space amongst successive second neural networks of the plurality of second neural networks. In some embodiments, determining the plurality of second neural networks comprises: identifying functionally invariant directions in the weight space using a first objective function while biasing the functionally invariant directions along a gradient of the second objective function. In some embodiments, determining the plurality of second neural networks comprises: determining the plurality of second neural networks using output velocity and/or output acceleration in the output space. In some embodiments, determining the plurality of second neural networks comprises: minimizing output velocity, for a given change in weight, in the output space. In some embodiments, determining the plurality of second neural networks comprises: minimizing output acceleration, for a given change in weight, in the output space.

In some embodiments, determining the second neural network and/or determining the plurality of second neural networks comprises: (i) sampling a plurality of first points around the plurality of first weights of the first neural network in the weight space. Determining the second neural network and/or determining the plurality of second neural networks can comprise: (ii) performing gradient descent from each of the plurality of first points to determine the second neural network, or a second neural network of the plurality of second neural networks. In some embodiments, determining the other second neural network or determining the plurality of second neural networks comprises: (iii) sampling a plurality of second points around the plurality of second weights of the second neural network in the weight space. Determining the other second neural network or determining the plurality of second neural networks can comprise: (iv) performing gradient descent from each of the plurality of second points to determine the other second neural network or another second neural network of the plurality of second neural networks.

In some embodiments, determining the plurality of second neural networks comprises: (i) sampling a plurality first points around the plurality of first weights of the first neural network in the weight space. Determining the plurality of second neural networks comprises: (ii) performing gradient descent from each of the plurality of first points to determine a second neural network of the plurality of second neural networks. Determining the plurality of second neural networks can comprise: (iii) sampling a plurality second points around the plurality of second weights of the immediate prior second neural network (the second neural network from (ii) for the first iteration of (iii), or the immediate prior iteration of (iii) for any subsequent iteration of (iii)) in the weight space. Determining the plurality of second neural networks can comprise: (iv) performing gradient descent from each of the plurality of second points to determine another second neural network of the plurality of second neural networks. Determining the plurality of second neural networks can comprise: (v) repeating (iii) and (iv) for a number of iterations.

In some embodiments, the method comprises: receiving an input. The method can comprise: determining an output from the input using a final second neural network (e.g., the final second neural network) of the plurality of second neural networks. The method can comprise: determining an output from the input using the plurality of second neural networks as an ensemble (or the first neural network and the plurality of second neural networks).

In some embodiments, a neural network comprises at least 100, 200, 300, 400, 500, 600, 700, 800, 900, 1000, 2000, 3000, 4000, 5000, 6000, 7000, 8000, 9000, 10000, 100000, 500000, 1000000, 5000000, or 10000000 weights. In some embodiments, a neural network comprises or comprises at least 3, 4, 5, 6, 7, 8, 9, 10, 15, 20, 30, 40, 50, 60, 70, 80, 90, 100, 150, 200, 300, 400, 500, or more, layers. A layer can comprise or comprise at least, 3, 4, 5, 6, 7, 8, 9, 10, 15, 20, 30, 40, 50, 60, 70, 80, 90, 100, 150, 200, 300, 400, 500, 1000, 2000, 3000, 4000, 5000, or more, or more nodes. In some embodiments, a neural network comprises or comprises at least 2, 3, 4, 5, 6, 7, 8, 9, 10, 15, 20, 30, 40, 50, 60, 70, 80, 90, 100, 150, 200, 300, 400, 500, or more, convolutional layers. In some embodiments, a neural network comprises 2, 3, 4, 5, 6, 7, 8, 9, 10, 15, 20, 30, 40, 50, 60, 70, 80, 90, 100, 150, 200, 300, 400, 500,or more, fully connected layers. In some embodiments, a neural network comprises at least 25, 50, 100, 200, 300, 400, 500, 1000, 2000, 3000, 4000, 5000, 10000, 50000, 100000, or more, nodes. In some embodiments, a neural network comprises a convolutional neural network (CNN), a deep neural network (DNN), a multilayer perceptron (MLP), or a combination thereof.

Disclosed herein include methods of performing a task. In some embodiments, a method of performing a task is under control of a processor (e.g., a hardware processor or a virtual processor) and comprises: receiving a second neural network (e.g., a final second neural network) determined using any method disclosed herein. The method can comprise: receiving an input. The method can comprise: determining an output from the input using the second neural network. In some embodiments, a method of performing a task is under control of a processor (e.g., a hardware processor or a virtual processor) and comprises: receiving a plurality of second neural networks (or the first neural network or the plurality of second neural networks) determined using any method disclosed herein. The method can comprise: receiving an input. The method can comprise: determining an output from the input using the plurality of second neural networks as an ensemble (or the first neural network or the plurality of second neural networks) as an ensemble. In some embodiments, the system comprises or is comprised in an edge device, an internet of things (IoT) device, a real-time image analysis system, a real-time sensor analysis system, an autonomous driving system, an autonomous vehicle, a robotic control system, a robot, or a combination thereof.

Disclosed herein include embodiments of a computer readable medium. In some embodiments, a computer readable medium comprising executable instructions, when executed by a hardware processor of a computing system or a device, cause the hardware processor, to perform any method disclosed herein.

Although the methods herein are described using neural networks, this is for illustrative purposes only and is not intended to be limiting. The methods can generate machine learning models. For example, the methods disclosed herein can generate a plurality of second machine learning models from a first machine learning model using a functionally invariant path (e.g., with respect to the first machine learning model).

Machine Learning Models

A machine learning model can be, for example, a neural network (NN), a convolutional neural network (CNN), a deep neural network (DNN), or a multilayer perceptron. The computing device 141400 described with reference to FIG. 14 can generate a machine learning model.

A layer of a neural network (NN), such as a deep neural network (DNN), can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

A convolutional neural network (CNN) can be a NN with one or more convolutional layers, such as, 5, 6, 7, 8, 9, 10, or more. The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in a NN can be 10, 20, 30, 40, or more. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. Outputs of NNs of the plurality of NNs can be computed to determine an output of the NN. For example, an output of a NN of the plurality of NNs can include a likelihood score. The output of the NN including the plurality of NNs can be determined based on the likelihood scores of the outputs of different NNs of the plurality of NNs.

Non-limiting examples of machine learning models include scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Some examples of machine learning models can include supervised or non-supervised machine learning, including regression models (such as, for example, Ordinary Least Squares Regression), instance-based models (such as, for example, Learning Vector Quantization), decision tree models (such as, for example, classification and regression trees), Bayesian models (such as, for example, Naive Bayes), clustering models (such as, for example, k-means clustering), association rule learning models (such as, for example, a-priori models), artificial neural network models (such as, for example, Perceptron), deep learning models (such as, for example, Deep Boltzmann Machine, or deep neural network), dimensionality reduction models (such as, for example, Principal Component Analysis), ensemble models (such as, for example, Stacked Generalization), and/or other machine learning models.

Execution Environment

Figure 14:
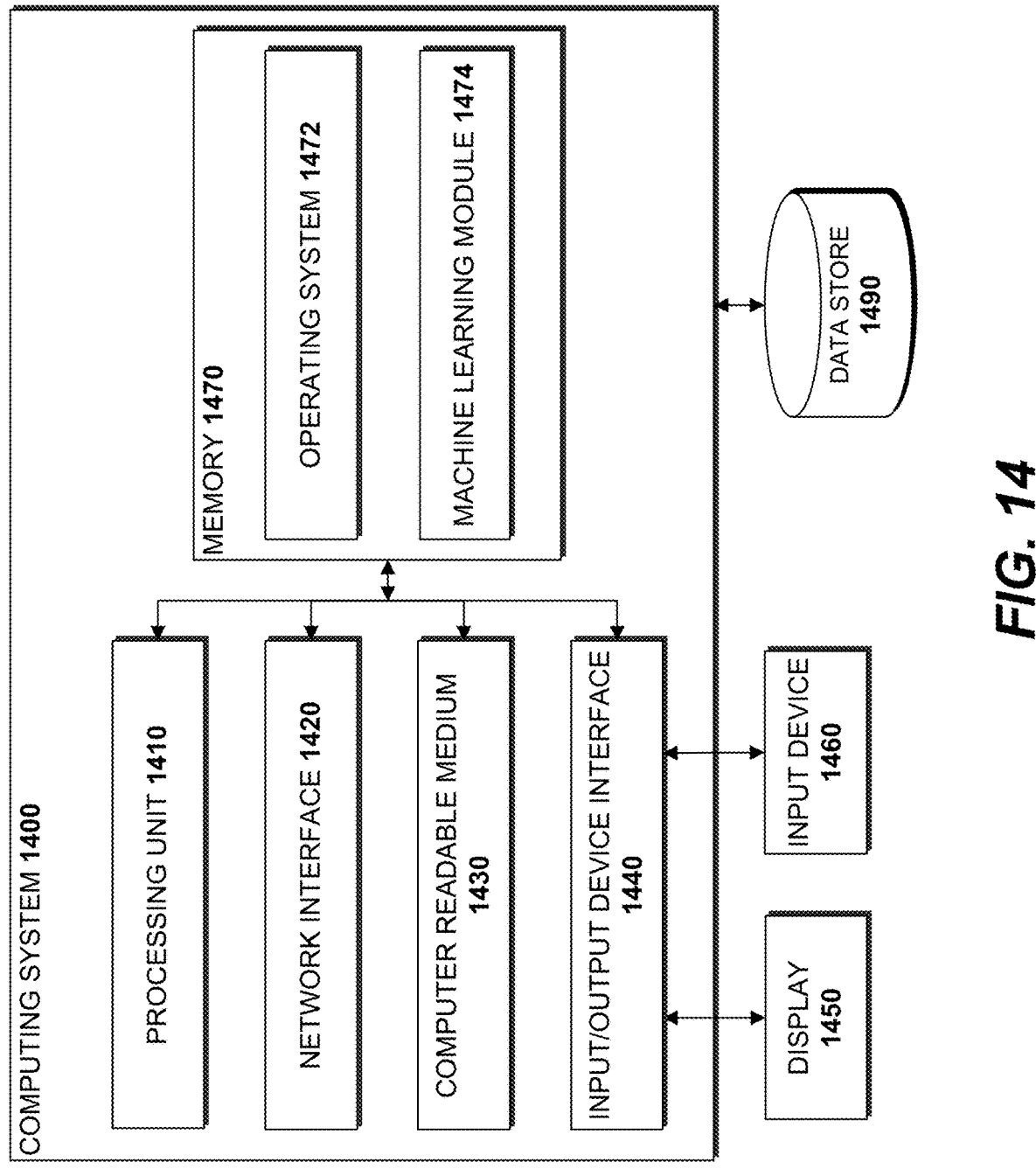
FIG. 14 is a block diagram of an illustrative computing system configured to o execute the processes and implement the features described herein.

FIG. 14 depicts a general architecture of an example computing device 1400 configured to execute the processes and implement the features described herein. The general architecture of the computing device 1400 depicted in FIG. 14 includes an arrangement of computer hardware and software components. The computing device 1400 may include many more (or fewer) elements than those shown in FIG. 14. It is not necessary, however, that all of these generally conventional elements be shown in order to provide an enabling disclosure. As illustrated, the computing device 1400 includes a processing unit 1410, a network interface 1420, a computer readable medium drive 1430, an input/output device interface 1440, a display 1450, and an input device 1460, all of which may communicate with one another by way of a communication bus. The network interface 1420 may provide connectivity to one or more networks or computing systems. The processing unit 1410 may thus receive information and instructions from other computing systems or services via a network. The processing unit 1410 may also communicate to and from memory 1470 and further provide output information for an optional display 1450 via the input/output device interface 1440. The input/output device interface 1440 may also accept input from the optional input device 1460, such as a keyboard, mouse, digital pen, microphone, touch screen, gesture recognition system, voice recognition system, gamepad, accelerometer, gyroscope, or other input device.

The memory 1470 may contain computer program instructions (grouped as modules or components in some embodiments) that the processing unit 1410 executes in order to implement one or more embodiments. The memory 1470 generally includes RAM, ROM and/or other persistent, auxiliary or non-transitory computer-readable media. The memory 1470 may store an operating system 1472 that provides computer program instructions for use by the processing unit 1410 in the general administration and operation of the computing device 1400. The memory 1470 may further include computer program instructions and other information for implementing aspects of the present disclosure.

For example, in one embodiment, the memory 1470 includes a machine learning module 1474 for training machine learning models and/or generating machine learning models, such as neural networks, using functionally invariant paths in weight space described herein. In addition, memory 1470 may include or communicate with the data store 1490 and/or one or more other data stores that store input, intermediate results, and/or output of the methods described herein, e.g., datasets (such as training datasets or held-out or test datasets) or machine learning models (such as neural networks) received, trained, or generated.

Additional Considerations

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A and working in conjunction with a second processor configured to carry out recitations B and C. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

It will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for improving a neural network comprising: under control of a hardware processor:
   (a) receiving a first neural network, wherein the first neural network comprises a plurality of first weights in a weight space, and wherein the first neural networks maps an input to an output in an output space;
   (b) determining a second neural network of a plurality of second neural networks from the first neural network along a functionally invariant path (FIP) in the weight space using a first metric tensor, wherein the second neural network comprises a plurality of second weights in the weight space;
   (c) determining another second neural network of the plurality of second neural networks from the immediate prior second neural network along the FIP in the weight space using a second metric tensor, wherein the second neural network determined in (c) comprises a plurality of second weights in the weight space; and
   (d) repeating (c) for a number of iterations.

2. The method of claim 1, wherein the number of iterations is predetermined, optionally wherein the number of iterations is 20.

3. The method of claim 1, wherein receiving the first neural network comprises: training the neural network using a first objective function.

4. The method of claim 1, wherein determining the second neural network comprises: determining the second neural network using a first objective function, wherein determining the other second neural network comprises: determining the other second neural network using a first objective function, and/or wherein determining a plurality of the second neural network comprises: determining the plurality of second neural network using a first objective function.

5. The method of claim 1, wherein determining the second neural network comprises determining the second neural network using a first objective function and a second objective function, wherein determining the other second neural network comprises determining the other second neural network using a first objective function and a second objective function, wherein determining the plurality of second neural networks comprises:
   determining the plurality of second neural networks using a first objective function and a second objective function, and/or wherein the second objective function is weighted relative to the first objective function.

6. The method of claim 1, wherein the first neural network is for a first task, and wherein a second neural network of the plurality of second neural network is for the first task and a second task.

7. The method of claim 1, wherein the first neural network is for a first task, and wherein a second neural network of the plurality of second neural network is for the first task.

8. The method of claim 1, wherein determining the plurality of second neural networks comprises: determining the plurality of second neural networks from the first neural network along a FIP in the weight space with respect to the first neural network, the method further comprising: determining a plurality of third neural networks from a final second neural network of the plurality of second neural networks along FIP in the weight space with respect to the final second neural network of the plurality of second neural networks, wherein each of the plurality of third neural networks comprises a plurality of third weights in the weight space.

9. The method of claim 1, wherein the first neural network has an accuracy of at least 80% with respect to a first task, and wherein a second neural network of the plurality of second neural networks has an accuracy of at least 80% with respect to a first task.

10. The method of claim 1, wherein the first neural network has an accuracy of at most 50% with respect to a second task, and wherein a final second neural network of the plurality of second neural networks has an accuracy of at least 80% with respect to a second task.

11. The method of claim 1, determining the plurality of second neural networks comprises: minimizing distances moved in the weight space amongst successive second neural networks of the plurality of second neural networks.

12. The method of claim 1, wherein determining the plurality of second neural networks comprises: identifying functionally invariant directions in the weight space using a first objective function while biasing the functionally invariant directions along a gradient of the second objective function.

13. The method of claim 1, wherein determining the plurality of second neural networks comprises: determining the plurality of second neural networks using output velocity and/or output acceleration in the output space.

14. The method of claim 1, wherein determining the plurality of second neural networks comprises: minimizing output velocity, for a given change in weight, in the output space.

15. The method of claim 1, wherein determining the plurality of second neural networks comprises: minimizing output acceleration, for a given change in weight, in the output space.

16. The method of claim 1, wherein determining the second neural network and/or determining the plurality of second neural networks comprises:
   (i) sampling a plurality of first points around the plurality of first weights of the first neural network in the weight space; and
   (ii) performing gradient descent from each of the plurality of first points to determine the second neural network, or a second neural network of the plurality of second neural networks.

17. The method of claim 1, wherein the first neural network and/or a second neural network comprises at least 100 weights.

18. The method of claim 1, wherein the first neural network and/or a second neural network comprises at least 3 layers, optionally wherein a layer comprises at least 5 nodes.

19. The method of claim 1, wherein the first neural network and/or a second neural network comprises at least two convolutional layers and/or two fully connected layers.

20. The method of claim 1, wherein the first neural network and/or a second neural network comprises at least 25 nodes.

21. The method of claim 1, wherein the first neural network and/or a second neural network comprises a convolutional neural network (CNN), a deep neural network (DNN), a multilayer perceptron (MLP), or a combination thereof.

22. A method comprising:

under control of a hardware processor:

receiving a final second neural network of the plurality of second neural networks of the method of claim 1;

receiving an input; and determining an output from the input using the final second neural network.

23. A method for improving a neural network comprising:

under control of a hardware processor:

(a) receiving a first neural network, wherein the first neural network comprises a plurality of first weights in a weight space, and wherein the first neural networks maps an input to an output in an output space;

(b) determining a second neural network of a plurality of second neural networks from the first neural network along a functionally invariant path (FIP) in the weight space using a first metric tensor with respect to the first neural network, wherein the second neural network comprises a plurality of second weights in the weight space; and (c) iteratively, determining another second neural network of the plurality of second neural networks from the immediate prior second neural network along the FIP in the weight space using a second metric tensor, wherein the second neural network comprises a plurality of second weights in the weight space.

24. A method comprising:

under control of a hardware processor:

receiving a plurality of second neural networks of the method of claim 5;

receiving an input; and determining an output from the input using the plurality of second neural networks.

* * * * *